United States Patent [19]

Bailey, Jr. et al.

[11] 4,048,481

[45] Sept. 13, 1977

[54] DIAGNOSTIC TESTING APPARATUS AND METHOD

[75] Inventors: Myrl Kennedy Bailey, Jr., North Billerica; George J. Barlow, Tewksbury, both of Mass.

[73] Assignee: Honeywell Information Systems Inc., Waltham, Mass.

[21] Appl. No.: 533,743

[22] Filed: Dec. 17, 1974

[51] Int. Cl.² ............................................. G06F 11/04
[52] U.S. Cl. .............................. 235/153 AK; 364/200
[58] Field of Search ................ 235/153 AK, 153 AC; 340/172.5; 445/1

[56] References Cited

U.S. PATENT DOCUMENTS

| | | | |
|---|---|---|---|
| 3,518,413 | 6/1970 | Holtey | 235/153 AK |
| 3,519,808 | 7/1970 | Lawder | 235/153 AK |
| 3,576,541 | 4/1971 | Kwan et al. | 340/172.5 |
| 3,798,613 | 3/1974 | Edstrom et al. | 340/172.5 |
| 3,806,878 | 4/1974 | Edstrom | 340/172.5 |
| 3,838,260 | 9/1974 | Nelson | 235/153 AK |
| 3,873,819 | 3/1975 | Greenwald | 235/153 AK |

Primary Examiner—Charles E. Atkinson
Attorney, Agent, or Firm—Faith F. Driscoll; Ronald T. Reiling; Nicholas Prasinos

[57] ABSTRACT

A microprogrammable peripheral controller in addition to being operative to controlling plurality of input/output devices in response to commands for processing information signals from a magnetic medium also includes apparatus for independently establishing a minimum operating capability within the controller. The apparatus includes a read-only control store arranged to store microinstructions and a limited number of basic bit patterns. The apparatus in response to an external control signal is operative to condition the data recovery apparatus included in the controller to receive the blocks of synchronization and data patterns arranged in a predetermined format and generated from basic bit patterns obtained from the control store. Simultaneously therewith, the apparatus inhibits normal transfer of information from the magnetic medium. Additionally, a plurality of record error indicator circuits included in the data recovery apparatus are operative to be switched during the processing of each of the blocks of bit patterns transferred through the recovery apparatus. The apparatus further includes comparison circuits which compare the state of the record error indicators with a predicted bit pattern for detecting whether the recovery apparatus is operating properly in processing the block of bit patterns transferred thereto. The states of other indicator storage circuits are modified to signals indicative of conditions occurring during the transfer of the generated bit patterns. The comparison circuits also compare the states of these circuits with a predicted bit pattern as further verification of recovery apparatus operation.

30 Claims, 28 Drawing Figures

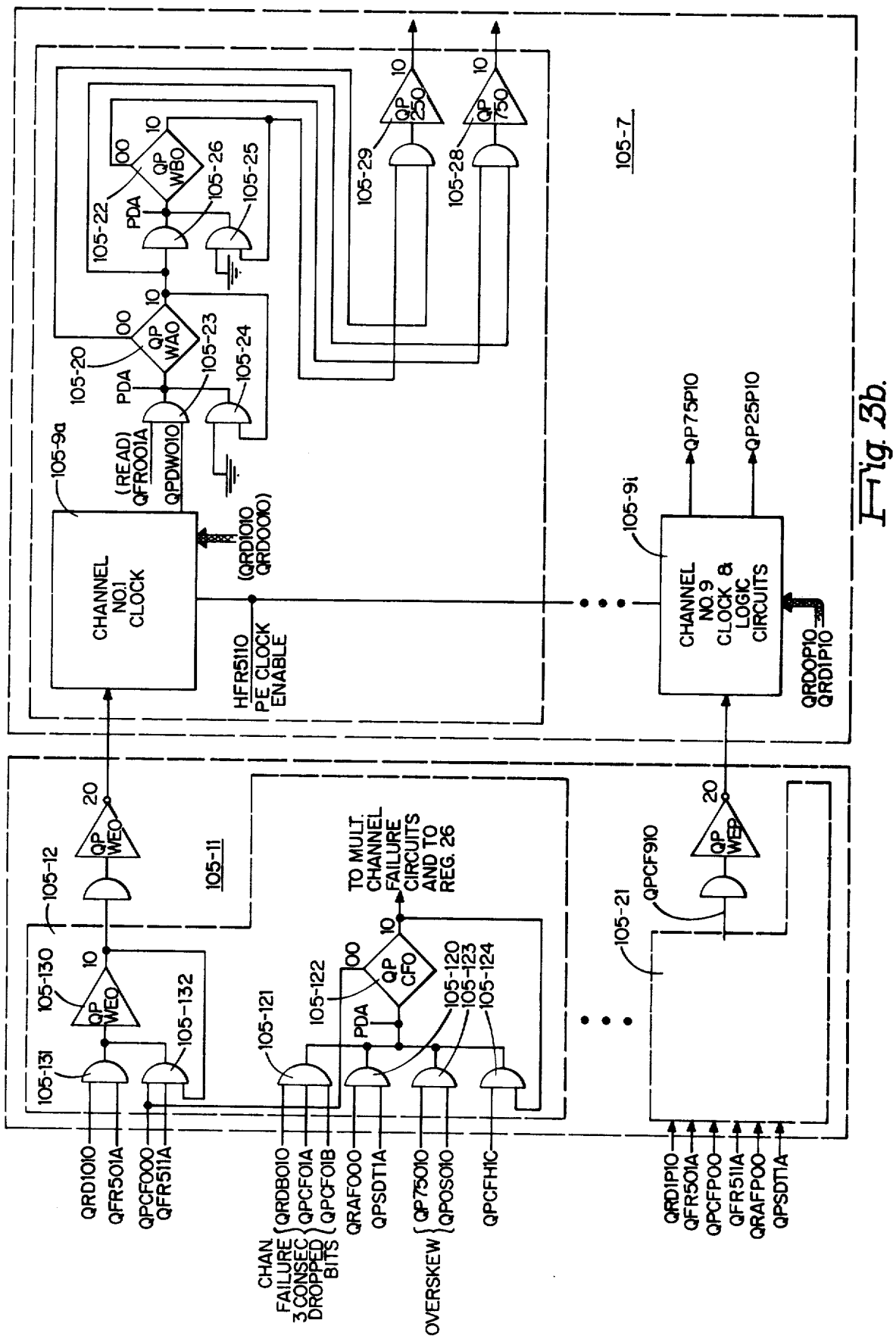

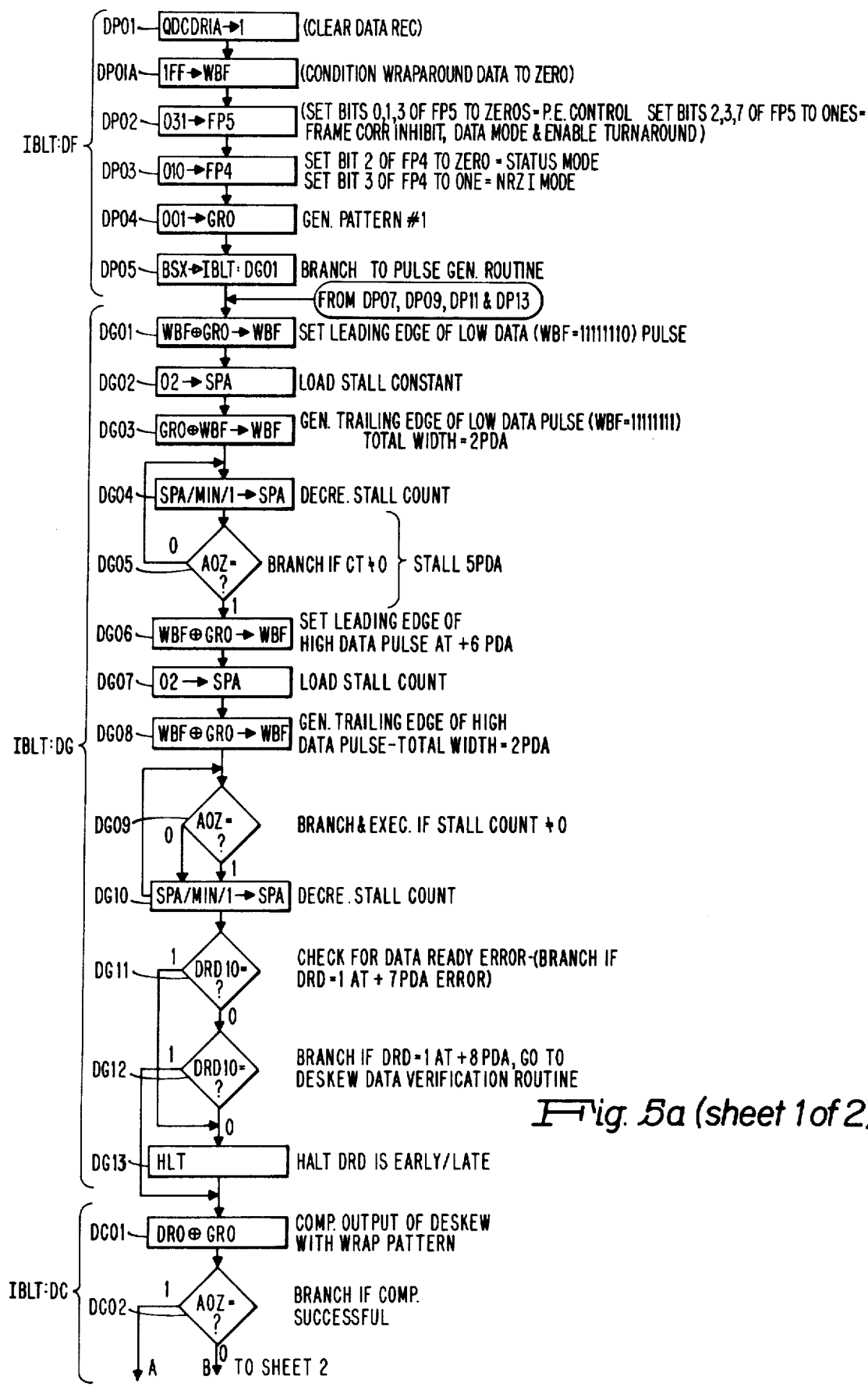
Fig. 5a (sheet 1 of 2).

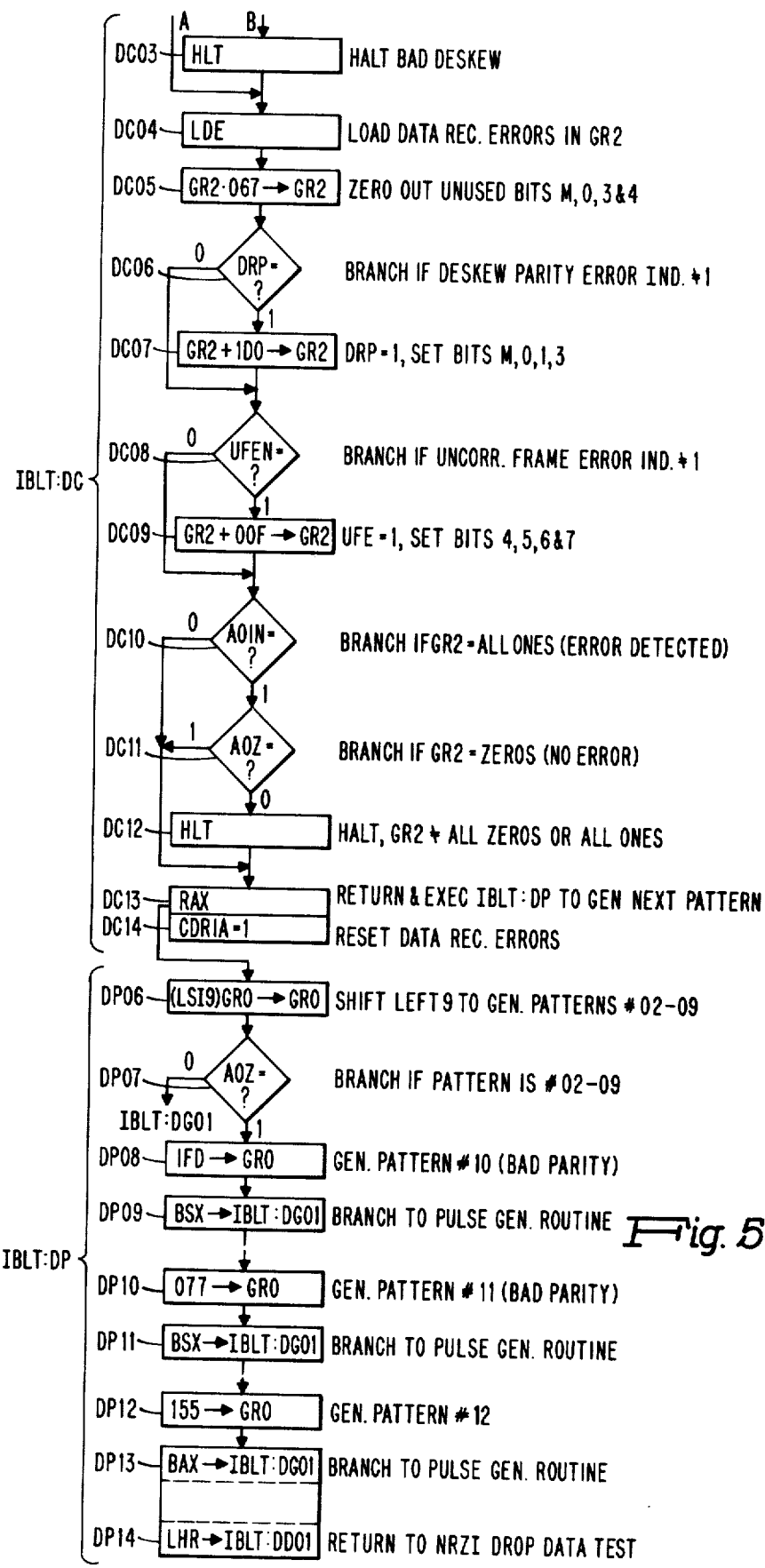
Fig. 5a (sheet 2 of 2).

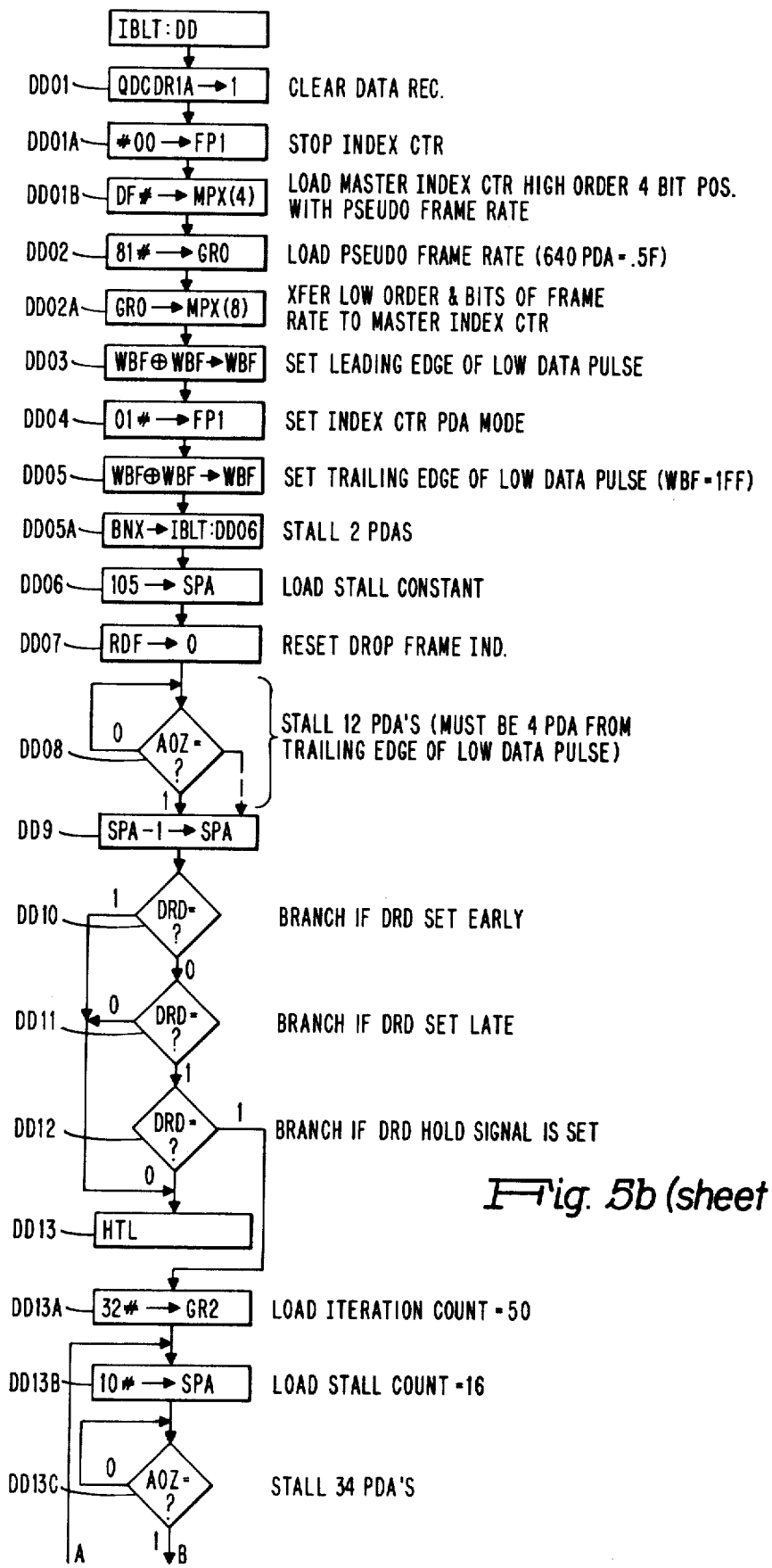
Fig. 5b (sheet 1 of 2).

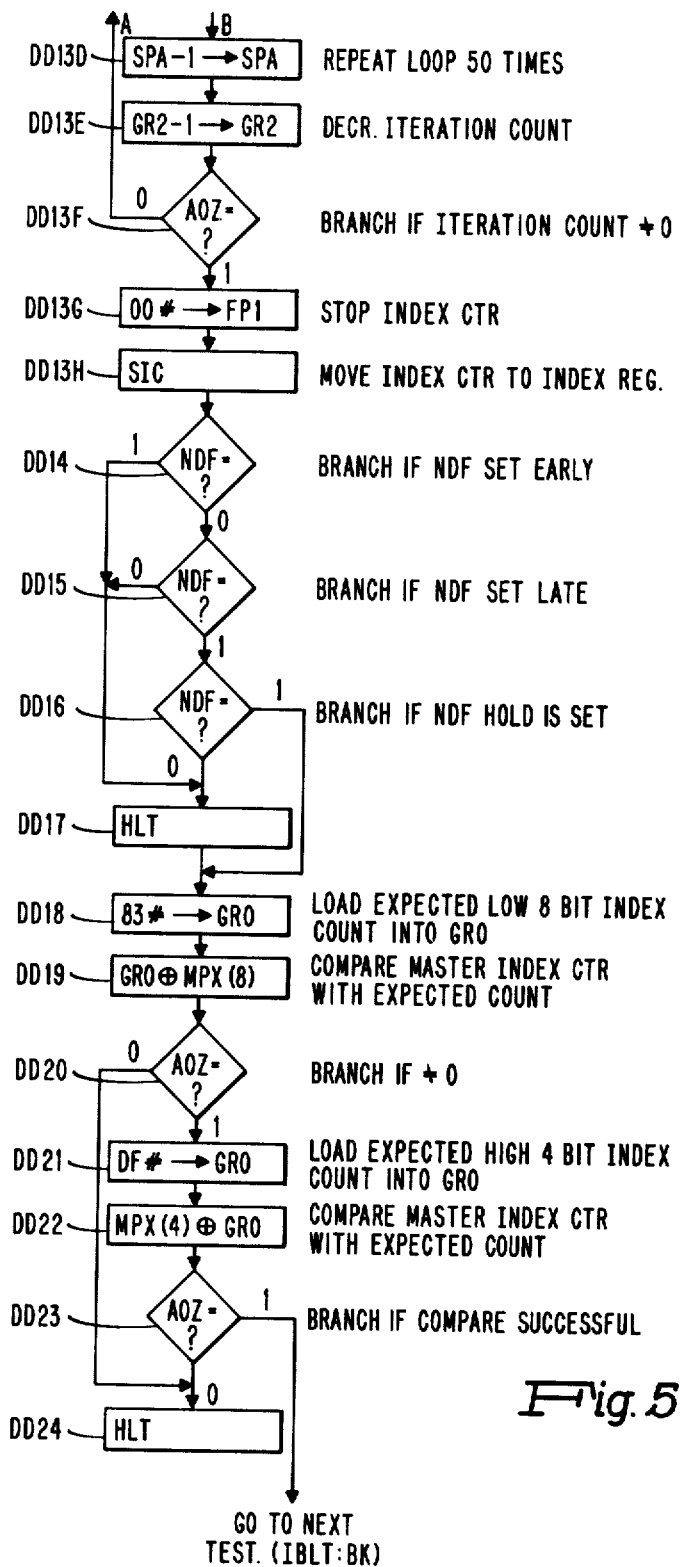
Fig. 5b. (sheet 2 of 2).

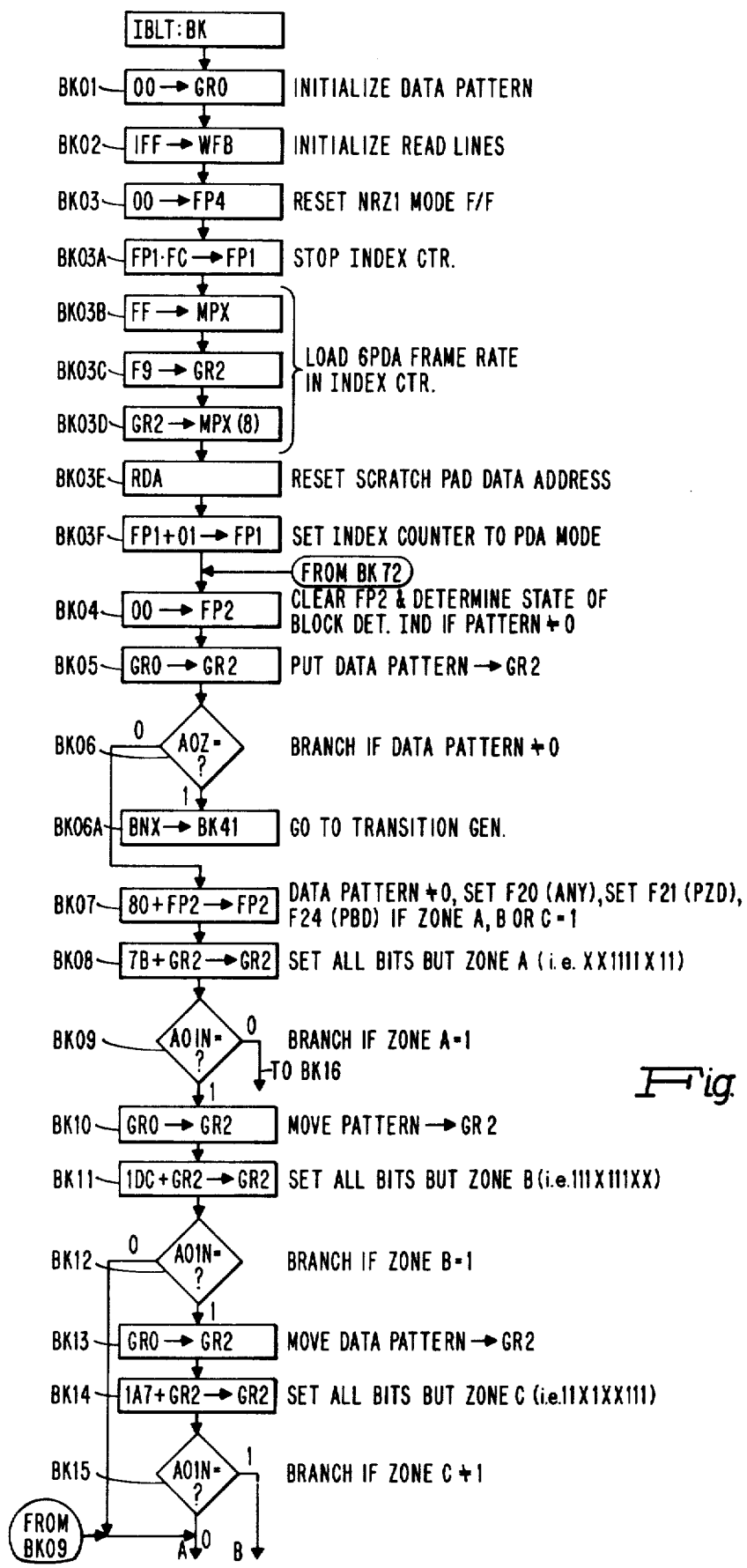
Fig. 5c (sheet 1 of 5)

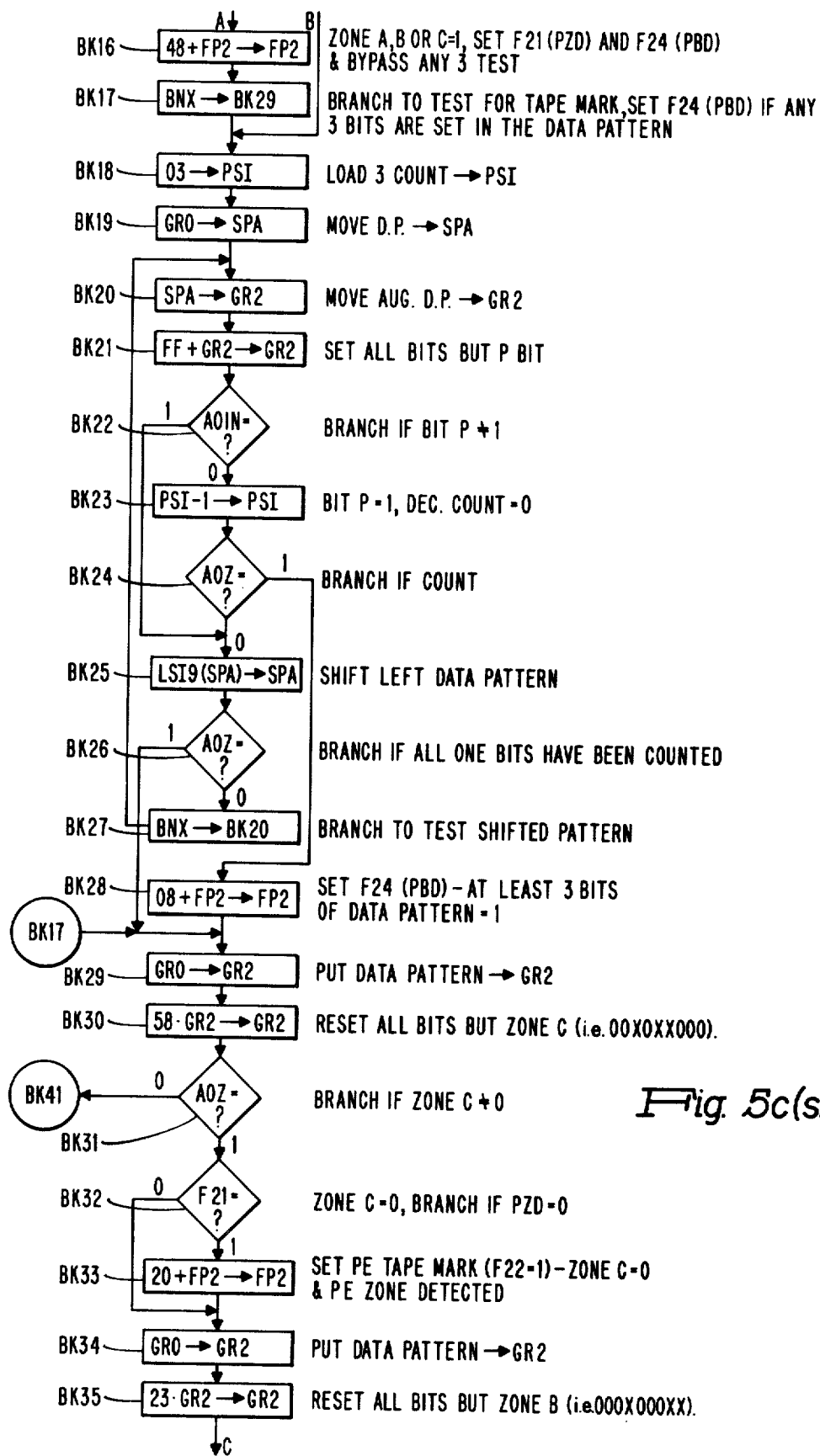
Fig. 5c (sheet 2 of 5)

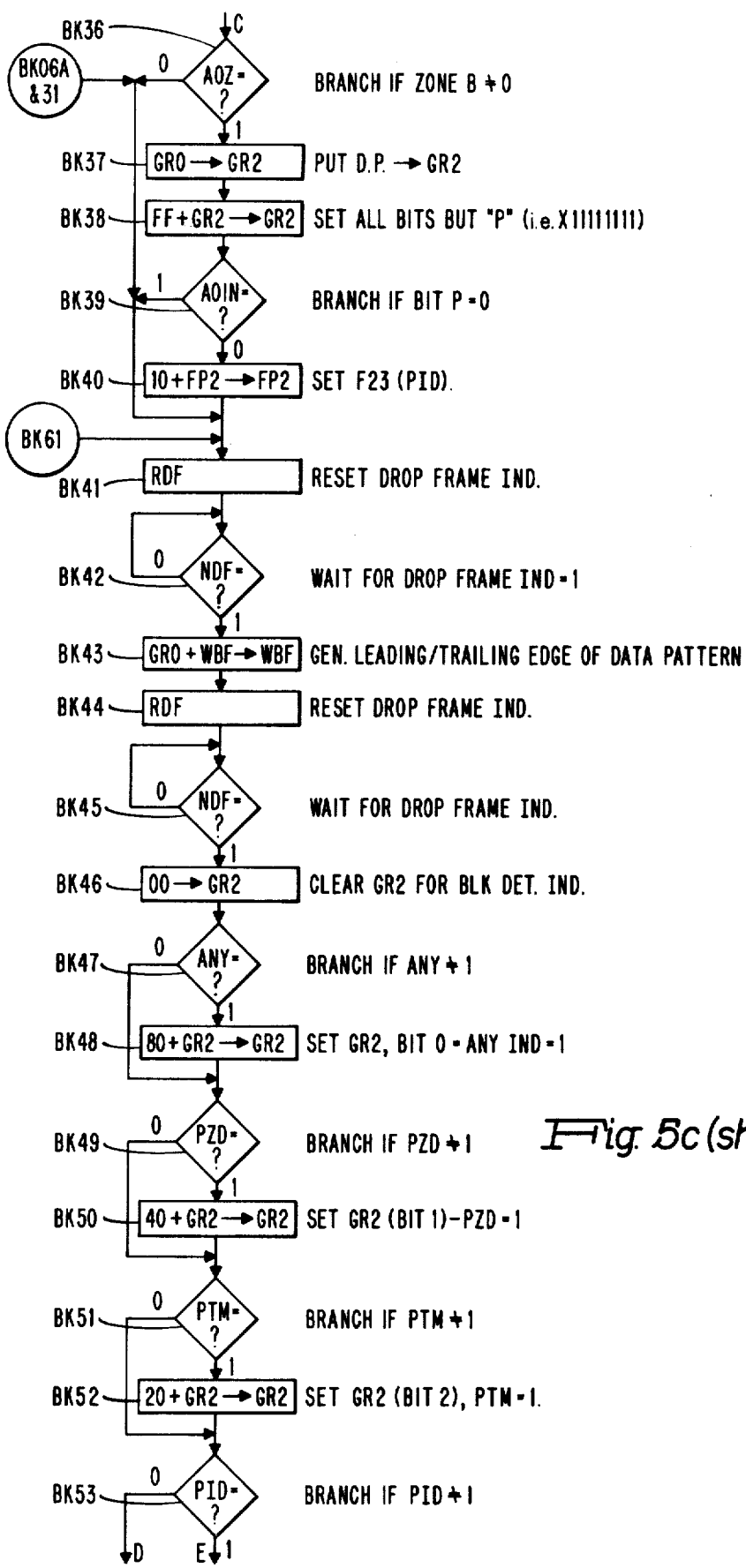
Fig. 5c (sheet 3 of 5).

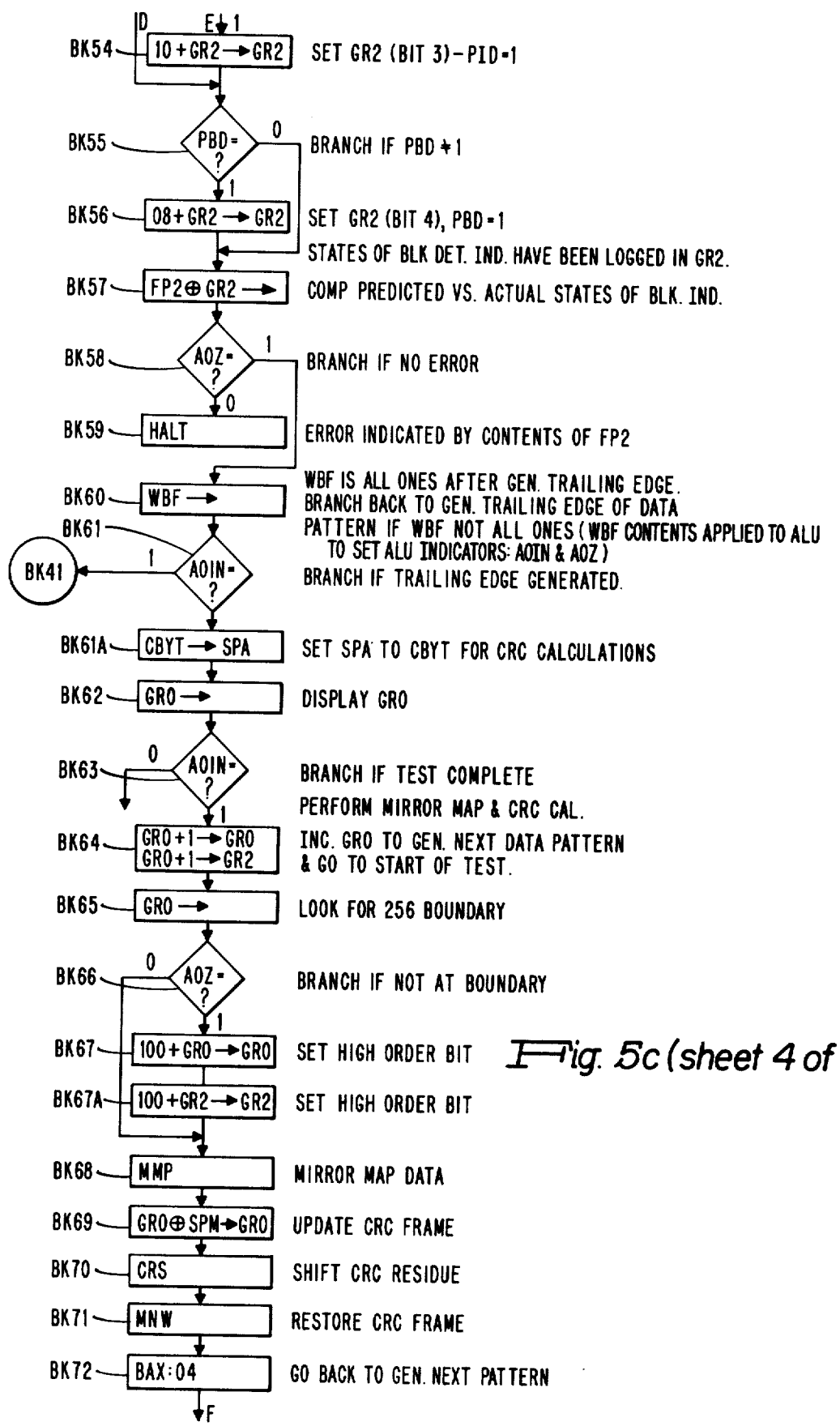
Fig. 5c (sheet 4 of 5).

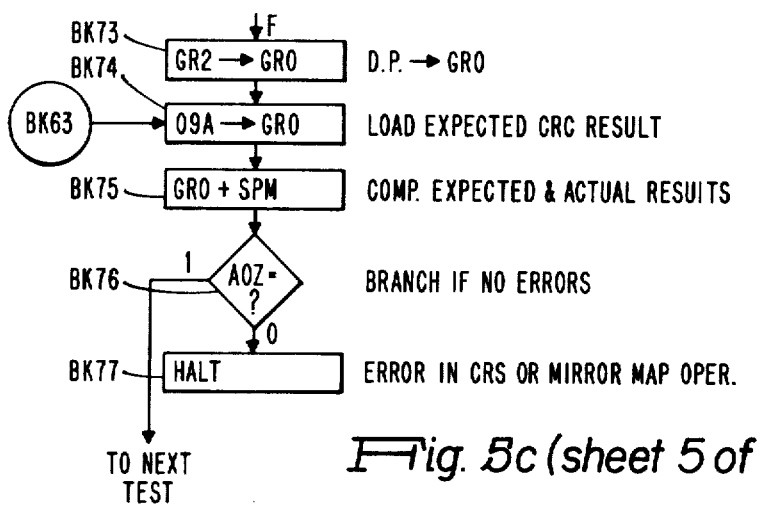
Fig. 5c (sheet 5 of 5).

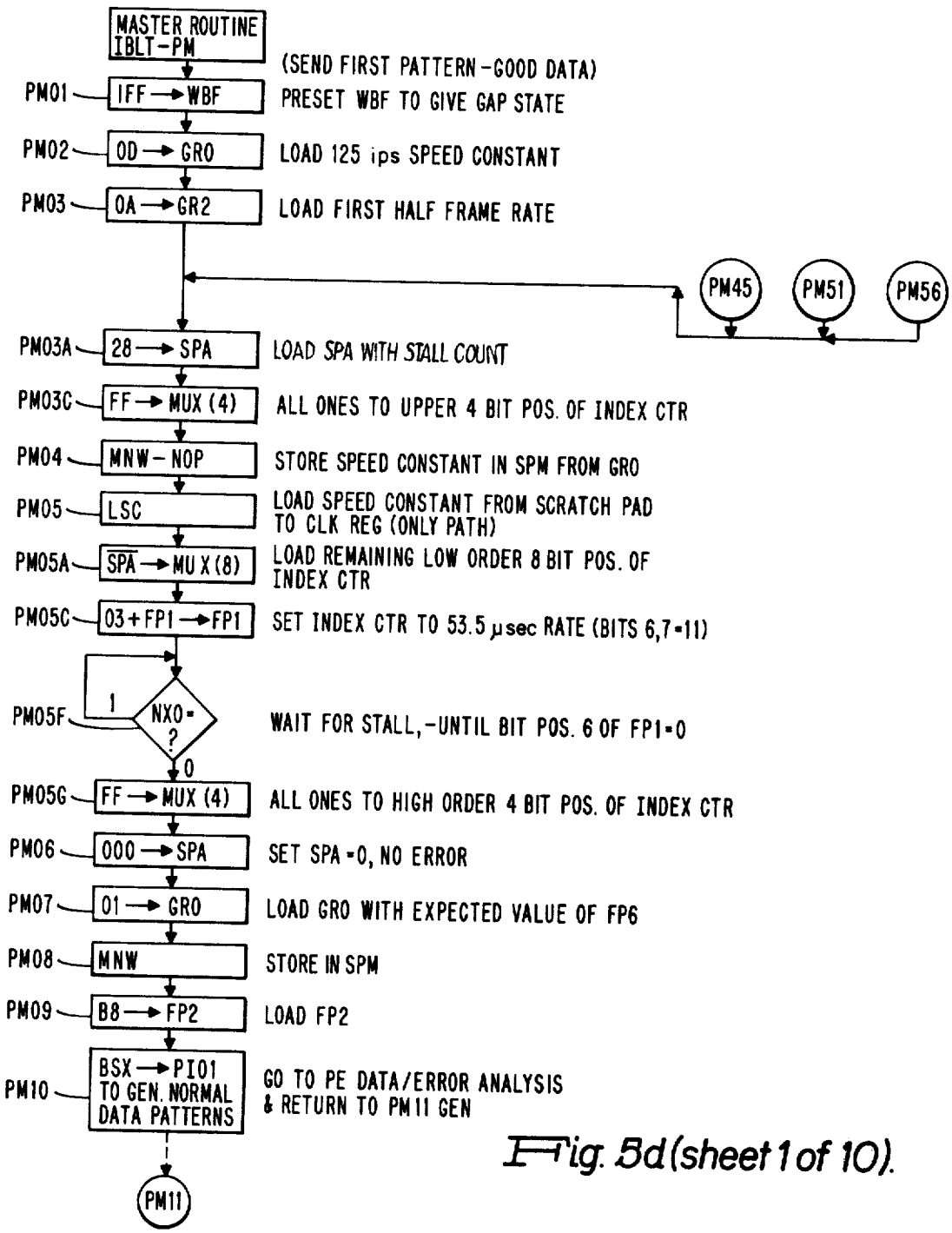
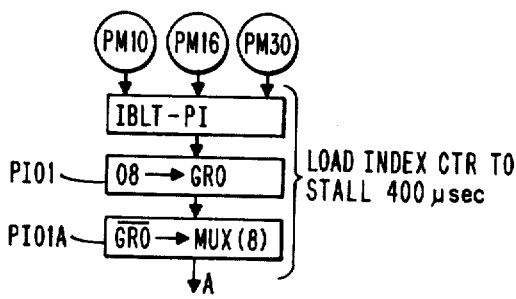
Fig. 5d (sheet 1 of 10).

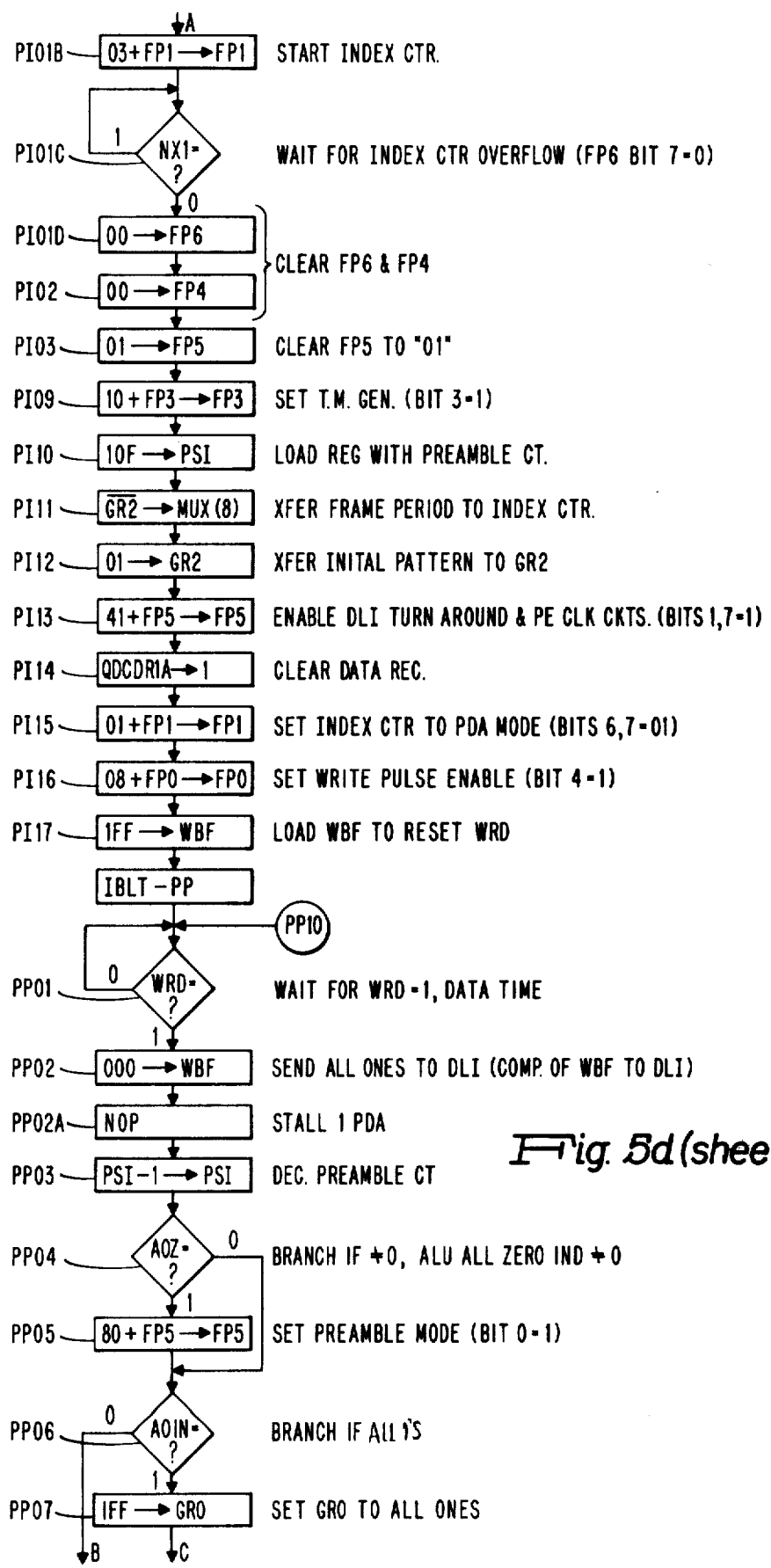
Fig. 5d (sheet 2 of 10).

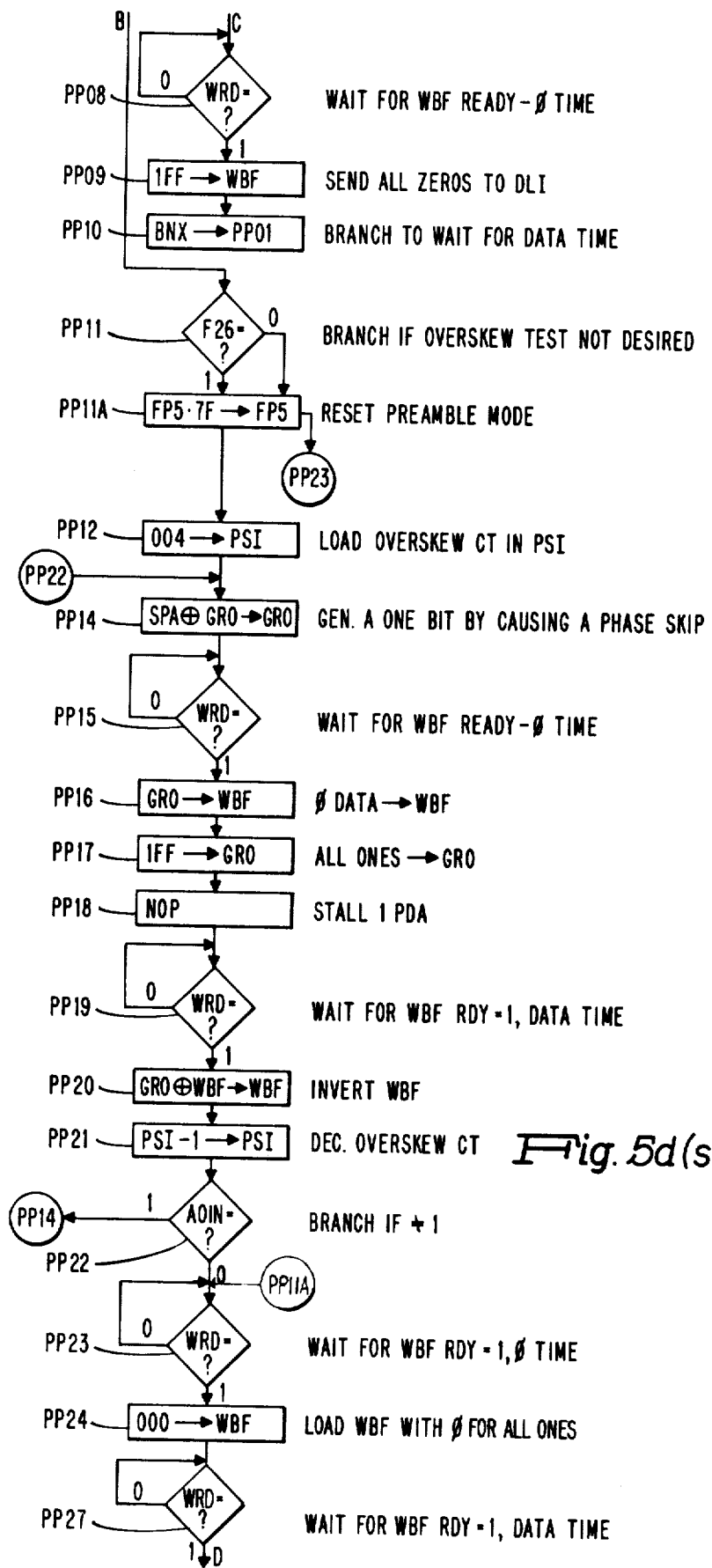
Fig. 5d (sheet 3 of 10).

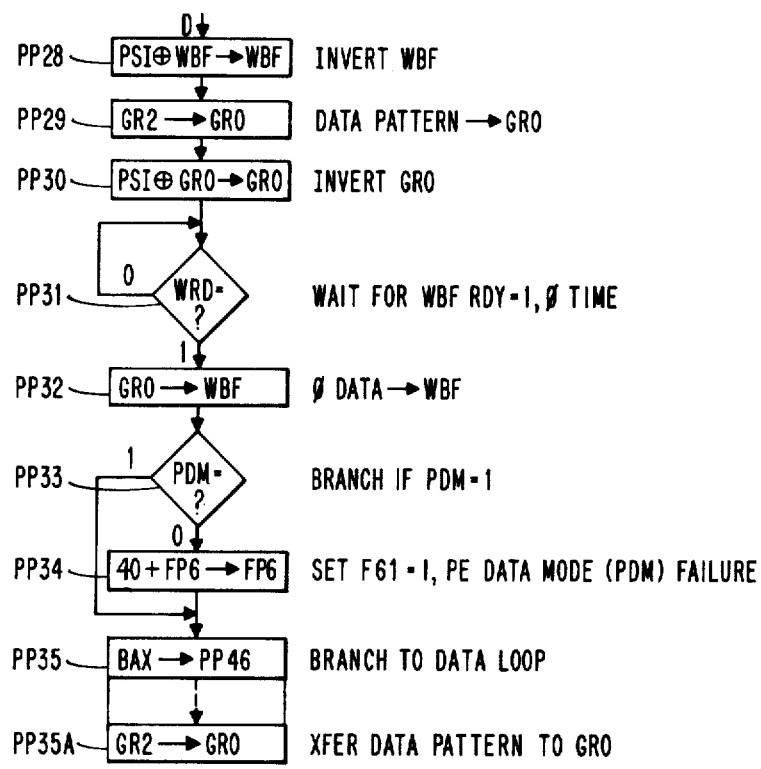
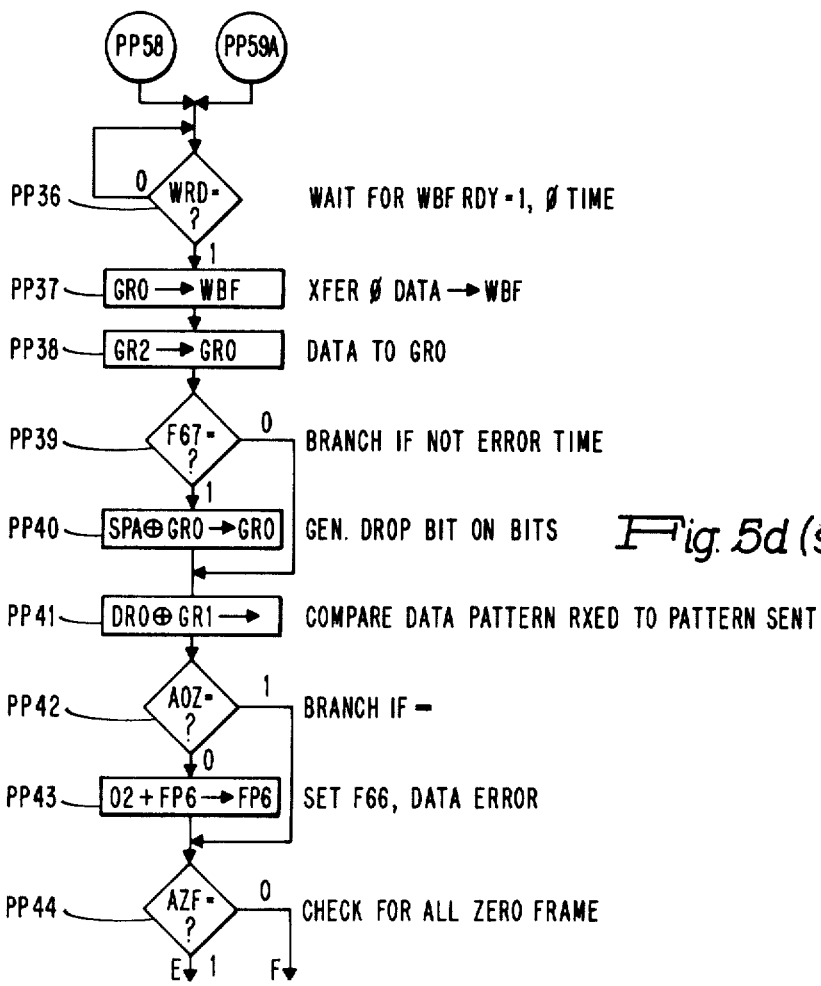
Fig. 5d (sheet 4 of 10).

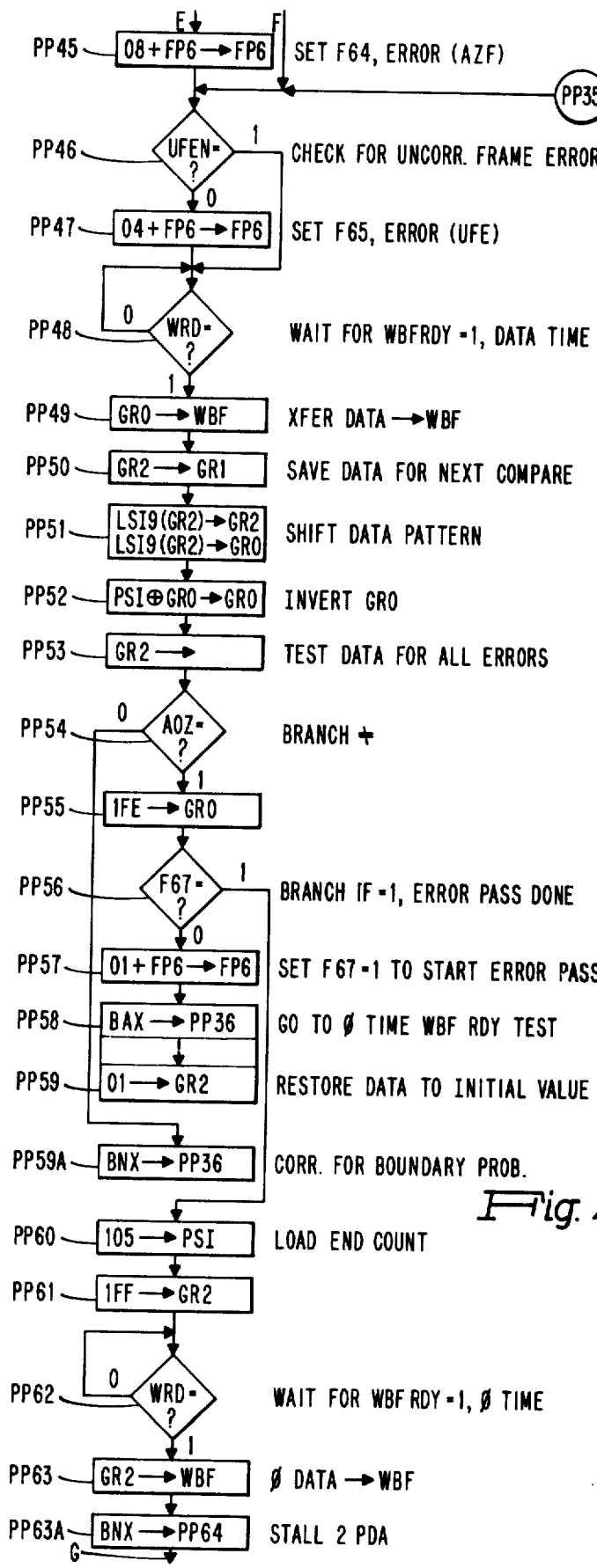
Fig. 5d (sheet 5 of 10).

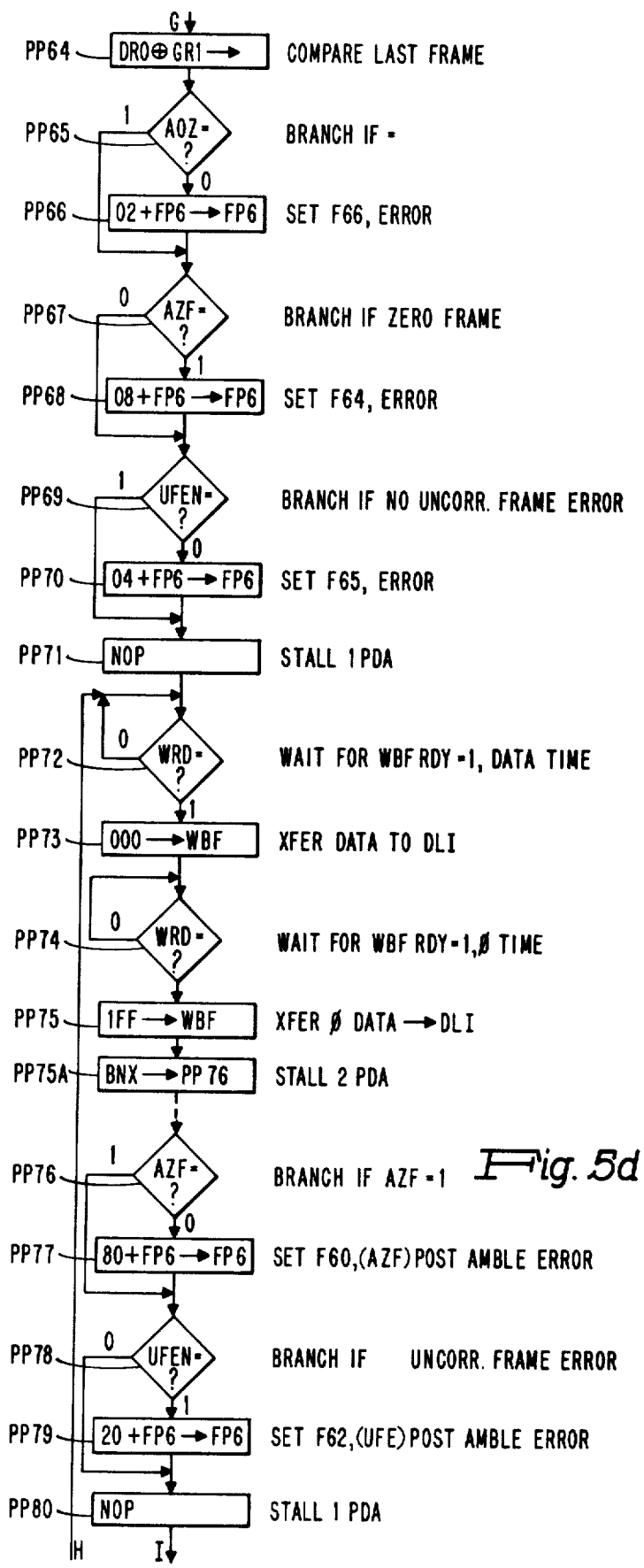
Fig. 5d (sheet 6 of 10).

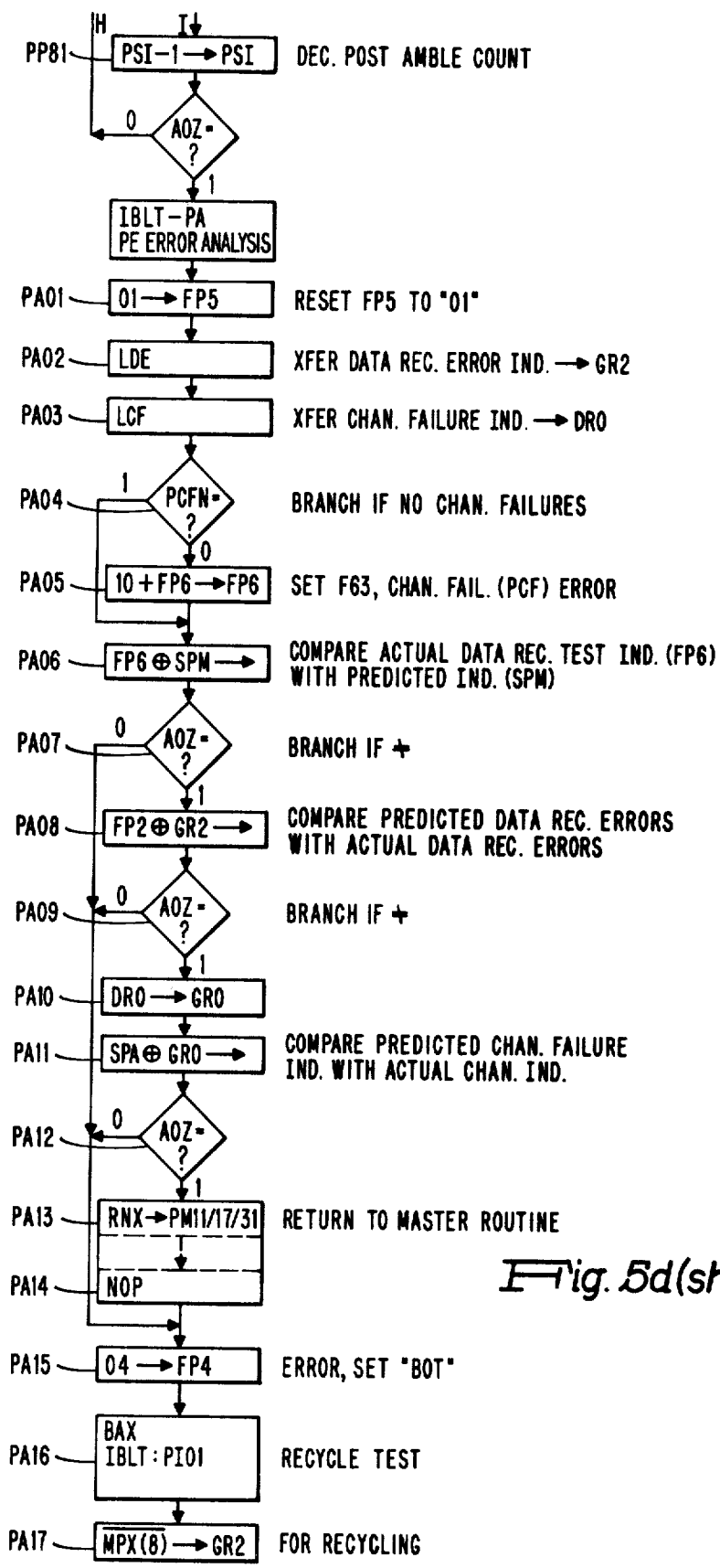
Fig. 5d (sheet 7 of 10).

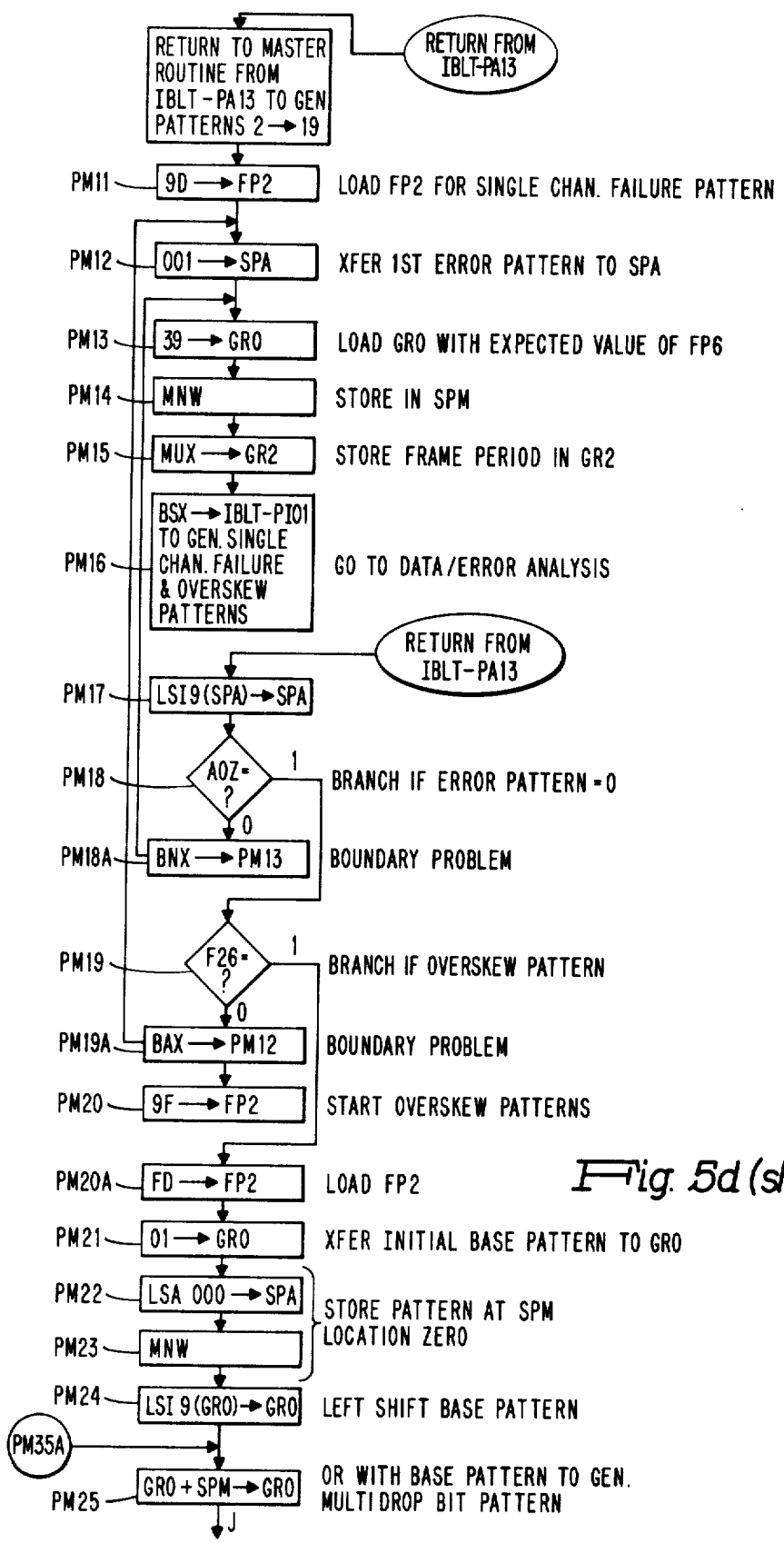
Fig. 5d (sheet 8 of 10).

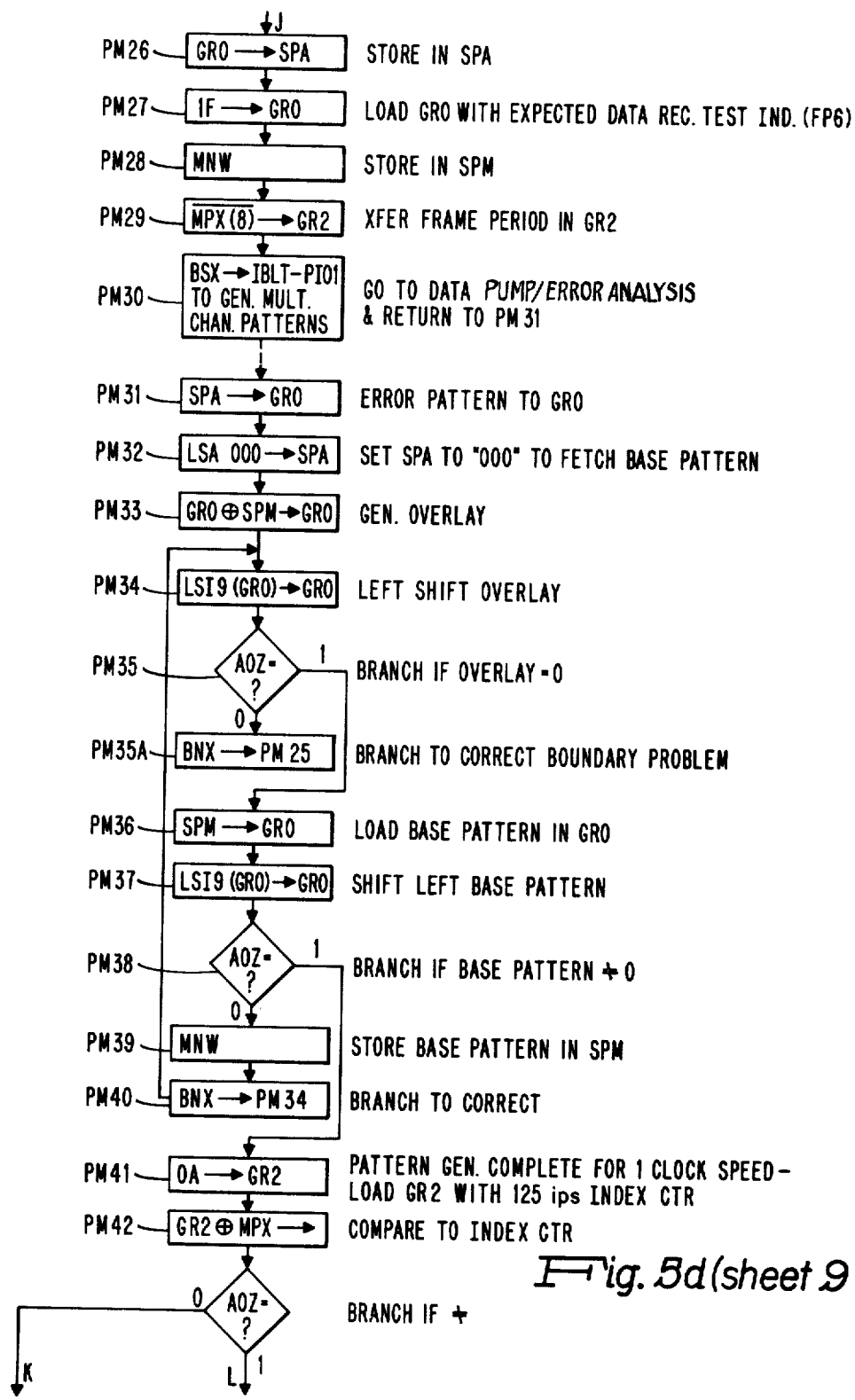
Fig. 5d (sheet 9 of 10).

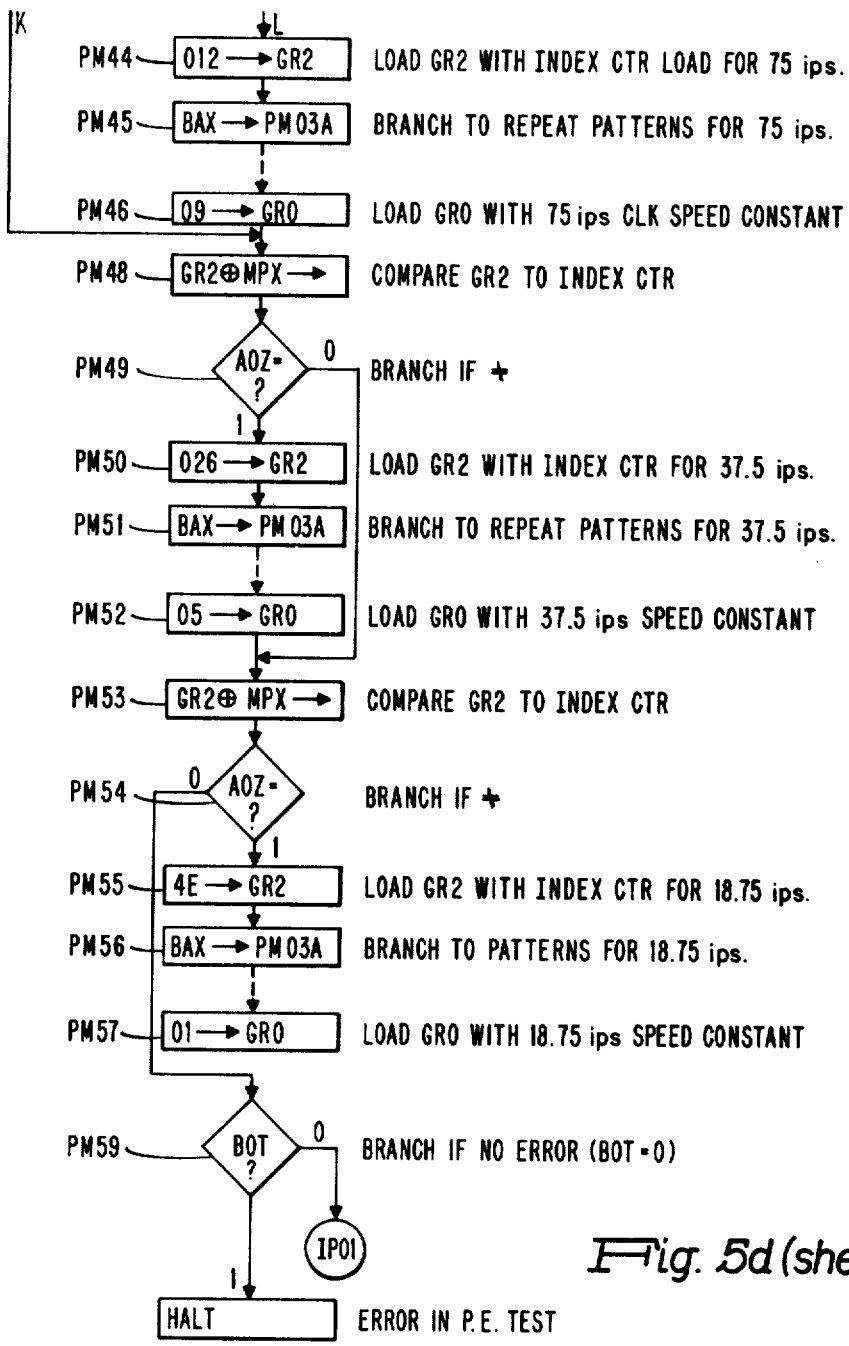
Fig. 5d (sheet 10 of 10).

DIAGNOSTIC TESTING APPARATUS AND METHOD

RELATED REFERENCES

1. U.S. Pat. No. 3,792,436 titled "Deskewing Buffer Arrangement Which Includes Means for Detecting and Correcting Channel Errors" invented by David D. DeVoy, George J. Barlow and John A. Klashka and assigned to the assignee named herein.

2. U.S. Pat. No. 3,803,552 titled "Error Detection and Correction Apparatus For Use In A Magnetic Tape System" invented by George J. Barlow and John A. Klashka and assigned to the assignee named herein.

3. U.S. Pat. No. 3,810,231 titled "Noise Record Processing For Phase Encoded Data" invented by David D. DeVoy, George J. Barlow and John A. Klashka and assigned to the assignee named herein.

4. Patent application Ser. No. 466,438 titled "Improved Deadtracking System" invented by George J. Barlow and Donald R. Taylor and assigned to the assignee named herein.

BACKGROUND OF THE INVENTION

1. Field of Use

The present invention relates to a system for diagnosing failures within a peripheral system and more particularly to a system for diagnosing possible sources of future failures in advance of the currents.

2. Prior Art

There are known systems which provide for automatically monitoring the operation of a machine to diagnose degradation of machine operations anticipatory to failure and for determining potential trouble souces of predicted failures. An example of such a system may be found in U.S. Pat. No. 3,787,670 invented by Paul E. Nelson et al., assigned to the assignee of the present invention. While the system disclosed in the patent provides for anticipatory diagnoses of failures, the system is required to perform such operations under the supervision of a central processing unit of the system in accordance with a particular program. A disadvantage of this type of arrangement is that the system resouces such as a central processing unit and associated input-/output facilities must be dedicated to the supervision of the diagnostic tests and required to be operating properly before such testing can proceed.

Other prior art systems provide for multi-channel error detection and correction diagnostic operations by utilizing patterns recorded on the magnetic media under the control of a peripheral controller. In this type of system, error patterns are recorded on the recording medium by placing the controller in a diagnostic mode. The patterns recorded are generated by the programmer using a controlling diagnostic program. After such recording, the patterns are read back during a normal mode of operation and the recovery apparatus corrects the error patterns verifying the operation of the readback circuits included within the recovery apparatus. The first disadvantage of this arrangement is that it must rely on the accuracy of the initial writing operation. That is, in creating a bit pattern on tape the occurrence of a write error could result in incorrect diagnosis of the recovery apparatus. Another disadvantage is that this type of check cannot accurately check the performance of the analog circuits (i.e. clock circuits) normally included in the data recovery apparatus.

Accordingly, it is a primary object of the present invention to provide apparatus for directly checking the operation of a peripheral controller.

It is another object of the present invention to provide for checking the operation of a peripheral controller independently of the information contained on the record medium of the devices controlled by the controller.

It is still a further object of the present invention to provide apparatus for checking the performance of recovery circuits included within a peripheral controller.

SUMMARY OF THE INVENTION

The above objects are achieved in a preferred embodiment of the present invention which comprises a microprogrammed peripheral controller including a processing unit having a read-only control store for storing micro-instructions, a minimum number of base bit patterns and control microinstructions used to establish a minimum operational capability within the data recovery apparatus of the controller. The controller further includes apparatus which in response to an externally applied control signal conditions the processing unit to perform a series of diagnostic testing operations. During one of the testing operations, the processing unit conditions the data recovery apparatus to receive groups of synchronization and data patterns arranged in a predetermined format generated under control of the read-only store through a predetermined path independently of the path used to apply data signals read from the medium into the data recovery apparatus. Error circuits normally employed to detect and correct errors occurring within the information read from the media are operative to store indications of the errors occurring as a consequence of introducing each group of patterns into the recovery apparatus. Upon completing the transfer of a group of patterns, the processing unit is conditioned to compare the state of these indicators with a predicted set of indicated values stored in the read-only store for determining the operational capability of the data recovery apparatus.

By having the patterns generated under control of the read-only store of the processing unit of the present invention, the controller is able to diagnose whether the clock circuits of the data recovery apparatus are operating marginally. That is, the processing unit is able to control accurately the time intervals at which patterns are introduced into the data recovery apparatus. This enables the performance of the clocking circuits to be checked accurately and reliably.

Another advantage of the arrangement of the present invention is that the operational capability of the controller can be established at initialization time independent of the operation of other subsystems and independently of the operation of the input/output devices connected to be controlled by the controller.

The novel features which are believed to be characteristic of the invention, both as to its organizaion and method of operation, together with the further objects and advantages will be better understood from the following description when considered in connection with the accompanying drawings.

BRIEF DESCRIPTION OF THE DRAWINGS

FIG. 3b shows in greater detail the pseudo clock circuits and channel failure circuits of FIG. 2.

FIGS. 5a through 5d are flow charts which show in greater detail the sequences of FIG. 4.

DESCRIPTION OF THE PREFERRED EMBODIMENT

Figure 1:
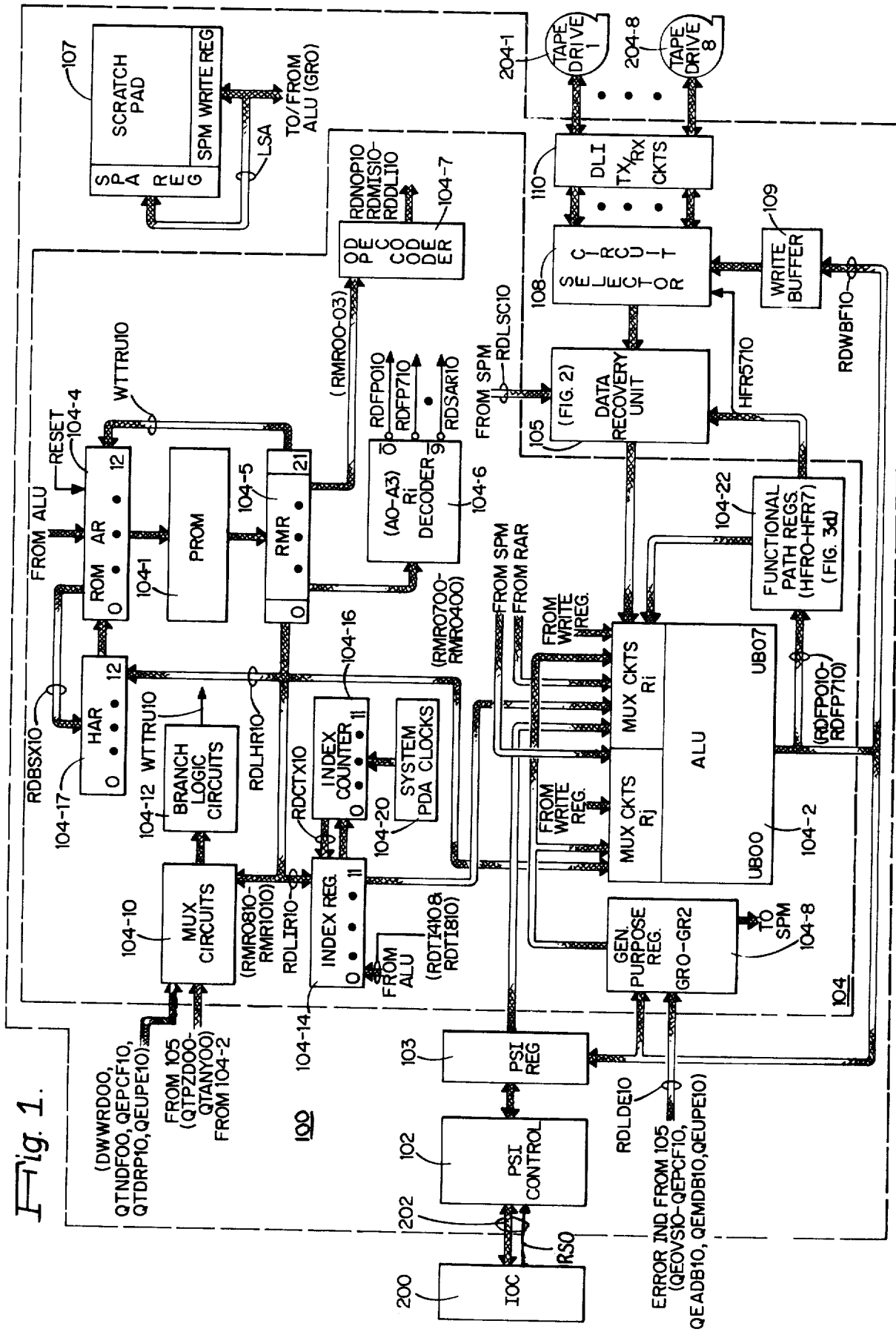
FIG. 1 shows in block diagram form a system which utilizes the teachings of the present invention.

FIG. 1 shows a peripheral processor or peripheral controller 100 which couples to a central processing unit of a data processing system via an input/output processor (IOC) 200. The peripheral controller 100 in response to commands received from the IOC 200 processes data characters received from any one of a number of magnetic tape devices/drives 204-1 through 204-8 via a selector circuit 108 and receive circuits (not shown) of block 110. The information characters or frames read from a selected magnetic tape device are processed by a data recovery unit 105 as explained herein. Information to be written on the magnetic tape device is transferred via the ALU 104-2 to a write buffer 109 and thereafter applied to the selected drive via selector circuit 108 and transmit circuits (not shown) included in block 110.

Commands and data are transferred between the IOC 200 and the peripheral controller 100 via a peripheral subsystem interface (PSI) 202. Such transfers are made in response to control signals generated by circuits included within the IOC 200 and the PSI control 102. For the purpose of the present invention, the circuits can be considered conventional in design. For example, the circuits may take the form of the circuits described in a copending patent application titled "Microprogrammable Peripheral Processing System" invented by John A. Recks et al bearing Ser. No. 425,760 which was filed Dec. 18, 1973 and is assigned to the same assignee as named herein.

In addition to various control lines and data lines used in connection with transferring and receiving informtion, the PSI 202 includes a reset out (RSO) line which is used by the IOC to reset and initialize the peripheral controller 100 to a known state. When not in use, the RSO line is reset to a binary ZERO state. The operation of this line is independent of an OPERATIONAL IN (OPI) line (not shown) included in the PSI 202 which is normally set to a binary ONE state whenever the peripheral controller is powered up and operational. The state of the OPI line signals the IOC 200 that the controller 100 is capable of accepting commands.

As seen from FIG. 1, the controller 100 includes a microprogram processing unit 104 which under the control of microinstructions stored in a programmable read only memory 104-1 performs the necessary operations for transferring information between a magnetic tape drive and the IOC 200. For example, in response to command code bytes received from the IOC 200, applied via the PSI control 102, PSI register 103 and an arithmetic and logic unit (ALU) 104-2, microinstructions are read out into a memory register 104-5 and decoded by decoder circuits 104-6 and 104-7. The decoder circuits cause a generation of various control signals which condition certain other portions of the controller 100 to perform operations necessary for executing the type of command specified.

Additionally, as seen from FIG. 1, signals from the memory register 104-5 are also applied to multiplexer circuits 104-10, conventional in design, which additionally receive control and status signals from other portions of the system such as the data recovery unit 105, for testing the results or progress of the particular operation as explained herein. Actual testing is accomplished by the branch logic circuits 104-12 which for the purposes of the present invention can be considered conventional in design. Also, signals representative of addresses contained within various types of microinstructions are applied from register 104-5 to a further pair of registers 104-14 and 104-16. The register 104-14 is an index register which is loaded via register 104-5 in response to a subcommand signal RDLIR10 or via the ALU 104-2 in response to subcommand signal RDT1410. The register 104-14 couples to an index counter 104-16 and is used to provide the required timing strobe signals necessary for writing or reading information characters to and from the write buffer 109 and the data recovery unit 105 respectively as explained further herein. The index counter 104-16 is decremented in response to PDA clocking signals generated by multifrequency system clock circuits 104-20. For the purpose of the present invention, these circuits can be considered conventional in design.

The register 104-17 is used as a history address register which allows proper sequencing through microinstructions stored in memory 104-1. For example, the history register 104-17 is operative to store a return branch address from the memory local register 104-5 until such time that the address is to be transferred to the read only memory address register 104-4. This address when transferred causes the register 104-4 to condition the memory 104-1 to select again a previous location within the memory allowing the continuance of a particular operation.

As seen from FIG. 1, the ALU 104-2 receives and delivers signals to the registers shown. The signals which are to be applied as operand inputs to the ALU 104-2 are selected via multiplexer circuits included therein. The ALU 104-2 and multiplexer circuits can be considered conventional in design and may for example take the form of circuits disclosed in a test titled "The Integrated Cicuits Catalog for Design Engineers", published by Texas Instrument, Inc., dated 1972.

The ALU 104-2 is connected to provide output signals to a plurality of functional path registers 104-22 which are used for control purposes such as for providing control signals to the data recovery unit 105 and storing hardware error conditions as explained herein. Each bit in each of the individual registers is used to indicate or to initiate a specific event or operation. The contents of these registers are examined by the microprogram processing unit 104 via branch circuits in order to ascertain the state of the controller during an operation as well as being used for internal timing and for enabling the execution of commands. More importantly, one of the bits (i.e. bit 7) of register HFR 5 is applied as an input to selector circuit 108 to enable it to connect write buffer 107 as a source of signals to the data recovery unit 105 instead of the normal source (e.g. selected tape drive) during write operations.

Additionally, the ALU 104-2 is also connected to transmit and receive signals to and from a plurality of general registers 104-8 (i.e. registers GR0 through GR2) which are used for storage of certain record processing information. More specifically, register GR0 is used to control the transfer of input and output data signals to and from a scratch pad memory 107. Hence, it serves as a memory local register for scratch pad memory 107. Register GR1 serves as an input buffer register for the scratch pad memory 107. Also, register GR2, similar to register GR0, provides temporary storage of information to be stored in the scratch pad memory 107.

The scratch pad memory 107 provides temporary storage for data, various control information and parameters required for executing read and write operations. As seen from FIG. 1 and mentioned above, both address and data are transmitted to and from the scratch pad memory 107 via the ALU 104-2 and general registers. The scratch pad memory 107 is of solid state construction and has 512 storage locations each containing 10 bit positions. The first 32 storage locations serve as a data buffer when the controller 100 is operating in a data mode (i.e. transferring or receiving data characters of a record). When in this mode, addressing of the scratch pad memory 107 takes place via a pair of address counters, write and read counters not shown. The contents of the read address counter are used to read out information from the locations of the scratch pad memory while the contents of the write address counter are used to write information into the scratch pad memory. For the purposes of the present invention, the operation of these counters for addressing the scratch pad memory 107 can be considered conventional in design.

The remaining storage locations of the scratch pad memory 107 are used for storage of device constants, control parameters for control of the controller and associated tape drives. Additionally, the scratch pad memory can be addressed by a scratch pad address register which receives information from the ALU 104-2 and the register is used when either control constants and parameters are to be sent to portions of the controller 100 or used for updating certain status information previously stored in scratch pad memory 107.

Figure 2:
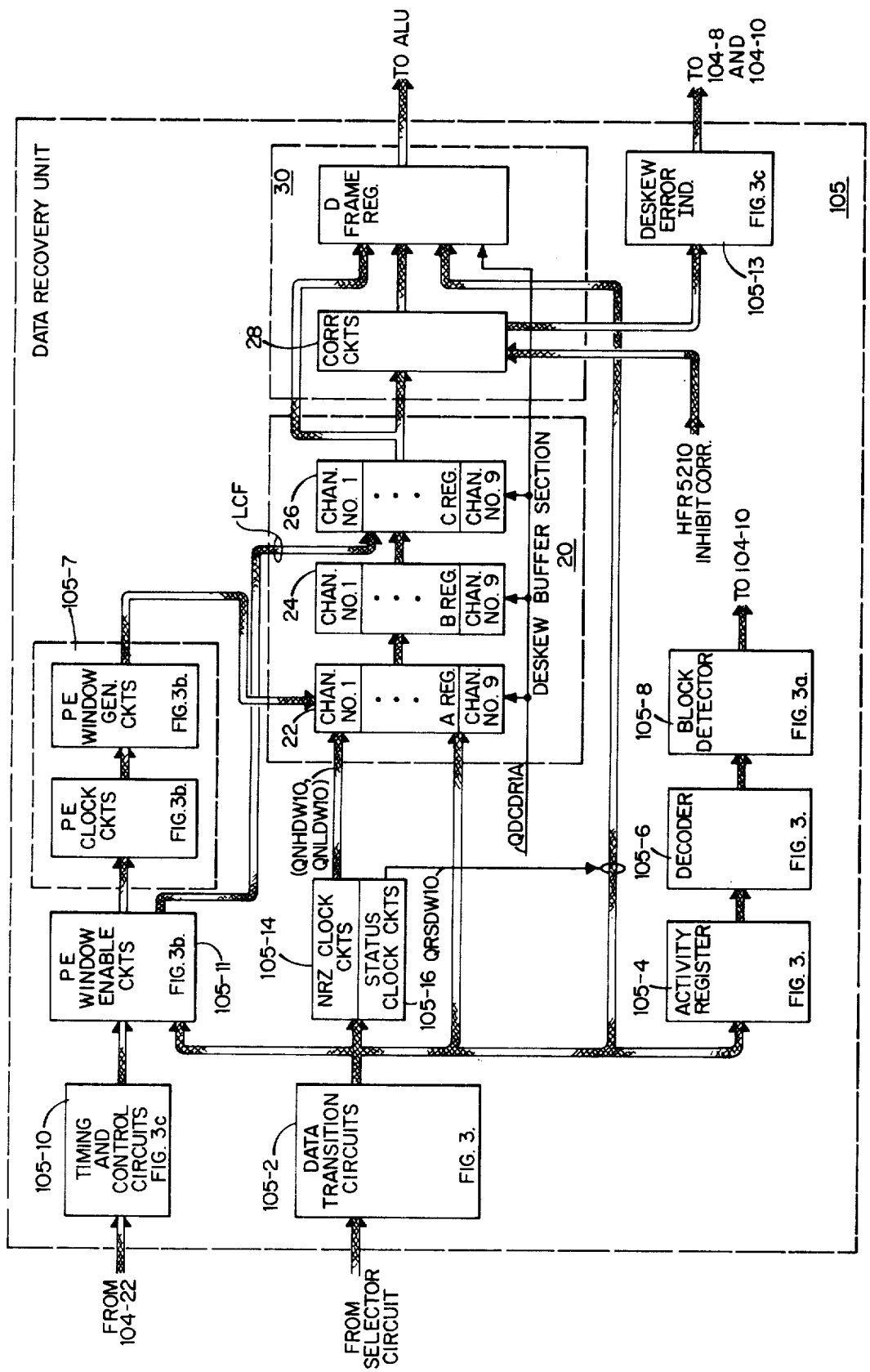
FIG. 2 shows in block diagram form the data recovery unit of FIG. 1.

Data Recovery Unit 105—FIG. 2

Referring to FIG. 2, it is seen that the data recovery unit 105 includes a deskew buffer section 20 including series coupled registers 22, 24, and 26. These registers are operative to deskew different types of encoded signals (e.g. phase encoded and non return to zero (NRZ) signals) representative of binary ONE and binary ZERO information into data characters assembled in register 26. The characters are then transferred to register 30 and the ALU 104-2 of FIG. 1. Each of the channel sections of each of the registers of the section 20 include a pair of synchronous or clocked flip-flops which derive their timing from the system PDA clock circuits 104-20.

When processng phase encoded signals, certain ones of the flip-flops included within registers 22, 24 and 26 receive clocking signals from individual pseudo clock and logic circuits of block 105-8. The clocking signals define intervals or "windows" during which the pulses representative of binary ONE and binary ZERO phase encoded information are to be sampled. The circuits for both the pseudo clock and window generation circuits are shown in greater detail in FIG. 3b and will be described in connection with that Figure.

It will be noted from FIG. 2 that all data pulses are applied through the transition detector circuits 105-2. Accordingly, these circuits detect the edges of data signals resulting from the recovery of non-return to zero (NRZ) recorded data. The data signal applied to the inputs of the transition circuits are asynchronous, that is, they are not synchronized to the controller timing. The synchronous flip-flops of the transition circuits 105-2 provide synchronous output signals to various portions of the controller and all other portions of the data recovery unit. As mentioned previously, the output signals from the circuits 105-2 feed the phase encoded window enable circuits which are operative to condition or enable the phase encoded clock circuits of block 105-4.

The transition circuits 105-2 also generate signals which are applied to the NRZ clock circuits and status clock circuits 105-14 and 105-16 respectively. By utilizing the edge of the pulses, the NRZ clock circuits establish timing signals or "windows" for detecting the low and high data signals. The NRZ clock circuits essentially include gating circuits conditioned by a mode control signal which is ANDED with the logical OR of the data transition detector output signals so as to have the leading edge of the earliest data transition signal produce a signal defining a window during which all of the nine channel output signals are sampled. For the purpose of the present invention, these circuits can be considered conventional in design.

Similarly, the status clock circuits develop window signals for transferring signals stored in the hardware status registers included within the tape devices. Normally, the transfer of these signals occurs a byte at a time and since there are no redundant groups of signals present (i.e. no low or high groups of signals characteristic of NRZ encoded data), the signals are directly loaded into the D register 30 since they do not have to be deskewed.

It will be noted from FIG. 2 that both the NRZ encoded data signals as well as the phase encoded data signals pass through the deskew buffer section. The arrangement facilitates implementation for both modes of operation since both normally require a certain amount of checking and correction based upon parity bit information included within each of the assembled bytes or characters. It will also be seen from the Figure that correction circuits included within a block 28 is selectively enabled in response to various mode signals. For example, during a read after write operation, a signal HFR5210 is used to inhibit the operation of the correction circuits so that checking is performed upon uncorrected information bytes. Of course, the correction circuits are normally enabled during read operation when it is desired to correct as much of the bytes as possible. This correction is done during the transfer of the information through the buffer section 20 just prior to loading of the assembled byte into the D register 30. As explained herein, the types of errors detected include single drop bit errors, uncorrectable parity errors, multiple drop bit errors, and overskew errors.

It will be noted from FIG. 2 that there is a plurality of registers which connect in parallel to the buffer section.

These registers include a data recovery register 105-4 which is operative to store indications of the data transitions as they occur and apply them to the input of a decoder 105-6 which is operative to reduce the signals to a predetermined number of output signals indications of which are stored within a block detector register 105-8. The output signals of the register 105-2 are applied to the processing unit 104 which is operative to detect the state of the signals as required. As explained in greater detail herein with reference to FIG. 3a, the block detector register 105-8 includes an any detector indicator circuit, a phase encoding zone detector indicator circuit, a phase encoding tape mark detector indicator circuit, a phase encoding identification burst detector indicator circuit, and phase encoding block detector indicator circuit. Each of these indicator circuits are testable during the execution of predetermined loops of mircroinstructions by the controller as explained herein.

Figure 3:
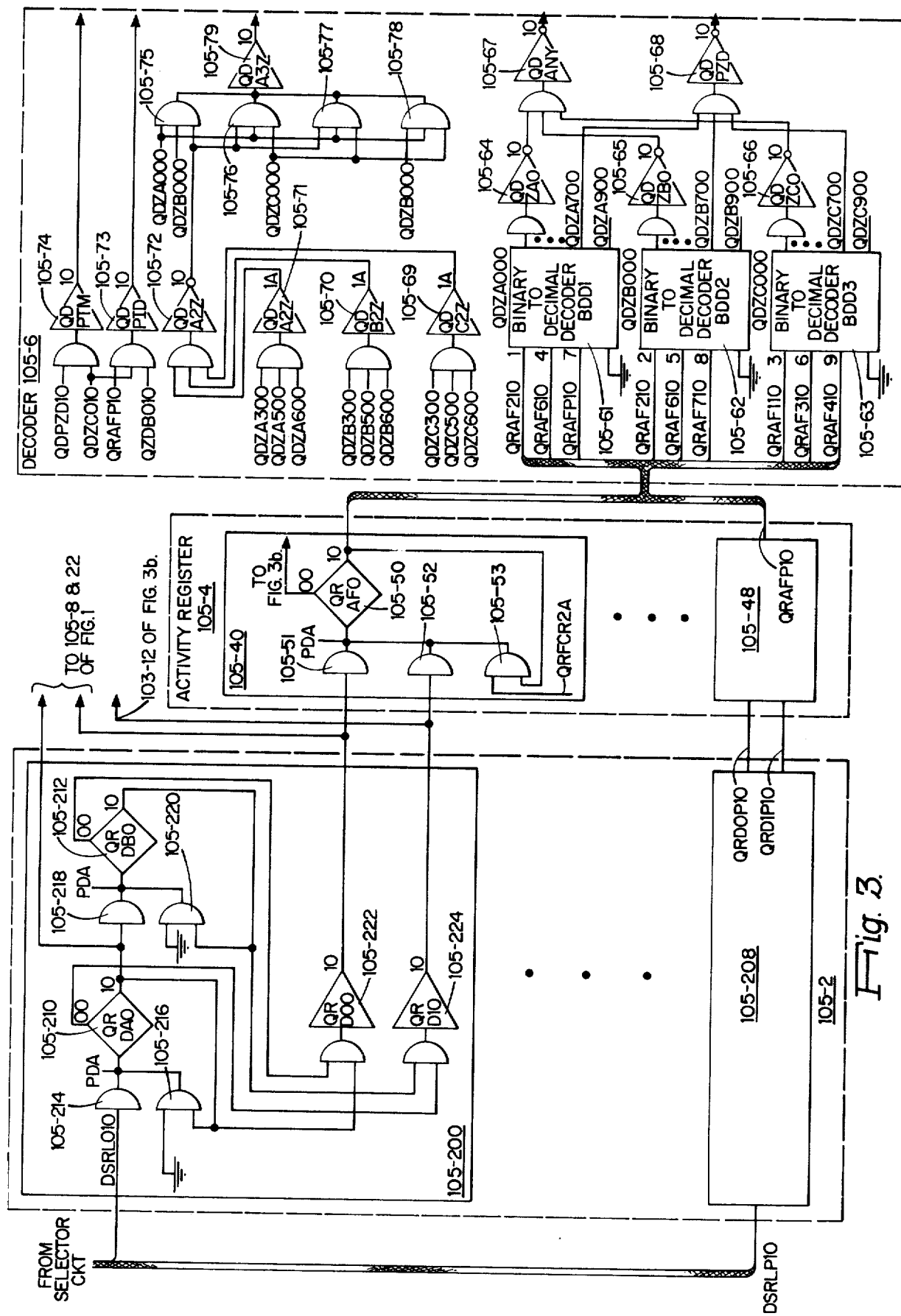
FIG. 3 shows in greater detail the transition circuits, the activity register and the decoder circuits of FIG. 2.
Figure 3A:
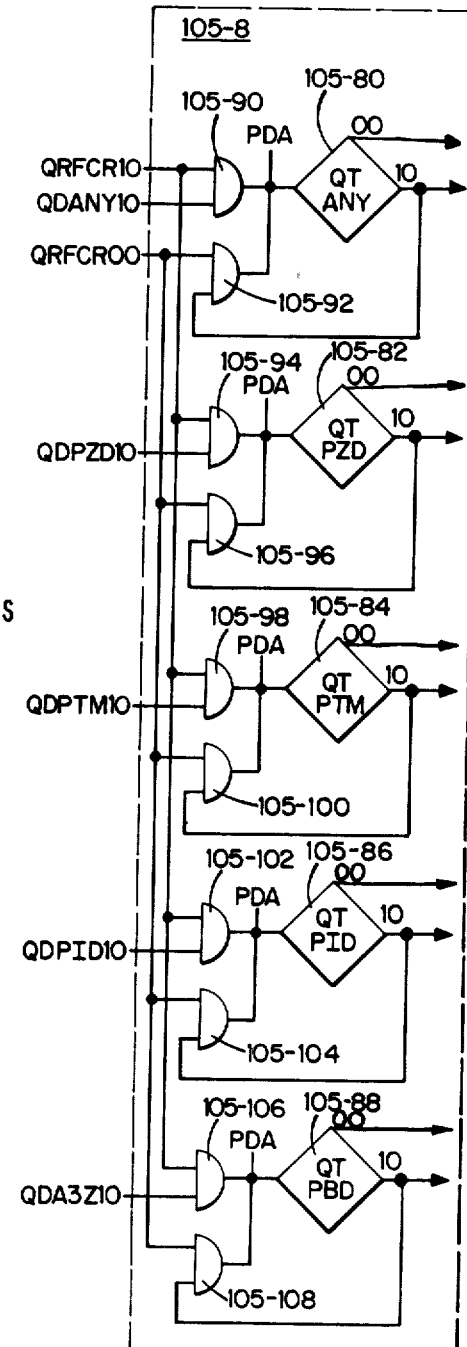
FIG. 3a shows in greater detail the block detector circuits of FIG. 2.

Activity Register and Detector Circuits—FIGS. 3 and 3a

The various portions of the above mentioned registers and circuits are shown in greater detail in FIGS. 3 and 3a. Referring to FIG. 3, it is seen that each channel includes a single activity flip-flop which is set in response to binary ONE and binary ZERO data pulses. Each of the flip-flops 105-40 through 105-48 include a pair of input gates (e.g. 105-51 and 105-52) which are connected to receive binary ZERO and binary ONE data pulses respectively from the transition detector circuits 105-2. A hold AND gate (e.g. gate 105-53) of each activity flip-flop is held on during the processing of each data record by signal QRFCR2A. The outputs of the activity flip-flops 105-40 through 105-48 are selectively combined in decoder 105-6. The decoder 105-6 includes a plurality of binary to decimal decoder circuits 105-61 through 105-63 which receive input signals from selected ones of the activity register flip-flops.

When one of the input signals to any one of the decoder circuits 105-61 through 105-63 is forced to a binary ONE, that decoder circuit forces a corresponding one of the output signals QDZA000, QDZB000 or QDZC000 to a binary ONE. That is, signals QDZA000 through ZDZC000 are binary ZEROS only when all of the three input signals to the corresponding one of the decoders are zeros. Each of these signals are inverted by a corresponding one of the AND gate and inverter circuits 105-64, 105-65 and 105-66 as shown. The output signals from these circuits are in turn applied to a further AND gate and inverter circuit 105-67. Thus, when any one of the signals QDZA000 through QDZC000 are forced to a binary ONE indicating that one of the input signals to one of the decoder circuits is a binary ONE, this causes AND gate and inverter circuits to be forced to a binary ONE. This in turn causes the any detector flip-flop 105-80 to be switched to the binary ONE state via an AND gate 105-90. When the flip-flop switches signal QTANY10 to a binary ONE, it signals that at least a minimum of one channel has received the signal and this normally signals the start of a record in the case of NRZI recorded information.

When all three input signals to any one of the decoder circuits 105-61 through 105-63 are binary ONES, that decoder circuit forces a corresponding one of the output signals QDZA700, QDZB700 or QDZC700 to a binary ZERO. This in turn causes an AND gate inverter circuit 105-70 to be forced to a binary ONE. This causes the phase encoding zone detector flip-flop 105-82 of FIG. 3a to be switched to a binary ONE state via an AND gate 105-94. When this flip-flop switches signal QTPZD10 to a binary ONE, it signals that a minimum of three channels in one of the three groups of these non-adjacent channels have received signals and that this may be the start of an actual record.

As explained herein, when the microprogrammed processing unit 104 detects that a predetermined number of successive frames have been detected measured by sampling the state of signal QTPZD10, it switches one of the flip-flops of a specified functional path register (i.e. register HFR5) to a binary ONE indicating the start of an actual record. For additional information regarding the selection of criteria for determining when an actual record has been sensed, reference may be made to the related references and in particular, U.S. Pat. No. 3,810,231 titled "Noise Record Processing for Phase Encoded Data" which issued May 7, 1974.

When a minimum of three channels have received the signals as indicated by signal QDPZD10 being in a binary ONE state and signal QDZCO10 being in a binary ONE state signaling that all of the input signals applied to decoder circuit 105-3 are binary ZEROS (i.e. channels 3, 6, and 9 are ZEROS) and AND gate and amplifier circuit 105-74 is operative to switch signal QDPTM10 to a binary ONE. This signals the detection of a tape mark binary coded frame which in turn causes the phase encoding tape mark detector flip-flop 105-84 of FIG. 3a to be switched to a binary ONE state via an AND gate 105-98.

It will also be seen that signal QDZCO10 is applied as one input signal to an AND gate and amplifier circuit 105-73. The signals QRAFD10 and QDZBO10 together with signal QDZCO10 cause the AND and amplifier circuit 105-73 to switch signal QDPID10 to a binary ONE when a special identification code termed a phase encoding identification burst is being received. These signals are identified as having all zeros in all channels except the parity channel (i.e. when signal QRAFP10 is a binary ONE). The PE identification burst signal QDPID10 causes the phase encoding I.D. burst detector flip-flop 105-86 of FIG. 3a to be switched to a binary ONE via an AND gate 105-102.

A plurality of AND gate and amplifier circuits 105-69 through 105-71 are operative to switch corresponding ones of their output signals QDA2Z1A through QDC2Z1A respectively when any two channels are receiving signals defined by the decoder circuit generated signals. The output signals from each of these AND gates are in turn applied to AND gate and inverter circuit 105-72 which in turn applied an output signal to a group of AND gates 105-75 through 105-77 which also receive predetermined ones of the output signals from the decoder circuits. The AND gates 105-75 through 105-78 are operative to cause an amplifier circuit 105-79 to force signal QDA3Z10 to a binary ONE when there is at least a binary ONE in each grouping or zone of channels. Signal QDA3Z10 in turn switches block detector flip-flop 105-88 of FIG. 3a to a binary ONE state via an AND gate 105-106. The signal QTPBD10 when a binary ONE indicates that any three channels are "active" (i.e. receiving transition signals).

Referring to FIG. 3b, it is seen that the pseudo clocks and circuits 105-8 include a pseudo clock circuit for each channel which can for the purpose of the present invention be considered conventional in design. For example, the clock circuit may include a voltage controlled oscillator circuit whose frequency is adjusted in accordance with the input data rate. Each psuedo clock circuit includes circuits which define a "window pulse interval signal" (e.g. signal QPDWO10) which in turn is used to drive a pair of series connected flip-flops 105-20 and 105-22 set and reset by AND gates 105-23 through 105-26 arranged as shown. A pair of AND gates and amplifier circuits 105-29 and 105-28 convert the window pulse signals into a set of pulses which define the 25% point and 75% point of a bit cell interval. Specifically, signal QP25O10 and QP25P10 respectively define the 25% points for the channels 1 and 9 buffer circuits. Similarly, signals QP75O10 and QP75P10 respectively define the 75% points for channels 1 and 9 buffer circuits.

Each of the clock circuits is enabled by a corresponding one of the circuits 105-12 through 105-21. The enabling and channel failure circuits of each channel include a channel failure flip-flop (e.g. flip-flop 105-120) with associated AND gates coupled for receiving signals representative of channel failure conditions indications of which are applied to AND gates 105-121 through 105-124. More particularly, the AND gate 105-121 is enabled when error detection circuits, not shown, included in a channel detect that a predetermined number (i.e. 3) of bits have been "dropped" by the channel. These circuits force a signal QRDB010 to a binary ONE each time the channel storage circuits fail to store a bit during a bit interval. A pair of signals QPCF01A and QPCF01B are forced to binary ONES to signal when the channel has dropped 3 consecutive bits. The AND gate 105-122 is enabled by signals QRAF000 and QPSDT1A being forced to ONES signaling the channel is inactive. The AND gate 105-123 is enabled by signals QP75O10 and QPOS010 being forced to ONES signaling an overskew condition in the channel (e.g. signals arriving too early as compared to the other channels). Each of the gates when enabled switch the channel failure flip-flop to a binary ONE. For further information regarding the error detection circuits, reference may be made to the list of related references.

The binary ONE output of the channel failure flip-flop is applied to the corresponding pair of flip-flops which comprise register 26 of FIG. 2. Additionally, the signal is forwarded to mtuliple channel failure circuits included in a block 32 shown in greater detail in FIG. 3c. These circuits decode the number of channel failures and signal the detection of multiple failures to determine the extent of correction which can be made to characters or frames assembled in register 26. The binary ZERO output signal of the channel failure flip-flop is applied as a hold input to an enabling amplifier circuit 105-130 which includes a pair of AND gates 105-131 and 105-132 arranged as shown. The enabling circuit of each channel (e.g. 105-130) forces its output to a binary ONE state in response to a pulse from one of the transition detector circuits (e.g. signal QRD1010) when the peripheral processor 100 forces a signal QFR501A to a binary ONE. When this occurs, the enabling circuit causes a further inverter circuit (e.g. inverter circuit 105-140) to switch its outputto a binary ZERO which in turn allows the clock circuits to generate "window timing signals" (e.g. signal QPDW010). Of course when the enabling circuits are inhibited from forcing the corresponding inverter output signals to binary ZEROS, the channel clocking circuits are inhibited from generating the window signals. It is only in response to these window signals that the 25% and 75% set of pulse signals are generated thereby allowing the channel to transfer data signals through the pairs of flip-flops comprising the deskew buffer section 20. For further information regarding the details of the buffer section 20, register and correction circuits 30 and error detection circuits 32, reference may be made to the previously cited references and in particular U.S. Pat. No. 3,792,436.

Continuing on with the description of the data recovery unit 105, it is seen from FIG. 3 that the data transition detector circuits 105-2 for each channel comprise a plurality of flip-flops (e.g. flip-flops 105-210 and 105-212) connected in series which are set and reset via pairs of AND gates (e.g. AND gates 105-214 through 105-220). The first flip-flop of each pair of flip-flops is set in response to change in state of signals representative of binary ONE and binary ZERO phase encoded information received from a selected tape device via selector circuit 108. The output signals from these pair of flip-flops are combined in a pair of AND gates which convert the input signal levels to pulses corresponding to a binary ONE and binary ZERO phase encoded data pulses. These gates correspond to AND gate and amplifier circuits 105-222 and 105-224. The output pulse signals are applied to the register 22 of FIG. 2, the pseudo clock circuits 105-8 and appropriate flip-flops which comprise the activity register 105-4.

Figure 3C:
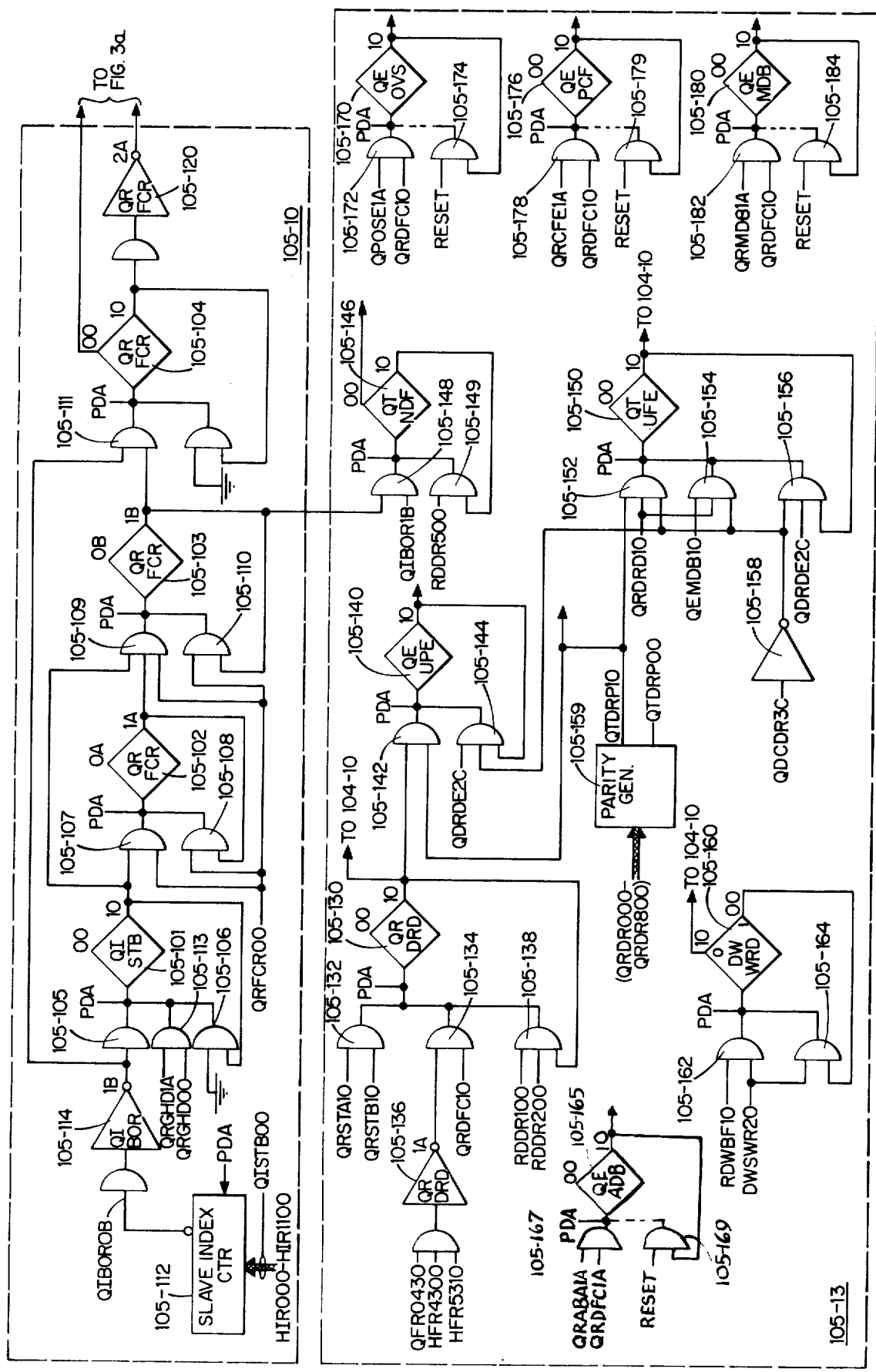
FIG. 3c shows in greater detail the timing and control circuits of FIG. 2.

Timing and Control Circuits—FIG. 3c

In the present peripheral processor 100, the timing and control circuits of FIG. 105-10 of FIG. 3c provide timing signals used in measuring certain time intervals for processing record frames of information. Referring to FIG. 3c, it is seen that these circuits include a pair of series connected clocked flip-flops 105-101 through 105-104 which include a plurality of gates 105-105 through 105-112 arranged as shown. The flip-flops 105-101 through 105-104, operate as a shift counter generating pulses at designated time intervals in response to signals from a slave index counter 105-112 included in the recovery unit 105 which establishes the time duration for the intervals. Specifically, the first flip-flop 105-101 operates as a 0.5 frame timer which is set via a signal QIBOROB applied via a gate and inverter circuit 105-114 each time the index counter 105-112 decrements to zero and after each frame interval as explained herein. The flip-flop 105-104 serves as a 1.5 frame timer and is operative to generate one PDA with pulses at 1.5 frame time intervals. The time intervals are established by presetting the slave index counter 105-112 with a count obtained from index register 104-14 in response to signal QISTB00 each time the counter 105-112 decrements to zero. Additionally, during the processing of NRZ signals, an AND gate 105-113 in response to a pair of signals QRGHD1A and QRGHD00 from the block 105-14 of FIG. 2 also presets the slave inex counter 105-112 after each frame interval. That is, upon the positive going edge of each NRZI high data pulse, the signals QRGHD1A and QRGHD00 derived from the transition detector circuits of FIG. 3a switches flip-flop 105-101 to a binary ONE which in turn presets the slave counter 105-112 to the count stored in index register 104-14.

Initially, the processing unit 104 loads index register 104-14 with a count via the ALU 104-2. The count loaded into the register 104-14 has a value 2 less than one half the frame time divided by the PDA clock rate. The value of two allows proper operation of the counter overflow logic circuits (i.e. requires 2 PDA clock pulses).

Various ones of these signals as for example, signals QRFCR10 and QRFCR00 are applied various portions of the system including the flip-flops of block register 105-8 of FIG. 3a. This means that these various flip-flops are set and reset at 1.5 frame intervals.

FIG. 3c further includes a plurality of control test and error indicator circuits 105-130 through 105-184 arranged as shown. The flip-flop 105-130 when set to a binary ONE via gates 105-132 through 105-136 indicates that the D output register 30 contains an assembled character or frame. The flip-flop 105-140 when set to a binary ONE via signal QRDRD10 and parity error signal QTDRP10 indicates that the register 30 contains a character with a parity error (i.e. correction was inhibited or the error had not been corrected) by the correction circuit 28). The flip-flop 105-146 when set to a binary ONE via AND gate 105-148 indicates the occurrence of a dropped frame for NRZI recorded information.

Similar to flip-flop 105-130, the flip-flop 105-160 when set to a binary ONE via AND gate 105-162 indicates when the write buffer 109 is storing a character or frame. The signal DWWRD10 when a binary ONE indicates that the buffer 109 has been loaded with a character. The flip-flop 105-150 when set to a binary ONE via gates 105-152 through 105-154 indicates that the D register 30 stores a character with an uncorrectable frame erorr. This results from the fact that the character has a parity error or contains more than one dropped bit. The multiple dropped bit condition is indicated when flip-flop 105-180 is switched to a binary ONE via AND gate 105-182. The parity generator-check circuit 105-159 generates a parity error signal for the character contained in the D register 30. Other error conditions corresponding to any dropped bit condition, an overskew condition and a channel failure are indicated by the binary ONE states of flip-flops 105-165, 105-170 and 105-176 respectively. These flip-flops are switched to binary ONES, for example, when signals from the circuits of block 105-11 are binary ONES (e.g. QRDB010, QPOS010 and QPCF010).

Figure 3D:
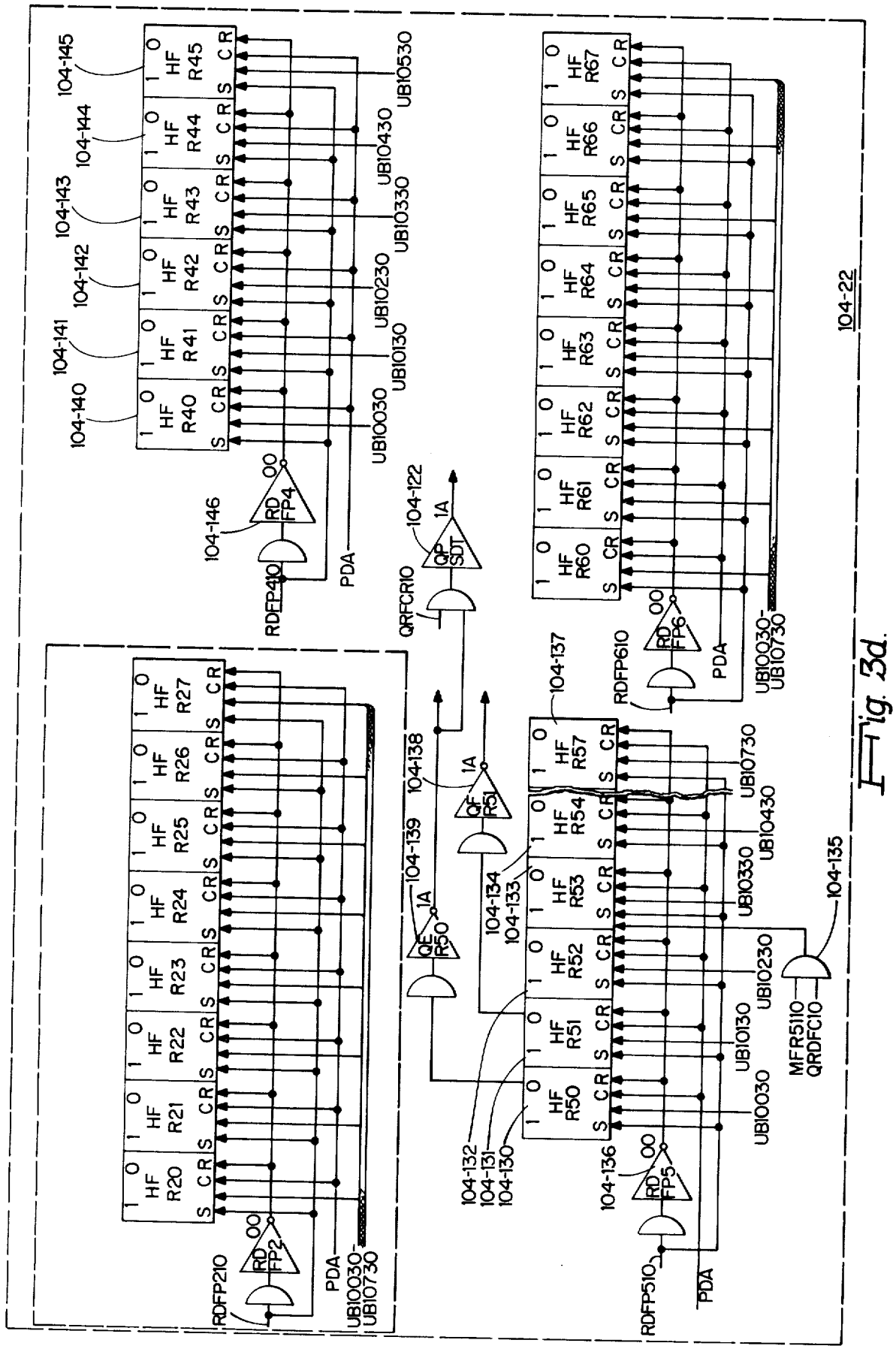
FIG. 3d shows in greater detail the functional path registers of FIG. 1.

Functional Path Registers—FIG. 3d

FIG. 3d shows in greater detail certain ones of the functional path registers inclued within block 104-22. Referring to the figure, it is seen that each register includes 8 flip-flops which are set to binary ONES in response to signals UB10030 through UB10530 via the ALU 104-2. For example, register HFR4 is forced to the state defined by signals UB10030 thrpough UB10530 in response to a control signal RDRP410 generated by decoder circuit 104-6. As discussed herein, flip-flops HFR40 through HFR45 contains status information relative to the operation of a 1 second timer, one frame timer, status, and NRZI mode of operation, a communication tag and beginning of tape condition respectively.

Similarly, functional path register HFR5 which includes flip-flops 104-131 through 104-135 and circuits 104-122, 104-136 through 104-138 is loaded with signals from the ALU 104-2 in response to a control signal RDFP510 generated by decoder circuit 104-6. As explained herein, the processng unit 104 switches flip-flop 104-131 to a binary ONE for enabling the PE clock circuits when it detects that five consecutive frames of a block have been processed signaling the presence of an actual data block. The processing unit 104 switches flip-flop 104-130 to a binary ONE indicating PE preamble mode operation when it detects that approximately 25 additional frames or characters have been processed. At this time, the clock circuits of the data recovery unit 104 which should be properly synchronized with the incoming channel signals are enabled for processing as explained herein. The flip-flop 104-132 is switched to a binary ONE by the processing unit 104 to inhibit correction of "bad frames" by correction circuits 28 of FIG. 2. When an all ONES' frames is detected, an AND gate 104-135 switches flip-flop 104-133 to a binary ONE indicating PE data mode of operation. The flip-flop 104-137 is used only for test operations performed in accordance with the present invention. When switched to a binary ONE, it enables "DLI turn around" allowing the processing unit and not the devices to serve as a source of record information. In these instances, the processing unit 104 accomplishes a switching of the functional path register flip-flops by executing microinstructions which cause constants to be delivered to the registers HFR4 and HFR5 via the ALU 104-2.

As seen from FIG. 3d, the binary ZERO output signals from flip-flops 140-130 and 140-131 are inverted by data and inverter circuits 104-137 and 104-138 respectively. Also, the inverted signal QF5011A is applied to an AND gate and amplifier circuit 104-122 along with timing signals QRFCR10 for generating a set dead track signal QPSDT1A which is applied to the channel failure circuits of FIG. 3b.

The flip-flops of registers HFR2 and HRF6 store status information for testing the results of various operations as explained herein.

Description of Operation of the Preferred Embodiment

Figure 4:
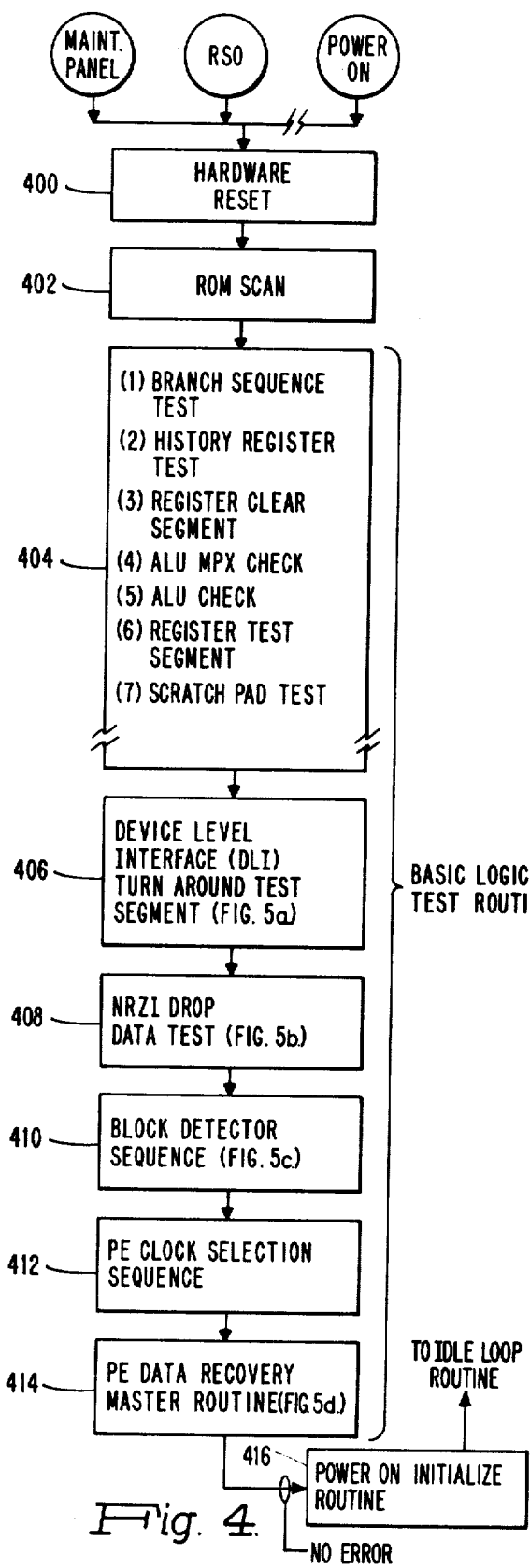
FIG. 4 is a flow chart used to illustrate the types of operations executed by the peripheral processor of FIG. 1.

With reference to FIGS. 1, 2, 3a through 3d, the operation of the present invention will be described with reference to the flow charts in FIGS. 4 and 5a through 5d. Referring to FIG. 4, it is seen that the first operation initiated is a hardware reset operation of block 400. As shown, the reset signal is generated when power is applied to the peripheral processor 100 either from a power control panel or from an auxiliary control panel. Also, a hardware reset operation takes place when the processor is initialized by means of signal supplied to line RSO via the peripheral subsystem interface or from the maintenance panel or auxiliary device. These actions produce the hardware reset signal and this signal conditions the processing unit 104 to begin the next operation which is a hardware read only store scan operation of block 402. The scan operation begins upon detection of the leading edge of the hardware reset signal which causes certain operations to be performed. These include forcing line OPI of PSI 202 to a binary ZERO, forcing the contents of the ROM address register 104-4 to ZEROS, resetting all error storage devices in addition to enabling these devices to be set upon the detection of any error condition occurring during the scan operation. During the hardware ROM scan operation, all ROM locations are accessed and checked for errors. The scan operation normally terminates upon the detection of a predetermined type of microinstruction from a location of the read only memory. For the purpose of the present invention, the scan operation can be considered conventional in design. Also, the scan operation may be carried out as described in U.S. Pat. No. 3,831,148 which is assigned to the same assignee as named herein.

At the completion of the ROM scan operation, the processing unit 104 branches to a microinstruction sequence which starts the series of basic logic test routines which check various portions of the processor 100. A first of these tests as indicated in FIG. 4 is a branch sequence test which checks the operation of the branch logic circuits. For the purposes of this invention, it can be considered conventional in design. Also, this test may be performed in the manner set forth in U.S. Pat. No. 3,728,690 which is assigned to the assignee named herein.

The next test as indicated in FIG. 4 is a history register test which verifies that correct transfers are taking place in the history address register 104-17 and memory register 104-5 via the data path shown. The register clear segment is used to check the operation of the functional path registers, general registers by forcing certain bit patterns into the registers and resetting them. Next, the ALU MPX check verifes the operation of the ALU, multiplexer and output selection logic circuits. Of course, this portion of the processor is checked since during execution of all commands, information passes through the ALU 104-2 and during arithmetic logic operations, different ones of the registers are selected by the multiplexer circuits for designating the source of the operands and where the result is to be delivered. Accordingly, the ability to select various ones of these registers is considered to be included within the "hardcore" requirements of the system. The test routine verifies the selection operations by loading zeros into all registers and ones to a particular register. Then, an operation is performed to modify the contents of one of the registers and all of the registers are checked to make certain that none of the other registers saw the effects of the modifications. Following this test, an ALU check routine exercises the ALU utilizing various logic and arithmetic instructions which operate on the contents of a pair of general registers, i.e. GR0 and GR2. The test also validates the proper operation of various indicators included within the ALU. It will be appreciated that the test verifies the ALU basic operation and is not a total check of the ALU.

The next test of block 404 is a register test segment routine which checks the operation of all of the registers in the system. The previous test checked the ability to clear each of the registers to zeros (i.e. register clear segment test). In this test, data patterns are forced into each of the registers and the contents checked to determine that the registers as well as the parity check circuits and logic circuits which store parity error indications are operating properly.

The next test routine is a scratch pad test routine which is not only used to check the memory arrays making use of the existing parity generation and checking circuits, but used to check the address capability of the scratch pad by utilizing a combined address selection check. It involves writing various patterns into the memory and thereafter reading out the patterns from memory for comparison with the patterns originally written.

Other test routines, not shown, verify the operation of the basic timer circuits included within the processing unit 104. Additionally, they test the operation of the read/write control counters of the scratch pad memory not shown, test the operation of the index counter, the one frame timer circuit, and one second timer circuit.

Also, the halt capability of the processing unit is checked. The halt sequence is entered whenever a condition has been detected by the processing unit which causes the processor to go off-line. The way in which various ones of these test routines are carried out can be for the purposes of the present invention considered conventional in design and may take the form of routines disclosed in the aforementioned patent.

Data Recovery Unit Test Routines

Included as part of the basic logic test routines are routines which verify that the data recovery unit 105 is operating properly. Not only do these tests verify that information can be transferred through the unit and properly recovered but these routines verify that such transfers proceed within the proper time. That is, the various test routines are appropriately timed so as to check for the correct information values and to test that the correct values are received at the correct time. This insures that the processor is working or operating in an optimum fashion. By checking the timing in this manner, the processor is prevented from continuing operation in a degraded fashion which would lead to steady increases in error rates and minor failures which would otherwise be correctable if detected earlier.

FIGS. 5a through 5d show in greater detail different ones of the test routines of blocks 406 through 414 which verify the operation of the data recovery unit. In general, the device level interface turn around test segment routine basically includes three subroutines:

1. a pattern generation subroutine (IBLT:DP);
2. a pulse generator subroutine (IBLT:DG); and,
3. a deskew data verification subroutine (IBLT:DC).

In general, the first routine is operative to create a pattern that is considered sufficient to test the data recovery unit 105. Next, the pattern is modified by the pulse generation routine which converts the pattern into timing pulses of a form that the data recovery unit 105 normally receives from a tape drive. This operation is equivalent to a writing operation and the timing waveforms generated are equivalent to those present when data has been written and it is being received back from the drive (i.e. read after write operation). The last sequence mentioned performs a test to determine that the information recovered by the data recovery unit 105 corresponds to the information being written and that the various error indicator circuits were set to the appropriate state. That is, the error indicator circuits were set to all ZEROS in the case of a good data pattern or set to predetermined binary ONE states for a "bad" data pattern.

The first series of patterns deal with verifying the operation of the data recovery unit 105 when processing NRZI recorded information. Of course, NRZI operation is selected because in this particular instance its operation is the least complex operation that the data recovery unit 105 is required to perform. The worst case patterns generated are as follows:

| Pattern # | M 0 1234567 | ERROR |
|---|---|---|
| 01 | 0 0 0000001 | 0 |
| 02 | 0 0 0000010 | 0 |
| . | . | . |
| . | . | . |
| 09 | 1 0 0000000 | 0 |
| 10 | 1 1 1111101 | 1 |
| 11 | 0 0 1110111 | 1 |
| 12 | 1 0 1010101 | 0 |

With reference to FIG. 5a, it is seen that the initial part of the sequence involves referencing microinstruction words from the PROM memory 104-1 which set various functional path registers to condition processing unit to operate in the desired mode. The mode is for NRZI 9 channel operation using odd parity. More specifically, signal QDCDR1A is forced to a binary ONE which in turn conditions the various registers of the deskew buffer section 20 together with the D register to reset each of the pairs of flip-flops contained therein. A next microinstruction is operative to force write buffer 190 to ONES which as explained herein forces the data recovery circuits to ZEROS. The following two microinstructions set bit positions 0, 1 and 3 of the functional path register HFR5 to binary ZEROS and set bit positions 2, 3, and 7 to binary ONES as shown in FIG. 5a. Also, bit positions 2 and 3 of the functional path register HFR4 are set to binary a ZERO and binary ONE respectively. The next microinstruction generates the first pattern which contains all ZEROS except for bit position 7. The following microinstruction when executed causes a branch to the pulse generation routine IBLT:DG.

The routine IBLT:DG takes the pattern generated by the pattern generation routine and converts it into low data and high data pulses which resemble the NRZI information signals normally received from a tape drive. The low data and high data pulses are generated such that the first pulse is a low data pulse having a two PDA width followed by a second high data pulse having a two PDA width separated by 6 PDA pulse widths.

Before describing the routine, it will be noted that the routine operates as a called routine in that the routine called returns control to the calling routine at whatever point it left. In general, all that is required to generate the first 9 patterns is to shift the initial pattern once and check via the ALU to make certain that the pattern is not equal to all zeros. Upon the next shift, the ALU will force the zero output signal to a binary ONE indicating that the routine has proceeded through the first 9 patterns. In the case of patterns 10 through 12, they are generated by loading constant values in contrast to shifting.

Referring to FIG. 5a, it is seen that the contents of the write buffer 109 are exclusively ORed with the contents of general register GR0 and the result is returned to the write buffer in response to the first microinstruction word. This serves to provide the appropriate signals corresponding to the leading edge of the low data pulse. The next microinstruction word when executed loads a constant of 2 into the scratch pad register of FIG. 1. The next microinstruction word DG03 conditions the ALU 104 to perform an exclusive OR operation upon the contents of the general register GR0 with write buffer register WBF and return the results to the write buffer. This causes the trailing edge of the low data pulse to be generated as indicated by FIG. 5a.

The next microinstruction DG04 decrements the contents of the scratch pad address register by 1 and the result is tested by a branch type microinstruction DG05. When the count is not equal to zero, the decrementing operation is repeated. When the count is equal to zero, microinstruction word DG06 is executed which conditions the ALU 104 to again exclusively OR the contents of the write buffer and general register 0. This is effective to set the leading edge of the high data pulse at a period of time greater than 6 PDA clock pulse. The next microinstruction word DG07, when executed, again transfers a constant of 2 into the scratch pad address register. In a similar fashion, microinstruction word DG08 when executed conditions the ALU 104 to exclusively OR the contents of the write buffer and general register O for generating the trailing edge of the high data pulse. Again, the stall count is tested for zero upon the execution of microinstruction word DG09 and decremented by execution of microinstruction word DG10 until the count has been decremented to zero. This causes the execution of microinstruction DG11 which tests the state of data ready flip-flop of FIG. 3c.

As illustrated by FIG. 5a, when the state of the data ready flip-flop is a binary ONE, this causes a branch to microinstrucion word DG13 indicative of an error condition since the pattern introduced into the deskew buffer section has arrived too early. In the event that the data ready flip-flop is still in a binary ZERO state, microinstruction word DG12 is referenced which again tests the state of the data ready flip-flip 1 PDA clock pulse later. If this flip-flop is a binary ONE, this indicates that the pattern had arrived at the correct time and causes a branch to the deskew data verification routine. In the event that the data ready flip-flop is still a binary ZERO indicating that the pattern is arriving too late, this causes microinstruction word DG13 to be referenced which causes a halt.

The execution of a half microinstruction suspends the peripheral processor operations. That is, microinstruction word FREEZES the contents of the ROM address register 104-4 which essentially "freezes" the states of indicators and storage registers within the system. This requires diagnosis of the faulty conditions to proceed from this point manually.

Assuming that the first pattern is transferred through the data recovery unit and received at the appropriate time, microinstruction word DC01 of the verification routine when executed compares the pattern from the deskew register (DRO) with the contents of the generated pattern contained in general register 0. This is done by conditioning the ALU 104 to perform an exclusive OR operation upon the contents of the two registers. Microinstruction word DC02 when executed tests the results of the comparison performed by the ALU 104-2 (i.e. tests the state of an ALU ALL ZERO indicator AOZ).

Assuming the comparison was successful in which case the result is ZERO, the microinstruction word DC04 is then referenced. This microinstruction when executed generates a subcommand signal RDLDE10 which loads the data recovery error indicators (i.e. signals QTDRP10 and QTUFE10 of FIG. 3c) into general register 2. Microinstruction word DC05 zeros out the unused bit positions in GR2 and microinstruction word DC06 when executed tests the state of the deskew parity indicator signal QTDRP10 which corresponds to the output of parity generator circuit 105–159 of FIG. 3c. If this indicator is not set to a binary ONE, a branch takes place to microinstruction words DC08 which test the state of the uncorrectable frame error indicator flip-flop 105—150 of FIG. 3c. In the event that the flip-flop has not been set to a binary ONE, the routine branches to microinstruction word DC10. This microinstruction word and the next microinstruction word tests to see whether the contents of GR2 contain all ones (generated pattern had bad parity) or contain all zeros (generated pattern had good parity).

As seen from FIG. 5a, when GR2 contains an all ZERO bit pattern, the processing unit 104 references microinstruction word DC13 which when executed causes a return to the data pattern routine and in particular to the next microinstruction word within the routine (i.e. DP06). This microinstruction when executed shifts the contents of general register 0 left 9 bit positions to generate the next and successive patterns which correspond to patterns 2–9. Microinstruction word DP07 checks the result to determine whether or not the routine is to branch again to the pulse generation routine or whether it is to next reference microinstruction word DP08 to generate patterns 10–12.

Assuming that the first 9 patterns have been generated and the arithmetic all zero indicator signal AOZ is set to a binary ONE, microinstruction word DP08 will be executed which causes a constant to be loaded into general register 0. Following the loading of the constant, microinstruction word DP09 causes a branch to the pattern generation routine which performs the same type of operations with respect to patterns 11 and 12 as illustrated by FIG. 5a. Also, the routines referenced in connection with pattern 1 are again referenced. Upon the execution of the last pattern, microinstruction word DC13 of the verification routine causes a branch of the NRZI drop data test routine of FIG. 5b.

The NRZI drop data test routine requires the same functions conditioned in the previous test to be conditioned for execution of the routine. In general, the NRZI drop data test causes a pseudo frame rate to be generated to test the drop frame indicator. More particularly, a frame is introduced into the data recovery unit 105 and after a predetermined precise amount of time, the circuits are checked to determine that the drop frame has been detected. This checks the operation of the slave index counter 104-16 which establishes the timing for the drop frame indicator. As mentioned, the slave index counter is included in the data recovery unit and is operated slave to the regulator index counter of FIG. 2. The slave counter is loaded also from the index register of the system but it is operated as free running within the data recovery unit.

The assembled frame is then transmitted to the processing unit 104. The routine also simulates the transfer of a low data pulse with no high data pulse. This corresponds to the instance where marginal information is transmitted from a tape device in which the information was passing the low threshold requirement but not the high threshold requirement. The peripheral processor includes clocking circuits capable of recovering marginal data and this test determines the capability of these circuits to recover the data as well as correct the data. Also, the routine checks the timing of the data ready circuits. Previous routines checked that data ready timing for a good frame of data. This routine is going to check the data ready timing for a marginal frame. Also, the routine checks the operation of the master index counter 104-16 by comparing the value of its contents at a specified time with an expected value.

Referring to FIG. 5b, it is seen that the first microinstruction word DD01 when executed clears the data recovery unit storage devices (i.e. forces signal QDCDR1A to 1). The next microinstruction word DD01A transfers a count of zero to functional path register 1 (i.e. bit positions 6 and 7) which places the counter in an off state. Microinstruction word DD01B causes the index register 104-14 of FIG. 1 to be loaded via the ALU 104-2 with the pseudo frame rate as indicated. The next microinstruction word when executed loads the frame rate into general register 0 while microinstruction word DD02A transfers the frame rate to the index register 104-14. Loading the low order 8 bits of the index register 104-14 in turn causes the master index counter 104-16 to be loaded from the index register. During the test routine, it will be noted that the largest frame count that the controller 100 is required to handle is utilized (i.e. it is set equal to the slowest tape speed—18¾ inches per second and the lowest density of 200 bits per inch). By checking the operation of the system utilizing the largest values, this will assure proper operation of all values.

Microinstruction word DD03 establishes the appropriate pattern by causing the exclusive OR of the write buffer contents with the result being returned to the write buffer. This sets a leading edge of the low data pulse. Microinstruction word DD04 forces the pattern of 01 into bits 6 and 7 of functional path register 1 which is effective to set the index counter to be responsive to PDA clock pulses. Microinstruction word DD05 establishes the trailing edge of the low data pulse while microinstruction DD05A causes a delay of 2 PDA clock pulses. It is at this time that the slave index counter 105-13 is loaded from index register 104-14. Microinstruction word DD06 loads a stall constant into the scratch pad address register and microinstruction word DD07 resets the drop frame indicator flip-flop of FIG. 3c.

Microinstruction words DD08 and DD09 together cause a delay of 12 PDA clock pulses at which time the state of the data ready flip-flop of FIG. 3c is tested in response to microinstruction words DD10 through DD12. The data ready flip-flop should be in a binary ZERO state 17 PDA pulses following the trailing edge and it should be switched to a binary ONE state 18 PDA pulses after the trailing edge. Thus, by testing the state of the ready flip-flop, the timing to within 1 PDA clock pulse is checked to determine that the bit patterns signals were passed through the data recovery unit 105 and arrived precisely at the correct clock time interval. If it is determined that it has not arrived at the correct time interval, microinstruction word DD13 is referenced and causes a halt. Microinstruction word DD12 checks to see that data ready flip-flop holds its set state (i.e. checks recirculation gate operation).

The next series of microinstruction words check the timing with respect to setting the NRZI drop frame flip-flop 105-140 of FIG. 3c. As seen from FIG. 5b, microinstruction words DD13A and DD13B cause counts of 50 and 16 to be loaded into general register 2 and the scratch pad address register respectively. Microinstruction words DD13B through DD13F are executed 50 times until the count originally stored in general register 2 is decremented to zero. This is followed by the execution of microinstruction word DD13G in which the functional path register 1 is loaded with zeros forcing the index counter to enter a stopped mode of operation. Microinstruction word DD13H causes the transfer of the index counter contents to the index register of FIG. 1.

Microinstruction words DD14 through DD16 test the state of flip-flop 105-140 and in the event that the flip-flop was set early or late, microinstruction word DD17 causes the system to halt operation. Because the system is conditioned to operate at the slowest drive speed and at the slowest frame rate, the transition in state of the flip-flop 105-140 is delayed a considerable amount of time before the change of state from an off condition to an on condition is checked. More particularly, the following provides the timing of the NDF flip-flop relative to the various constant employed. The flip-flop NDF equals 1 at +1924 PDA pulses following the trailing edge of the low data pulse (3 times frame rate plus 4 PDA clock pulses). When the NDF flip-flop is set early, this occurs at +1923 PDA clock pulses. The repeated stall loop may be expressed as follows:

Delay =
(N + 1) 2 + 4) (M − 1) + (N + 1) 2 + 2 = 2 (MN + 3M − 1)
where M = 50, N = 16 and

| Stall interval | (#13B = 13F) | = 1898 PDA; |
|---|---|---|
| + 22 | (#05 = 13B) | = 1920 PDA; |
| + 2 | (136 = 13H) | = 1922 PDA. |

The latter part of the test routine including microinstruction words DD18 through DD24 checks the operation of the master index counter. The contents of the master index counter is compared to a predetermined value. If the counter agrees with the predetermined value, microinstruction DD23 is executed which causes the next test to be performed. In the event that the master counter does not compare, the system is brought to a halt by microinstruction word DD24.

As seen from FIG. 4, the next basic logic test is a block detector sequence test of block 410 shown in greater detail in FIG. 5c. The block detector routine when executed by the processing unit 104 is arranged to simulate each of the 512 possible data patterns and check the block detector indicator flip-flops of FIG. 3a for each pattern verifying the operation of each of the indicators. The contents of functional path register 2 are used to store the expected state of the block detector indicators and if the expected state does not compare with the actual state, the routine comes to a halt.

As mentioned previously, the following indicates relationship between the data channels, tape tracks and zones:

| DATA CHANNEL | P01234567 | 573P21064 | DATA CHANNEL |
|---|---|---|---|
| TAPE TRACK | 476539182 | 123456789 | TAPE TRACK |
| ZONE A | 11XXXX1XX | 1XX1XX1XX | ZONE A |
| ZONE B | XXX1XXX11 | X1XX1XX1X | ZONE B |
| ZONE C | XX1X11XXX | XX1XX1XX1 | ZONE C. |

As mentioned previously, the ANY storage indicator is set when a bit of a channel is switched to a binary ONE, the phase encoded zone detector is set if any one of the zones A, B or C are switched to binary ONES, the phase encoding tape mark flip-flop is set when zone C contains binary ZEROS and the PZD flip-flop is set to a binary ONE, the phase identification burst flip-flop is set to a binary ONE when zone C and zone B are binary ZEROS and bit P is switched to a binary ONE and the phase block detector flip-flop is set when the PZD flip-flop is a binary ONE or any three bits are binary ONES. As seen from FIG. 3d, for the purpose of the present test, the flip-flops of functional path register 2 correspond as follows:

F20 = ANY; F21 = PZD; F22 = PTM; F23 = PID; F24 = PDB; F25 = X; F26 = X; and F27 = X.

The X indicates a don't care situation. It should be noted that functional path register 2 is used for various operations and this particular operation involves storing the expected results for testing the block detector indicator circuits.

Referring now to FIG. 5c, it is seen that all possible data patterns are applied to the data recovery unit to test the indicator circuits. It will be appreciated that these circuits are such that minor failures could go undetected for a substantial period of time and lead to marginal operation with no apparent detectable error condition.

Each of the possible data bit patterns are introduced into the data recovery unit and the resultant state of the indicative flip-flops are compared to a predicted state and anything other than a true comparison halts system operation. Each data pattern is introduced into the data recovery unit twice since the block detector circuits are required to respond to both positive and negative going transitions of a normal data waveform. Each pattern is introduced as a positive going transition upon setting the pattern into the write buffer and then as a negative going transition pulse upon resetting the pattern previously stored in the write buffer.

With reference to FIG. 5c, it is seen that a first group of microinstruction words form a set-up procedure which sets up the registers used to execute the routine. For example, it will be noted that the index register is loaded with a high speed frame rate since the lower speed frame rates have been tested by the previous tests. Thus, a very small number is loaded into the index counter and the routine is executed at a very fast rate. It is seen that microinstruction word BK06 tests for an all zeros pattern, the easiest pattern to simulate. If it is an all zeros pattern, a branch is made to microinstruction word 41 which bypasses the simulation portion of the routine. Assuming that it is a non-zero pattern, microinstruction word BK07 is referenced and this microinstruction together with the following microinstruction generate the equivalent states of the zone detector circuit and block detector circuit. Microinstruction word BK17 causes a branch to microinstruction word BK29 to test for the presence of a tape mark frame. A tape mark frame can be considered as being a subset of the test for the zone detector (i.e. note conditions under which the tape mark flip-flop is set to a binary ONE state). So at those points in which certain known results are obtained, the routine branches to microinstructions for performing the actual test. The first group of microinstruction words starting with microinstruction word BK41 forms part of a synchronization arrangement which tests the state of the NRZI drop frame flip-flop to find out the state of the slave counter. Specifically, when this flip-flop is switched to a binary ONE, it indicates that the slave counter has completed a cycle of operation. Microinstruction word BK43 forces a pattern into the write buffer and microinstruction word 45 tests to determine the time at which the dropped frame flip-flop is set again indicating the end of another cycle. In this manner, the time interval for a cycle can be precisely timed particularly since the previous routine determines that the flip-flop has been operating within desired time constraints.

Microinstruction words BK47 through BK55 test the states of each of the block detector flip-flops and stores the results in general register 2. Microinstruction word 57 when executed compares the states of these indicators with a predicted state stored in functional path register 2. Microinstruction words BK58 and BK59 produce a halt when there is not an identical comparison. The first sequencing through the routine involved a leading edge data pattern. As indicated by FIG. 5c, the routine is repeated and produces a trailing edge pattern by effectively resetting the equivalent data contents of the write buffer so as to produce a negative to positive transition (i.e. microinstruction word BK43). The simulated result should be the same and thus, microinstruction words BK42 and BK45 test the state of the dropped frame flip-flop between the interval of complementing the contents of the write buffer to generate the correct transition. Again, the results are tested and when the pattern has been introduced twice, microinstruction word BK62 checks the contents of GR0 for ONES (i.e. signal AO1N=0 when GR0 = all ONES). If the GR0 contains all ONES, that indicates that the test patterns have been completed. When the test pattern is not all ONES, microinstruction word BK61 when executed increments the pattern contained in general register 0 and stores it in general register 0 and general register 2. Microinstruction word BK66 tests for a 256 boundary condition since the system provides only for an 8 bit increment and in case of the 9 bits, the routine senses for the zero condition at which time the 9th bit is set to a binary ONE in order to complete generation of the 512 patterns. The remaining microinstruction words are used to check the hardware circuits associated with the processing of the cyclic redundancy check character. A Mirrormap microinstruction word swaps the left and right bits. The CRS microinstruction performs the feedback shift function used in CRC calculations. For each cycle, the residue is stored in a scratch pad location in response to microinstruction word BK71. Microinstruction word BK72 when executed causes a branch back to microinstruction word BK4 for generation of the next pattern. After the last pattern has been applied to the data recovery unit, the residue stored in the scratch pad memory is fetched and exclusively ORed with the contents of GR0 which should have a predetermined result (i.e. 09A). Since this particular operation relating to the checking of the cyclic redundancy check computation operation is not pertinent to the present invention, no further explanation will be given herein.

From FIG. 4, it is seen that the next basic logic test performed is a PE clock selection sequence of block 412 which operates to verify circuits which select device speeds. Since the manner in which this test if performed is not pertinent to the present invention, it is assumed by way of example that the test has verified that the circuits which select device speeds are operating properly.

Data Recovery Test Routine—General Description

The next test performed is the data recovery test routine 414 of FIG. 4 which is disclosed in greater detail in FIG. 5d. This test is the most pertinent with respect to the subject invention. Briefly, this test causes groups or blocks of patterns arranged in a predetermined format corresponding to blocks of data recorded on the magnetic medium to be cycled through the data recovery unit, the clock circuits, the deskew buffers, and other circuits associated therewith. The data patterns include good data patterns, 9 single channel failure data patterns and overskew data patterns in each of the 9 channels and data patterns which include all possible combinations of two channel failure tests. In general, approximately 55 blocks containing different patterns are passed through the data recovery unit when the unit is running in each of the four possible device speeds (i.e.

125 inches per second—ips, 75 ips. 37.5 ips and 18.75 ips). As explained herein, with reference to FIG. 6, a block includes a preamble portion having a synchronizing group of signals, sets of data signals, marking signals followed by another set of synchronizing signals of a postamble.

During the execution of the routine, the standard data recovery test indicator circuits utilized during the deskewing of phase encoded data are monitored. Also, in response to executing a particualr microinstruction word (LRE) microcommand, all of the data recovery test indicators stored are compared with a predicted set of values for the indicators.

The data recovery routine includes two main portions: a master routine which loads the various parameter information, predicts the error failures and performs other operations required for testing; and a second routine termed a data pump routine. A first part of the data pump routine termed an interface routine, performs operations for starting the transfer operation. That is, it conditions the processing unit to generate the patterns comprising a block. The other parts of the routine perform all the necessary operations of transferring the block patterns to the recovery unit, monitoring and error analysis relating to the transfer and the obtained results.

Unlike the previous routines described, the data recovery routine does not force the system to halt upon encountering a specific error. By contrast, it sets an indicator which causes the system to stop at the end of an entire test. Thus, if a data pattern is detected to be bad, it is repeated until it passes the test while an indication of the error has been stored. This allows maintenance operations to be performed more easily in that the controller can be made to loop on error conditions.

Before considering the operation of the routine, it will be pointed out that the various registers and the type of information stored during this operation are as follows:

| Register Designation | Type of Information Stored |
|---|---|
| SPA: | ERROR PATTERN |
| GR0: | WORK |
| GR1: | DATA HISTORY |
| GR2: | DATA PATTERN |
| PSI: | PREAMBLE COUNTER |
| Full and Abbreviated Register Designation | Type of Information Stored |
| SPM: | EXPECTED VALUE OF FP$_6$ |
| HFR2 = FP2: | EXPECTED DATA RECOVERY ERRORS |
| HRF20 = F20 | 1 |
| HFR21 = F21 | MULTIPLE DROPPED BITS |
| HFR22 = F22 | UNCORRECTABLE PARITY ERROR |
| HFR23 = F23 | 1 |
| HFR24 = F24 | 1 |
| HFR25 = F25 | PE CHANNEL FAILURE |
| HFR26 = F26 | OVERSKEW |
| HFR27 = F27 | ANY DROPPED BIT |
| HFR6 = FP6: | READ CONDITION LOG |
| HFR60 = F60 | AZF NOT SET DURING POSTAMBLE |
| HFR61 = F61 | PDM DID NOT SET |
| HFR62 = F62 | UFE NOT SET DURING POSTAMBLE |
| HFR63 = F63 | PCF TEST INDICATOR SET |
| HFR64 = F64 | AZF SET DURING DATA |
| HFR65 = F65 | UFE SET DURING DATA |
| HFR66 = F66 | DATA COMPARE ERROR |
| HFR67 = F67 | 1. |

Description of Overall Operation of the Data Recovery Routine

Considering the operation of the routine, and in particular the master routine, it is seen from FIG. 5d that at the start, the first operation that the master routine specifies is to preset the write buffer 109 contents to give the "gap state" (i.e. passing through the gap of the magnetic tape). By loading an all ONES pattern into write buffer 109 causes an all ZEROS pattern to be applied to the data recovery unit 105. It is microinstruction word PMO1 that loads the write buffer 109 to the gap state. Microinstruction word PM02 when executed causes a "speed constant" for a speed of 125 ips to be loaded into general register GR0. This constant conditions the phase encoded clock circuits to respond to input data signals at the appropriate rate. For the purpose of the present invention, the clocking arrangement can be considered conventional in design. The constant starts the clock circuits at the highest speed. Further microinstructionn words set up the appropriate values for the index counter of FIG. 1 which controls the frequency at which information is to be written. Further microinstruction word when executed causes the transfer "speed constant" to the speed constant register not shown included in the unit 105. Another microinstruction word is executed creating a stall condition or delay for allowing settling of the clock circuits. That is, there is a period of time that is given to the clock circuits to allow them to adjust to the selected speed and this is done during the interrecord gap of the tape when the tape drive is getting up to speed.

When the stall count has been decremented to zero, microinstructions set the index counter to the proper count and forces the scratchh pad address register to the error pattern which indicates which channel or channels have errors. During a "first pass" through the routine, the scratch pad register is loaded with all ZEROS indicating no errors. Also, general register GRO and then the scratch pad memory are loaded in succession with the expected values of functional path register FP6. Similarly, expected values of general register GR2 are loaded into functional path register FP2.

Following the storing of the various information in the various registers, a microinstruction word causes a branch to the beginning of the data pump routine, (PI). Referring to FIG. 5d, it is seen that microinstruction words PI01A and PI01B cause the index counter to be set to a value which causes a delay of 400 microseconds. This delay is to allow the clocks to recover from errors generated on other passes through the routine. Microinstruction word PI01C tests for overflow of the index counter. When overflow appears, a sequence of microinstruction words clear functional path registers EP4, EP5, and EP6 to certain predetermined states. Microinstruction word PI9 is operative to force functional path register EP3 to the appropriate state for generating a tape mark pattern as explained in greater detail hereinafter.

Microinstruction word PI10 loads the PSI register with the appropriate preamble count while microinstruction word PI11 sets the frame rate for the index counter. As seen from FIG. 5d, the microinstruction words PI12 through PI17 establish various initial conditions such as transferring the initial or base pattern to general register GR2, enabling the DLI turn around circuits and phase encoded clock circuits, clearing the data recovery registers, setting the index counter to the PDA mode of operation, setting the write pulse enable circuits for writing and loading the write buffer 109 with a value that causes the resetting of the write buffer ready flip-flop of FIG. 3c.

The next portion of the routine generates from stored basic patterns the groups or block of patterns which are applied as an input to the data recovery unit. These patterns formatted to resemble the characteristics of data blocks normally received by the recovery unit 105 include: a shortened preamble portion which includes 15 all ZERO frames effective to set a predetermined one of the phase encoded flip-flops of FIG. 3d, another all ZERO frame, followed by 5 frames when overskew is desired (a pattern of 11111 in the channel to indicate the error), an all ONES frame, 9 frames of shifted ones (representative of good patterns), 9 frames of shifted ones using an error pattern (representative of bad patterns), followed by 5 all ZERO frames which simulate the postamble portion of the data block. Normally, the preamble portion of a block of recorded data on magnetic tape comprises 41 frames. However, 15 frames are used because this represents a minimum number of frames required for synchronizing the phase encoded clock circuits to operate at a nominal frequency. Thus, this will enable the controller to determine that the data recovery unit 105 is operating properly and not in a marginal fashion.

As seen from FIG. 5d, the all ZEROS pattern is continuously applied to the data recovery unit 105 and when the preamble count has been decremented to zero and is tested by microinstruction word PPO4, this causes the appropriate bit position of functional path register 5 (i.e. bit position HFR51 of FIG. 3d) to be set to a binary ONE. When the count is not equal to zero, that microinstruction word is skipped and when it is equal to all ones, further microinstruction words perform checking operations relative to overskew patterns. As seen from FIG. 5d, when the pattern is not all ONES, general register 0 is loaded with an all ONES pattern and the routine tests again for the write buffer ready flip-flop to be set to a binary ONE.

From this, it can be seen that first a pattern of alternating ZERO transitions and ONE transitions are sent which corresponds to the data and phase information bits respectively of the phase encoded preamble information. The decrementing of the count is accomplished during the ZERO or data transition. Following the sending of the ONE transitions, the routine returns to microinstruction word PPO1 via the execution of a branch microinstruction word PP10 as shown.

As mentioned, the count stored in the PSI register is first decremented to zero which causes the preamble mode flip-flop of FIG. 3d to be switched to a binary ONE. On the next pass through the sequence, the counter will decrement to an all ONES count indicating the completion of simulating the processing of the preamble portion of a block which will cause a branch to microinstruction word PP11 which test for overskew. Bit position 6 of the functional path register EP2 serves as a flag indicating whether or not an overskew error is to be received. When an overskew error is to be received, overskew patterns will be generated by the following group of microinstructions. That is, these microinstructions cause an additional 5 frames of nominal preamble patterns which include binary ONES in the channel which is to be checked as failed to be applied to the data recovery unit 105. The pattern is generated in response to microinstruction word PP13 which performs an exclusive OR of the contents of the scratch pad address register and general register GR0. The next microinstruction word PP14 produces a delay of one PDA clock pulse to maintain synchronization with the information being applied by the write buffer 109 whose contents are changed to produce a transition. In this manner, the number of PDA clock pulses between each test for sampling the state of the write buffer ready flip-flop is maintained as an even number of cycles through each possible path through the routine.

Thus, the scratch pad address register has a single one bit stored while the general register 0 stores all ONES. Instead of applying all ONES data pattern (1FF), the all ONES pattern with a bit missing in it corresponding to the one bit in the scratch pad address register is applied to the data recovery unit 105.

As seen from FIG. 5d, the routine causes the generation of ZERO and ONE transitions until the overskew count has been decremented to zero. At that time, microinstruction word PP24 is referenced which causes the generation of the all ONES frame followed by microinstruction word PP27 which tests for the switching of the write buffer ready flip-flop to a binary ONE.

At this time, in addition to introducing the information into the data recovery unit, the routine also monitors the arrival of the data pattern. The arrival should occur within a certain amount of time. Microinstruction word PP28 inverts the contents of the write buffer 109 while the next microinstruction word transfers the data pattern to general register GR0.

It will be noted that general register 2 was previously loaded with a low order ONE pattern and a shifted ONES pattern will now be applied to the data recovery unit 105. Microinstruction word PP30 inverts the contents of GR0 in order to provide the pattern with the correct polarity. The next microinstruction word tests the state of the write buffer ready flip-flop and when that is set, the contents of general register GR0 are applied to the write buffer 109.

Because an all ONES frame pattern has been applied to the data recovery unit 105 signaling the end of the preamble portion of the record, a next microinstruction word when executed, detects that the data mode flip-flop (PDM) had been switched to a binary ONE. In the event it had not, a microinstruction word sets functional path register HFR6 bit to a binary ONE state indicating failure. Assuming that there had been no failure, the routine executes a microinstruction word which causes a branch to the start of the data loop as shown in FIG. 5d.

It is seen that after the write buffer ready flip-flop switches to a binary ONE, a next microinstruction word applies the data pattern to the data recovery unit 105. It will be noted that the next series of microinstruction words make the following checks. First, they compare the data pattern to the data pattern previously sent and check for a true compare. The next microinstruction word PP44 checks for the presence of an all ZERO frame which should not be present. Microinstruction word PP46 checks for the presence of an uncorrectable frame error by testing the state of flip-flop 105-150 of FIG. 3c. In the present embodiment, an uncorrectable frame error involves the occurrence of errors in more than one channel (e.g. 2 drop bits).

It will be noted that microinstruction word PP39 indicates that a branch occurs in the routine if it is not error time. This means that the first 9 bit shifted ONES pattern represents a good pattern while when an error pattern is to be sent, this pattern is set as the next or second nine frames of four patterns. Thus, initially this flip-flop is a binary ZERO which causes the skipping of microinstruction word PP40. Following the completion of sending the 9 good data frames, this flip-flop is set to a binary ONE which causes the execution of microinstruction word PP40. This microinstruction word exclusively ORs the contents of the scratch pad address register which contains the error pattern with the contents of general register GR0.

Now when microinstruction word PP56 is executed, it causes the loading of an "end" count into the PSI register via microinstruction word PP60. The microinstruction word following this causes a generation of 5 all ZERO data frames to simulate the postamble portion of a block. Again, if this is the first frame that is being generated, the last data frame has not yet arrived. Therefore, further microinstruction words are executed which perform similar types of data checks such as comparing the data pattern received to the data pattern set of the last frame to see that they are equal and this operation is followed by testing for the presence of an uncorrectable frame error as indicated. It is seen that the contents of the PSI register are decremented until the count reaches zero at which time the analysis portion of the data pump routine is entered.

The analysis portion of the routine includes microinstructions which stop the transfer operation, load the various data recovery errors into general register GR2 and the channel failure error conditions and test to determine whether a channel failure indicator has been set. If it had been set, microinstruction word PA06 gives the contents of functional path register FP6 with the contents of the scratch pad memory 107.

In the event that there is a comparison, a microinstruction word PA08 is referenced which compares the contents of functional path register FP2 with the contents of general register GR2. General register GR2 contains indication of the data error conditions stored in the data recovery unit 105 while functional path register FP2 contains the predicted value of the indicators. Microinstruction word PA10 transfers the data pattern at the output of the data recovery unit 105 into general register GP2 and compares the value of the scratch pad address to the contents of general register GR0. IN the event that all three comparisons indicate no error, a next microinstruction word is executed which causes a return back to the master routine for generation of the next data pattern.

Detailed Description of the Data Recovery Test Routine Operation

Figure 6:
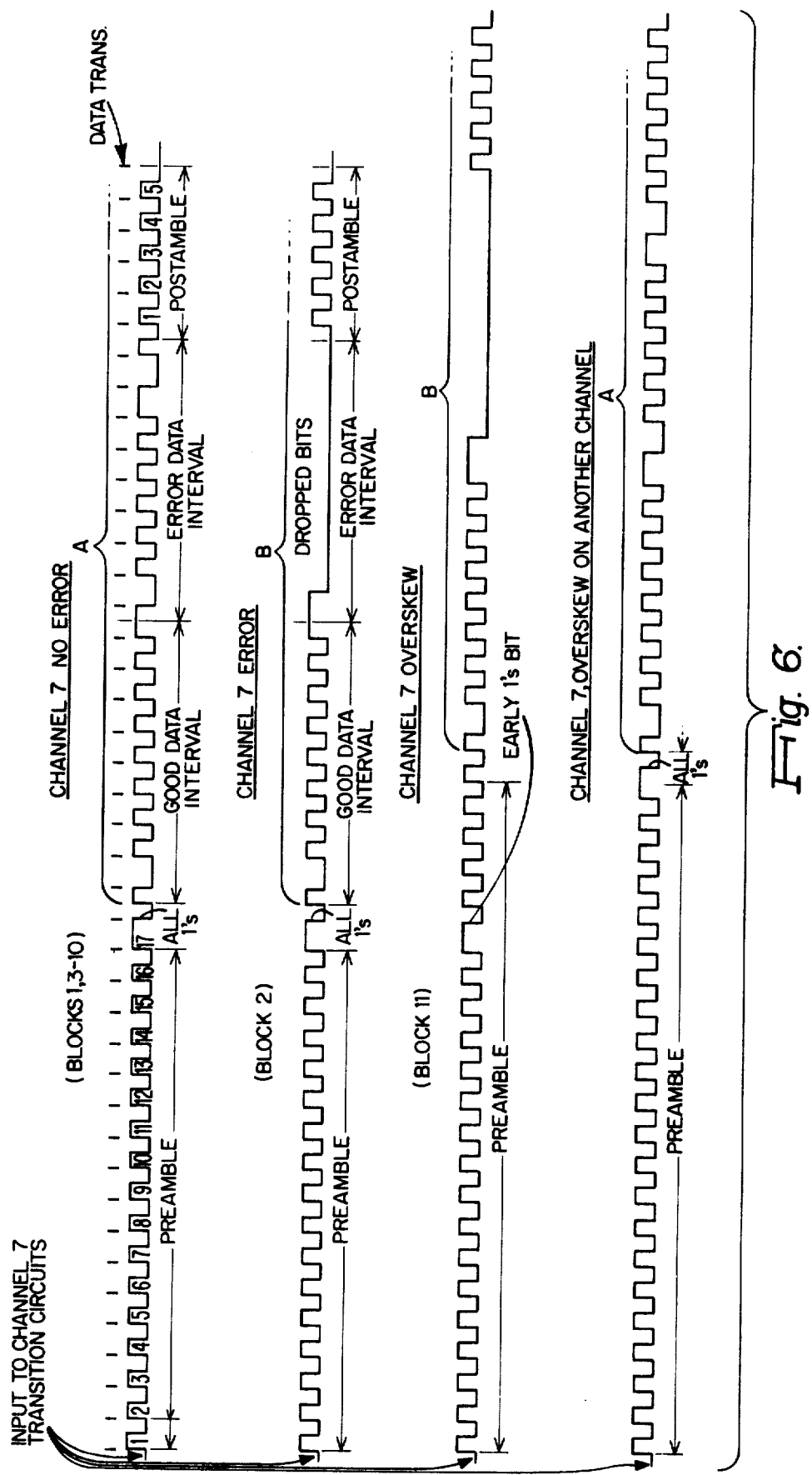
FIG. 6 illustrates the blocks of signals applied to a channel of the data recovery unit of FIG. 2 in accordance with the present invention.

With reference to FIG. 5d and FIG. 6, a detailed example illustrates the operation of the present invention in processing a block of patterns including error patterns indicative of a single channel error condition. As described previously, microinstruction word PM01 causes an all ONES pattern to be loaded into the write buffer 109 which causes all ZEROS pattern to be applied as an input to the data recovery unit 105. The next microinstruction word PM02 specifies to load speed constant into general register GR0. Microinstruction word PM04 causes the constant to be loaded into scratch pad memory 107 and microinstruction word PM05 causes the transfer of the low order bits of scratch pad memory into the speed constant register, not shown, included in the data recovery unit 105. Thus, the clock circuits are conditioned to run at 125 ips via microinstruction words 2, 4 and 5. Microinstruction word PM03 loads a constant into general register GR2 which specifies the low order 8 bits of the frame rate. The index counter 104–16 of FIG. 1 is used to write the patterns and 00A is the number which is loaded into the index counter to operate the counter at an 125 ips using a 208.33 nanosecond clock pulse rate. Subsequently, the complement or inverse of the value 00A hexidecimal is loaded into the 12 bits of the index counter (corresponds to 1810). The counter operates upon the loaded value plus 2 giving a value 1812 which corresponds to the half frame rate. The actual frame rate at 125 ips is 24 PDA pulses and the index counter gets loaded to one half that value minus 2 as mentioned previously.

First, the index counter is loaded to a count of 28, it is then turned on in the 53.3 microsecond mode. This causes a stall to allow the clock circuits to switch to 125 ips operation. This is done by microinstructions PM3a, PM3c, PM5a, and PM5e.

An all ONE pattern is loaded into the high order 4 bit positions of the index counter, a constant of 28 is loaded into the scratch pad address register and then the negation of this register is transferred into the low order 8 bit positions of the index counter and the index counter is started. The test on the state of NXO which corresponds to a stage of the index counter indicates when the counter times out. Then all ONES are loaded into the high order 4 bit positions of the index counter via microinstruction word PM05g. Microinstruction word PM06 sets the scratch pad address register to ZEROS. The scratch pad address register during the test contains the error pattern that will be generated and applied to the data recovery unit 105 indicating the channel or channels which will have errors.

During the "first pass" through the routine, the scratch pad address register was loaded to all ZEROS indicating no errors. Microinstruction word PM07 loaded register GR0 with the expected value of register FP6 which was stored in scratch pad memory 107. Also, microinstruction word PM09 sets functional path register FP2 to the expected value of GR2 and microinstruction word PM10 caused a branch to the data pump sequence (IBLT:PI01) which generates a first block of signals corresponding to the first set of signals of FIG. 6 applied to each of the channels of data recovery unit 105. From FIG. 6, it is seen that because of the all ZERO contents of scratch pad register, two identical sets of good data signals are transferred to each channel during the good and error data intervals of block 1.

Assuming there were no errors, the sequence caused a return to microinstruction PM11 for generation of the next block of signals which contains the single channel failure pattern. All the single channel failures tests have a common expected value for GR2 which corresponds to data recovery errors loaded into functional path register FP2 by microinstruction PM11. This value remains the same throughout the next 9 passes through the routine (nine channels). Microinstruction word PM12 loads the scratch pad address register to 001 which indicates the low order bit or low order data channel (i.e. channel 7) is going to have an error.

Microinstruction word PM13 loads GR0 with the constant 39 (i.e. 00111001) which is the expected value of FP6 and microinstruction PM14 stores it in scratch pad memory 107. In this case, scratch pad memory is being used as an ALU visible register and consequently the data is stored at the location defined by contents of the scratch pad address register which contains the error pattern. This scratch pad address register is not modified by the data pump routine and thus the scratch pad memory can be viewed as a single byte register. Next, microinstruction word PM15 causes the frame period stored in the index counter to be loaded into general register GR2. The reason is that during the execution of the data pump routine, the index counter was loaded previously with the frame period stored in general register GR2 in response to microinstruction word PM03. However, because further information was superimposed on general register GR2 during the execution of the routine, the frame period is again reextracted and stored back in general register GR2. The interface and the data routines are common to the other routines and reference the stored frame period in general register GR2. By maintaining the same value in general register GR2, the routine can be executed independently of the actual speed selected. The entry points from microinstruction words PM45, PM51 and PM56 include microinstruction words which cause general register GR2 to be loaded with different values before causing branches to microinstruction word PM03. Next, microinstruction word PM17 causes a left shift of the contents of the scratch pad address register and a return of the shifted contents to the scratch pad memory 107. This microinstruction moves the channel error condition bit over one track and when that bit stored in scratch pad address register in response to microinstruction word PM12 is shifted out through the end of the register, the register will store all ZEROS indicating that the cycling of the block error patterns through each of the channels has been completed.

Since microinstruction word PM11 caused a value of 9D to be loaded into functional path register FP2, bit position FP26 stores a binary ZERO indicating that only the channel failure patterns are to be included in blocks applied to the data recovery unit 105 (e.g. block 2 of FIG. 6). As mentioned previously, if bit position FP26 stores a binary ZERO, this causes a branch and causes a value of 9F to be loaded into functional path register FP2 which establishes the start of generation of blocks of overskew patterns which produce signals such as those of blocks 11–19 of FIG. 6. The A and B designations indicate that the remaining signals for those blocks correspond to the signals of the other blocks of the Figure. When bit position FP26 is a binary ONE, the multiple channel test is started which provides block patterns having error patterns in more than one channel (e.g. block 2 of FIG. 6). These signals are generated by performing logical operations on the initial base pattern producing patterns containing more than one error.

In the example given, microinstruction word PM16 causes a branch to microinstruction word PI01. The index counter is operated in gap mode and microinstruction words PI01, PI01A, PI01B and PI01C together allow a delay of 400 microseconds during which time the data recovery clock circuits are permitted to adjust to a nominal frequency (i.e. have deviated from the nominal frequency during previous processing of block error patterns).

Microinstruction word PI01D when executed clears functional path register FP6 which is used to store the conditions previously defined. Microinstruction word PI02 clears functional path register FP4 to a value of 04 which prevents the resetting of bit position 5 which as explained herein is used to flag an error condition.

Microinstruction word PI03 when executed clears the contents of functional path register FP5 with the exception of the low order bit position which enables DLI turn around. Microinstruction word PI09 sets the tape mark generation bit position of functional path register FP3. This bit position when set to a binary ONE enables the controller 100 to write both the data and the phase transitions. Normally when the controller writes phase encoded information on magnetic tape, the processing unit 104 controls the writing of the phase transitions while hardware circuits included in the data recovery unit 105 generate the data transitions. However, when the tape mark generation bit is set, the processing unit 104 controls the generation of transitions at both timing intervals (generates phase and data transitions at the appropriate times).

Microinstruction word PI10 loads the PSI register with the preamble count of 10F. The high order bit is a parity bit and this is set to a binary ONE. More importantly, the value F which corresponds to decimal 15 establishes the minimum number of preamble frames which the clock circuits are to receive. As mentioned, normally 40 frames of preamble are written as block of recorded data but for testing purposes only, 16 frames of preamble are transmitted because that is the minimum amount required to have the clock circuits properly synchronized. Thus, 15 all ZERO frames are sent, the clock circuits are then enabled as explained, another all ZERO frame is sent and this is followed by the all ONES frame. Actually, the clock circuits are enabled for operation before data signals are applied to them. The enabling established by setting the preamble mode flip-flop refers to conditioning the clock circuits to allow the generation of "window signal" at the end of the synchronization period (see FIG. 3b). Microinstruction word PI10 loads the frame period stored in general register GR2 into the index counter low order eight bit positions. Microinstruction word PI12 refers the initial data pattern to general register GR2. After the all ONES frame, 9 frames of shifted ONES (good data) are sent to channel 7 of the data recovery unit 105 followed by 9 frames of shifted ONES using the error pattern and then 5 all ZERO frames as illustrated by the channel 7 error waveform of block 2 in FIG. 6.

More specifically, microinstruction words PI03 through 13, as mentioned, enables DLI turn around the PE clock circuits, it clears the data recovery unit 105, starts the index counter in PDA mode, sets the write pulse enable and loads the write buffer 107 to reset write buffer ready flip-flop. The write pulse enable signal when a binary ONE normally causes write strobe signals to be applied to the device during a write operation. In this case, no strobe signals are generated but the enable signal conditions the index counter to allow switching of the write buffer ready flop-flop 105-160 of FIG. 3c every one-half frame time (i.e. sets signal DWSWR20=1). By loading the write buffer 107 again with 1FF in response to microinstruction word PI17, the write buffer 107 is placed in the gap state again thereby establishing proper synchronization between the index counter and the data recovery unit 105.

Now, the controller begins executing the data pump routine. The first 10 microinstruction words when executed causes the transmission of the 15 all ZEROS frames, the setting of the preamble mode flip-flop, and the transmission of one more all ZERO frame. In greater detail, the processing unit 104 tests the state of signals DWWRD10 to signal the start of a data time interval. That is, when writing phase encoded information on tape, the first transition written is a data transition and the direction of the transition defines whether the data bit is a binary ONE or a binary ZERO (i.e. a transition from a binary ZERO to a binary ONE = a binary ZERO while a transition from a binary ONE to a binary ZERO = a binary ONE). Thus, the first setting of the write buffer ready flip-flop 105-160 causes all ZEROS to be loaded into the write buffer which when inverted causes a transition from a binary ZERO to a binary ONE indicative of binary ZERO data. Microinstruction word PP02A causes a 1 PDA stall for synchronizing the loops so that they have an even number of microinstructions between each test made for write buffer ready flip-flop. Because the intervals between loading the write buffer 107 have an even number of clock pulses, all data signals are generated at the same frequency, and their symmetry is ensured.

Microinstruction word PP03 causes the count of preamble frames previously loaded in the PSI register to be decremented by 1. The next microinstruction word PP04 tests for ZERO and if not ZERO, microinstruction word PP05 tests for all ONES. The count will be decremented through zero and then to the all ONES. Thus, the first time through the routine, the count is neither ZERO or all ONES. Thus, the signal AOZ and A01N from the ALU are a binary ZERO and a binary ONE respectively.

Microinstruction word PP07 causes all ONES to be loaded into general register GR0 (i.e. this microinstruction helps to establish the right number of PDA clock pulses between loops). Microinstruction word PP08 tests the write buffer ready flip-flop to determine the start of a phase time interval. Since the processing unit 104 is transmitting ZERO frames of the preamble, there was a transition from a binary ZERO to a binary ONE at data time. At phase time, the trailing edge transition from a binary ONE to a binary ZERO is generated by microinstruction PP09. Microinstruction word PP10 causes a branch back to microinstruction word PP01. This loop is repeated until the PSI count decrements to zero. At that time, the processing unit 104 has sent 15 all ZERO frames of block 2. Microinstruction word PP05 when executed sets the preamble mode flip-flop to a binary ONE. This conditions the clock circuits to get out of a fast acquisition or synchronization mode of operation and begin responding to data signals normally. At this time, as mentioned, the clock circuits start generating the "window signals".

The next time through the sequence, the count will be all ONES forcing signal A01N to a binary ZERO which results in the exciting from the loop which caused the generation of the preamble containing 16 all ZERO frames. Since in this example, there will be no overskew pattern generated, bit position F26 is a binary ZERO. This causes the processing unit 104 to execute microinstruction word PP11a and continue down to microinstruction word PP23. Microinstruction word PP11a resets the preamble mode flip-flop to a binary ZERO which previously allowed the synchronization of the clock circuits and subsequent generation of the "window signals". The contents of PSI register is held at the value 1FF to allow for 9 bit inversions or complement operation using exclusive OR microinstruction in lieu of performing a 9 bit complement operation.

Microinstruction word PP23 tests the state of the write buffer ready flip-flip at phase time. During this time, the processing unit 104 is going to send at all ONES frame. This is accomplished by causing a skip or no transition at the phase time. Since microinstruction word PP09 applied all ZEROS to the unit 105 by forcing the write buffer 107 to all ONES, and microinstruction word PP20 applied all ONES to unit 105 by inverting the writer buffer to all ZEROS, microinstruction word PP24 by loading all ZEROS in the write buffer 107 produces in effect no transition at phase time. During the next time interval (data time), there will be a transition from a binary ONE to a binary ZERO corresponding to the all ONES frame. The frame is generated in response to microinstruction word PP28 which inverts the contents of the write buffer 107 producing the 1 to 0 transition.

Microinstruction word PP28 transfers the data pattern from general register GR2 to general register GR0. Microinstruction word PP30 causes the all ONE contents of the PSI register to be exclusively ORed with the contents of general register GR0 which inverts the contents of general register GR0. Microinstruction word PP31 tests the write buffer ready flip-flop and at phase time microinstruction word PP32 transfers the data pattern inverted to the write buffer 107. This creates a transition only in the low order channel. That is, the write buffer 107 had just transferred an all ONES pattern and inverting general register GR0 results in a value FE and a binary ONE in the parity bit position. When these contents are transferred to the write buffer 107 which previously contained all ONES, there is no net change in the channels except the low order channel (i.e. low order bit has a 1 to a 0 transition). During the execution of microinstruction word PP32, the low order channel or track has a 0 to 1 transition. At the next data time interval, the contents of the write buffer will be again inverted. This will produce a 0 to a 1 transition in all the channels except the low order channel which is at a binary ZERO and causes a 1 to 0 transition in the low order channel which represents a binary ONE.

The next microinstruction word PP3 test the state of the PE data mode flip-flop. This flip-flop is set by circuits of the data recovery unit 105 upon the detection of the all ONES frame. At this point, the all ONES frame should have been detected and the flip-flop set to a binary ONE. If it has not been set, the next microinstruction word PP34 causes flip-flop F62 to be set signaling the failure. Microinstruction word PP35 when executed causes a branch and transfers the data pattern from general register GR2 to general register GR0. The all ONES frame is checked by microinstruction word PP46 for an uncorrectable frame parity error.

Since there should be no such error in the example, microinstruction word PP48 is then executed for detecting the start of the data time period by testing the state of the write buffer ready flip-flop. Microinstruction word PP49 transfers the contents of general register GR0 to the write buffer 107. Sending the data pattern to the write buffer 107 in this particular instance, effectively causes transitions in all channels at data time. The next microinstruction word PP50 saves the data pattern for the next comparison by transferring it to general register GR1. Microinstruction word PP51 causes the data pattern to be shifted left and the result stored in both general registers GR2 and GR0. Microinstruction word PP52 inverts the data pattern in general register GR0 for the next phase transition. This is followed by microinstruction word PP53 which tests the pattern for all ZEROS. If the general register GR2 is equal to all ZEROS, it signals the end of one of two passes. Since it is only the first pass, microinstruction word PP58 is executed which causes a branch to microinstruction word PP36. Upon detection of phase time by microinstruction word PP36, microinstruction word PP37 is then executed which transfers the phase pattern to the write buffer 107. Thereafter, microinstruction word PP38 transfers the pattern to general register GR0. Since the processing unit 104 is still sending good data patterns of block 2, there is a branch which causes the execution of microinstruction word PP41. This compares the data pattern received to the data pattern set (the data pattern stored by PP50 is compared by PP41). Microinstruction word PP42 tests to determine whether the two are equal. If the two are not equal, microinstruction word PP43 sets bit position F66 to log the data error. Since there should be no all ZERO frames sent at this time, microinstruction word PP46 is executed to check for uncorrectable frame parity.

The processing unit 104 continues through these loops until the combination of microinstruction words PP53 and PP54 results in a ZERO indicating that all of the 9 good data patterns have been sent. At this time, there is no branch made in response to microinstruction word PP54 but instead microinstruction word PP55 is executed which loads a value of 1FE into general register GR0 returning it to a previous value. Since the error pattern pass has not been started, microinstruction word PP57 is executed which sets flip-flop FP67 to a binary ONE. Next, microinstruction word PP58 is executed causing a branch to microinstruction word PP36 after loading general register GR2 to 01 in response to microinstruction word PP59 (i.e. restores the data pattern to its initial value so that it can be again shifted to create error patterns). Microinstruction word PP36 is again executed to test for phase time. The value of 1FE was loaded into general register GR0 and the value of 01 was loaded into general register GR2 which provides the same value in general register GR0 as if the branch occurred in response to microinstruction word PP54. Microinstruction words PP37 and PP38 transfer the phase data pattern to the write buffer and the data pattern to general register GR0.

When microinstruction word PP39 is executed, flip-flop F67 is a binary ONE which causes execution of microinstruction word 41. This creates an error by exclusive ORing the error patterns stored in scratch pad address register with the contents of general register GR0. In this particular example, the error bit is for channel 7. The write buffer 107 was loaded to 1FE which applies a value 001 to the data recovery unit 105. A data pattern of 001 is transferred to general register GR0. When the contents of general register GR0 are exclusively ORed with the scratch pad address, also 001, the result is 000. By executing microinstruction words PP41 and PP42, the processing unit 104 performs another data comparison. Microinstruction words PP44 and PP45 check for all ZERO frames and microinstruction words PP46 and PP47 check for uncorrectable frame errors. At this time, the tests are actually being performed on the last data pattern that was sent which is a good data pattern.

Microinstruction word PP48 tests the state of write buffer ready at the write buffer ready flip-flop and at data time causes the execution of microinstruction word PP49 which transfers the contents of general register GR0 to the write buffer. This causes the write buffer to change from 1FE to 000. The signals applied to the data recovery unit 105 change from 001 to 1FF. This produces no transition in the low order channel bit position which effectively creates a "drop bit" in that channel. Microinstruction words 49 through 51 are executed, the data pattern stored in general register GR2 is shifted, the pattern is checked for all ZEROS and the routine returns to microinstruction word PP36. During the next pass, the phase data pattern is loaded into the write buffer 107 and utilizes the good data pattern. Microinstruction word PP38 transfers the pattern to general register GR0. This time, a value of 002 is loaded into general register GR2. When microinstruction word PP40 causes an exclusive OR, the result is 003. The write buffer 107 in response to microinstruction word PP37 was loaded with a value 1FD. In the case of a single drop bit, the same data pattern should be received. Therefore, the comparison should be good causing microinstruction word PP43 to be skipped. However, microinstruction word PP44 upon testing for an all ZERO frame will detect that the frame contains all ZEROS. This check is performed prior to correcting the frame. Since the frame 8 ZERO bits and an error bit, the error bits will be dropped resulting in the setting of the all ZERO indicator. This causes microinstruction word PP45 to set flip-flop F64. However, the uncorrectable frame error indicator when tested by microinstruction word PP46 should not be set resulting in the skipping of microinstruction word PP47.

The processing unit 104 continues through the same loop. For example, during the next pass, the write buffer 107 stores 1FD and general register GR0 stores a 03. Thus, upon a transfer of the contents of general register GR0 to the write buffer causes a change of 1FD to 003. The value of 002 is applied to the data recovery unit 105 followed by 003 and 1FC. Thus, transitions are made to occur in the good channels while the bad channel (i.e. channel 7) is still dropping bits. When the single bit has been shifted through general register GR2, microinstruction word PP54 causes microinstruction word PP55 to load the value 1FE into general register GR0. Since the error pass is completed, microinstruction word PP56 causes a branch to microinstruction word PP60. This loads a constant of 5 into the PSI register. Microinstruction word PP61 causes all ONES to be loaded into general register GR2 while the next microinstruction word tests for phase time. The phase data pattern is loaded into the write buffer 107. The processing unit 104 is now going to send 5 all ZERO frames.

The branch to PP64 is a stall for 2 PDA clock pulses. Following that, the last data frame is compared (i.e. the tests may be microinstruction words PP65-PP70 are the same as PP42-PP47). Since the last frame is being processed, the all ZERO test should result in no errors since the one error bit has been shifted into one of the other channels. The correctable frame error indicator should still not be set. After an one PDA clock pulse stall, microinstruction word PP72 tests for the start of data time during which all ZEROS are loaded into the write buffer. ONES are loaded by microinstruction word PP61 and ZEROS are loaded by microinstruction word PP73. Upon detecting the write buffer ready and ONES are loaded into the write buffer 107, there is a stall of 2 PDA clock pulses and check for all ZERO frames. Since the processing unit 104 is sending postamble all ZERO frames, the all ZERO frame indicator AZF should be set and if it is not, microinstruction word PP76 causes the setting of F60.

Since an all ZERO frame was detected by microinstruction words PP67 and PP68 and by microinstruction words PP44 and PP45 and since flip-flop F64 is set, this indicates that that all ZERO frame was set during the receipt of data patterns. The flip-flop F60 logs the fact that the all ZERO frame indicator did not set during the sending of the postamble. Thus, if the all ZERO frame indicator is a ONE, flip-flop F64 is not set by microinstruction word PP68. Since this example involves drop bits, the uncorrectable frame error will not be set and next a no op microinstruction will be executed. The count in the PSI register is decremented and the routine branches back to repeat microinstruction words PP72-PP82 until the count decrements to ZERO.

The processing unit 104 begins the analysis portion to ascertain whether what was expected to happen did happen. Originally, the scratch pad address register was equal to 001, the function path register FP2 was loaded to 9D and scratch pad memory was equal to 39. The first operation performed during pattern analysis was to reset FP5 to 01 via microinstruction word PA01 (i.e. leave DLI turn around enabled). Microinstruction word PA02 loads the data errors into general register GR2. These are special error indicators that are collected in the data recovery unit 107 (i.e. multiple drop bit errors, overskew errors, channel failure errors, etc.).

The scratch pad address register stores the predicted value of the channel failure. The channel failure flip-flops should indicate that there was a channel failure in the low order channel. Functional path register FP2 stores the expected value of the data recovery errors. As mentioned previously, there should be no multiple dropped bit errors, no uncorrectable parity errors, a channel failure, no overskew error and a dropped bit error designated by the expected value 9D. The value 39 indicates that there should be uncorrectable frame error not set during the sending of the postamble portion of the block. The all ZERO frame indicator should be set during the postamble portion and the data mode flip-flop should be set and the uncorrectable frame error indicator should not set during the postamble. Since the test just performed had a single channel failure the PCF test indicator should be set and there should be no uncorrectable frame error during the postamble since while each frame had 9 ZEROS, each had a dropped bit which should have been corrected. Thus, flip-flop F62 should be set and that was checked by microinstruction word PP78. The all zero frame indicator should be set during the data portion because this check is made on uncorrected frames. Further, there should be no data compare error because there was only a single channel failure.

Considering the analysis routine, microinstruction word PA03 loads the channel failure indicators into the D register of the unit 105. Microinstruction word PA04 tests for channel failures. In this example, the channel failure should be set and microinstruction word PA05 in turn sets flip-flop F63. The next microinstruction word compares the contents of EP6 and scratch pad memory. If they do not compare, microinstruction word PA15 which causes a 04 to be loaded into functional path register FP4 sets flip-flop BOT. A next microinstruction word PA08 compares functional path register EP2 and general register GR2. If they do not compare, the BOT flip-flop is set. Next, microinstruction word PA10 compares the contents of DR0 with the scratch pad address register after being moved to general register GR0. This makes certain that the error occurred in the channel selected to fail. When they compare, this causes a return back to the master routine which takes and shifts the error pattern by one to create an error in the next channel of track repeating the operations just described. In the event of an error, this causes a branch back to the interface routine.

Upon the completing the tests at 125 inches per second, microinstruction word PM41 is executed which loads OA into general register GR2 which is compared with the contents of the index counter low order 8 bits. They contain the frame period which by microinstruction PM03 was loaded to OA. Microinstruction word PM43 checks for equality. If they are equal, the value 12 is loaded into general register GR2 and a branch to PM03. A 9 is loaded into general register GR0 via PM44.

The index counter is loaded for 75 inches per second via PM46. Thus, the routine sequences through speeds of 125, 75, 37½ and 18¾ ips.

At microinstruction word PM59, the BOT flip-flop is tested. Since this is an accumulative error, the setting of the BOT flip-flop will cause a halt. By contrast, a detected error would cause the processing unit 104 to loop or recycle automatically the block pattern. It is seen from FIG. 4 that the microprogrammed processing unit in the absence of detecting no faults branches to the initialize sequence or routine of block 416. This sequence again initializes or resets the various registers within the processing unit. Upon the completion of this routine, the processing unit returns to an initial state by branching to an idle loop routine which sets the operational in OPI line signaling the IOC that it is ready to receive commands for processing data characters utilizing normal processing routines stored in the control store. Thus, it is seen that each time the IOC generates a reset signal, the processing unit executes the tests of FIG. 4 so as to establish a level of confidence or minimum operational capability for itself.

From the foregoing, it is seen that the processing unit of the present invention provides for testing of the data recovery unit to determine that its various indicators and more importantly, that its clocking circuits are operating at a nominal rate. By having the peripheral controller or processor control the introduction of blocks of good and erroneous patterns, the apparatus of the present invention is able to insure that the controller circuits are not operating in marginal or degraded fashion. Although different types of branch microinstructions may be used to carry out the operations indicated in the flow charts, the following coded microinstructions are employed in the present embodiment.

| Type Microinstruction | Designation | Definition |
|---|---|---|
| 1. Return Branch | RNX | This microinstruction loads the history register contents into the ROMAR and inhibits the next microinstruction to be executed. |
| 2. Absolute Branch | BAX | Load the contents of bit positions 4–13 of the ROMLR into the ROMAR and execute the microinstruction in the next location. |
| 3. Absolute Branch | BNX | Load the contents of bit positions 4–13 of the ROMLR into the ROMAR and inhibit execution of the microinstruction stored in the next location. |
| 4. Absolute Branch | BSX | Loads the contents of bit positions 4–13 of the ROMLR into the ROMAR, store contents of ROMAR into History Address Register and inhibit execution of the microinstruction in the next location. |

From the foregoing, it is seen that the apparatus and method of the present invention provides for the efficient testing of a magnetic tape subsystem. In accordance with the present invention, testing is accomplished by a plurality of basic logic test routines resident in the control store of a microprogrammable controller. One of the basic test routines provides for complete testing of the data recovery unit ofthe controller. Such testing is accomplished by generating blocks of digital signals arranged in a predetermined format to the data recovery unit and monitoring the states of the various error indicator circuits included in the unit. The blocks of digital signals are generated from a limited number of base patterns provided by microinstructions included in the data recovery routine. Upon completion of generating each block, the states of the error indicator circuits are compared with one of a plurality of predicted results patterns also provided by other microinstructions of the data recovery routine. Additionally, microinstructions specifying shift and logical operations are included in the routine for shifting the base patterns and for combining a pair of patterns for producing resulting error patterns used to generate blocks of digital data signals corresponding to different error conditions. By generating digital data signals including uncorrectable error patterns, the operation of the data recovery unit is verified by monitoring that no correction of the error patterns was possible as indicated by the comparison of states of the error indicator circuits with the predicted result pattern.

Additional test indicator storage circuits are employed in the preferred embodiment for storing indications of conditions occurring during the assembling of the digital signals into bytes in order to verify that only certain error indicator storage circuits are switched on at the appropriate times and conditions. The contents of the test indicator storage circuits are also compared to a predicted result pattern provided by microinstructions to verify further proper operation of the error circuits. Additional comparisons of predicted results patterns of the assembled bytes and those of the channel failure indicator circuits are made to ensure that each byte assembled from the digital data signals is correct and that the correct channels have indicated failure respectively.

The present invention provides for generating a number of synchronization patterns in each block which corresponds to a minimum number required for synchronizing the clock circuits of the data recovery unit to the rate at which digital signals are being transferred by one of the selected magnetic tape devices of the subsystem. This tests that the data recovery unit circuits are not operating marginally. Additionally, the one routine is repeated at each of controller clock speeds to verify that the data recovery unit operates properly at all of the device speeds.

It will be obvious by those skilled in the art that many changes can be made to the illustrated embodiment without departing from the scope of the present invention. For example, although certain preamble counts and block formats were illustrated, it should be obvious that the invention can be utilized employing different counts and formats. Also, while the invention was illustrated with phase encoded digital signals, it can be used for verifying the operation of data recovery units used to assemble data signals recorded using different methods of recording.

To prevent undue burdening of the description within the ken of those skilled in the art, a block diagram approach has been followed, with a detailed functional description of each block and specific identification of the circuits it represents. The individual engineer is free to select elements and components such as flip-flop circuits, registers, etc. from his own background or from available standard references such as "Computer Design Fundamentals", by Chu (McGraw-Hill Book Company, Inc), and "Pulse, Digital and Switching Waveforms" by Millman and Taub, (McGraw-Hill Book Company, Inc. ).

The engineer is free to select microinstruction word formats from his own background or from standard references such as "Computer Organization and Microprogramming" by Chu (Prentice-Hall Inc.) Copyright 1972 in addition to that shown in U.S. patents referenced herein.

While in accordance with the provisions and statutes there has been illustrated and described the best form of the invention known, certain changes may be made to the system described without departing from the spirit of the invention as set forth in the appended claims and that in some cases, certain features of the invention may be used to advantage without a corresponding use of other features.

What is claimed is:

1. An improved input/output magnetic tape controller having microprogrammed processing means and data recovery means for assembling into bytes for transfer to a data processing system, digital signals received from a magnetic tape device obtained by reading signals arranged in a predetermined block format and recorded on a multichannel magnetic medium, said recovery means including a plurality of registers for deskewing said digital signals and assembling them into bytes, correction circuits coupled to different ones of said registers for correcting errors detected during said deskewing, a plurality of checking circuits coupled to different ones of said registers for detecting different types of error conditions occurring during said deskewing and assembling of said digital signals and a plurality of error indicator circuits coupled to said checking circuits, said controller further comprising:

a control store having a plurality of resident basic logic test routines, one of said routines for verifying the operation of said data recovery means, said one routine including a plurality of constants representative of initial patterns and expected result patterns;

decoder means for generating control signals in response to decoding microinstructions of said resident basic logic test routines;

selector circuit means coupled to said processing unit to said magnetic tape device and to a first one of said plurality of registers, said selector circuit means being operatively connected to apply selectively digital signals received from said device and said processing means to said first one of said plurality of registers; and, means coupling said plurality of error indicator circuits to said processing means;

said decoder means being conditioned by microinstructions of said one routine to generate signals for conditioning said selector circuit means to couple said first one of said registers to said processing means inhibiting transfer of said digital signals from said device, other microinstructions of said one routine conditioning said decoder means to generate signals for conditioning said processing means to generate digital signals of a first block from said initial patterns arranged in said predetermined format and said decoder means being conditioned by a sequence of test microinstructions at the completion of said recovery unit having assembled all of said digital signals of said first block into bytes to compare the states of said error indicator circuits with one of said expected result patterns for verifying that said recovery unit is operating properly.

2. A peripheral system including a microprogrammed processing apparatus coupled to a data processing system and to at least one magnetic tape peripheral device for reading and recording on a multichannel magnetic medium successive bytes of digital signals in blocks, each block having a predetermined format, sad microprogrammed processing apparatus comprising:

an addressable control store for storing microprograms used to perform said reading and recording of said bytes of digital signals, said store including addressing means and a plurality of storage locations for storing a plurality of basic test routines including a recovery routine for verifying that said processing apparatus can recover reliably said digital signals read from said medium, said recovery routine including microinstructions containing a limited number of constants representative of initial patterns and predicted results;

decoder means coupled to said control store for generating control signals in response to decoding microinstructions read out from said control store;

data recovery means operatively coupled to said decoder means and to said peripheral device for assembling into bytes said digital signals transferred by said device at a specified rate for transfer to said data processing system, said recovery means including;

a plurality of recovery error indicator storage circuits operative to monitor said transfer for generating signals indicative of the occurrence of error conditions during the assembling of said digital signals;

input means coupled to said control store addressing means, said input means being operative to receive an input signal for conditioning said addressing means to cause said control store to branch to said basic test routine microinstructions;

control transfer means coupled to said decoder means, to said store, to said device and to said data recovery to control signals from said decoder means during execution of microinstructions of said recovery routine to condition said data recovery means for receiving only groups of digital signals generated from said initial patterns and inhibiting transfers of said digital signals from said device; and, logic means coupled to said control store and to said plurality of indicator storage circuits, said logic means being conditioned by control signals from said decoding means to compare the states of said recovery indicator storage circuits with a pattern of signals received from said control store representative of the predicted states of said recovery indicator circuits as a result of applying said groups of digital signal patterns of a first block to said data recovery means for determining that said data recovery means is operating reliably.

3. The peripheral system of claim 2 wherein said microprogrammed processing apparatus includes an input circuit coupled to said data processing system for receiving a reset signal from said system, said input circuit being operative to produce said input signal in response to said reset signal for application to said input means.

4. The peripheral system of claim 2 wherein said format of each of said blocks includes preamble and postamble sets of digital synchronization signals bracketing each group of digital data signals, the number of said preamble synchronization signals generated from said initial patterns being selected to have a predetermined relationship to the number of preamble synchronization signals included in each block recorded to said medium.

5. The peripheral system of claim 4 wherein said predetermined relationship is to have the number of said digital synchronization signals of each of said preamble less than the number of preamble synchronization signals included in each block of data signals recorded on said medium and corresponding to a minimum number of signals required to synchronize the operation of said data recovery means to said specified rate said digital signals are received from said device.

6. The system of claim 5 wherein said microprogrammed processing apparatus includes a plurality of transfer paths for interconnecting said control store, said data recovery means and said logic means for transferring digital byte signals between said data processing system and said magnetic tape peripheral device and wherein
said basic test routines further include a plurality of initial test routines, said microprogrammed processing apparatus being conditioned by microinstructions read out from said control store during the execution of said initial routines to establish independently that said control store, each of said plurality of transfer paths and each of said means are operating properly prior to execution of said recovery routine.

7. The system of claim 5 where in said microprogrammed processing apparatus further includes:
a counter coupled to said control store to said decoder means and to said logic means, said counter being conditioned by said decoder means to receive initially an index counter read out from said control store;
clocking circuits for applying clock pulse signals to said counter for decrementing said counter to a predetermined count for generating timing strobe signals enabling the transfer of digital signals at said specified rate between said microprogrammed processing apparatus and said one device;
said data recovery means further including timing means coupled to said counter for generating signals for transferring said digital data signals through said data recovery means at said specified rate;

a first register coupled to said logic means and to said decoder means, said first register being conditioned by said decoder means to receive a preamble count read out from said control store indicative of a number of frames of preamble synchronization signals to be generated for each block of digital signals applied to said data recovery means;
a write buffer register coupled to said control transfer means and to said logic means; and,
said control store after each occurrence of a strobe signal being operative to read out microinstructions for conditioning said decoder means to generate control signals for applying predetermined pattern of digital synchronization signals to said write buffer register for transfer through said data recovery means and for decrementing by one said count stored in said first register.

8. The peripheral system of claim 7 wherein said data recovery means further comprises:
a plurality of series coupled buffer registers, a first one of said buffer registers being coupled to said control transfer means and a last of said buffer registers for storing said assembled byte, each of said registers including a pair of bistable storage devices, each pair of a first one of the registers being individually associated with one of the plurality of channels; and
means for applying sets of clocking signal to each pair of said storage devices of said first register for storing pulses representative of said digital signals for subsequent transfer through said buffer registers; and wherein
said recovery routine includes a data routine having a branch test microinstruction which when executed tests the count stored in said first register, said addressing means including branch control means operative in response to signals indicating that said count has been decremented to zero to cause said store to branch other microinstructions in said data routine, a first microinstruction for conditioning said decoder means to generate a signal indicating that said minimum number of preamble frames have been processed, another one of said microinstructions conditioning said decoder means to generate control signals for loading a predetermined bit pattern into said write buffer register for signaling the end of generating said preamble signals of the block and said branch control means being responsive to timing signals from said data recovery means to condition said decoder means to generate signals to set a predetermined one of said plurality of indicator storage circuits for signaling synchronization of each of said clocking means to said digital synchronization signals within said minimum number of frames corresponding to said preamble count indicative that all of said clocking means are operating without any degradation in performance.

9. The peripheral system of claim 8 wherein said predetermined patterns of digital signals applied to said write buffer register include pairs of signals corresponding to said input pattern and complement of said input pattern representative of phase encoded signals normally generated during time intervals defined by said sets of clocking signals, said predetermined bit pattern being coded as an all ONES pattern and said predetermined one of said indicator circuits when set signaling that said data recovery means is in a data mode for assembling said digital data signals of said first block.

10. The peripheral system of claim 8 wherein said microprogrammed processing apparatus further includes:
- second and third registers coupled to said logic means, to said decoder means, and to said control store, said second and third registers respectively being conditioned by signals generated by said decoder means to store signals corresponding to an initial data pattern and a predicted results pattern read out from said control store, and wherein
- said recovery routine further includes additional sequences of microinstructions which comprise said data routine and a sequence of microinstructions which comprise an analysis routine, said decoder means being conditioned by one of additional sequences of microinstructions of said data routine read out from said control store to generate a first set of control signals for applying repetitively signals representative of said data pattern to said write buffer register for generating patterns of said digital data signals of said first block and said decoder means being conditioned by microinstructions in said sequence of said analysis routine to generate a second set of control signals for comparing said states of said recovery indicator storage circuits and the contents of said third register and generating a signal verifying that said data recovery means is operating properly.

11. The peripheral system of claim 10 wherein said microprogrammed processing apparatus further includes a fourth register coupled to said logic means for storing an error pattern, said error pattern and said initial data pattern each is in a binary code having a number of bits corresponding to the number of channels, said binary code of said error pattern containing a predetermined number of binary ONES used for generating error patterns of digital data signals designating a predetermined number of channels which are expected to signal failure and wherein
- said data recovery means further includes correction circuits coupled to said last buffer register and a preceding buffer register, said correction circuits being operative in response to error signals to correct the byte assembled in said last buffer register;
- said decoder means in response to microinstructions generating signals for shifting by one said binary code of said error pattern to generate digital data signals containing error pattern for indicating failures in different channels and wherein said contents of said third register are coded to indicate the predicted error conditions resulting from the assembling of said digital data signals into bytes and indicate when said assembled bytes contain correctable and uncorrectable errors, said signal indicating that said data recovery means is operating properly by signaling said errors as being uncorrectable when said error patterns contain a predetermined number of binary ONES causing a corresponding number of said channels to signal failure.

12. The system according to claim 11 wherein said predetermined number has a value of one, said data pattern initially having a binary code containing one binary ONE and said error pattern initially having a binary code containing no binary ONES for generation of said digital data signals of said first block and said error pattern thereafter having a binary code having at least one binary ONE for generating error patterns of said digital data signals of succeeding blocks.

13. The system according to claim 11 wherein data recovery means further includes a plurality of channel failure storage circuits having inputs coupled to a first predetermined one of said buffer registers and operative to signal conditions indicative of a failure in different ones of said channels and the outputs of said channel failures storage circuits being coupled to a second predetermined one of said buffer registers for transferring signals to said register indicative of said channel failures, said last one of said registers being coupled to said logic means, and wherein said analysis routine includes a test sequence of microinstructions, said decoder means being responsive to said test sequence for generating signals for storing indications of said channel failure signals in said last register and comparing said error pattern contents of said fourth register with the contents of said last register for verifying that only the channels predicted to have failures signaled failure indicative of no interference between channels.

14. The peripheral system of claim 11 wherein said microprogrammed processing apparatus further includes:
- a fifth register coupled to said logic means for storing a base pattern, said base pattern being in binary code having a number of bits corresponding to said number of channels, said base pattern initially having a binary code containing a binary ONE and wherein said recovery routine further includes microinstructions for specifying shift operations and logical operations, said decoder means being responsive to said microinstructions specifying said shift operations to generate signals for shifting by one bit position said binary codes of said base pattern, said data pattern and said error pattern and said decoder means being responsive to said microinstructions specifying logical operations to generate signals for logically combining said error pattern with said data pattern for generating said digital data signals for each of said blocks and for logically combining said base pattern and said shifted base pattern to produce a result error pattern which when combined with said data pattern produces digital data signals containing error patterns having a plurality of binary ONES for indicating failures in more than one channel.

15. The peripheral system of claim 11 wherein said data recovery means further includes a check circuit coupled to a last one of said buffer registers, said check circuit operative to perform a check upon an assembled byte in said last one of said registers and signal the occurrence of an uncorrectable error within said byte;
- said check indicator storage circuits include a plurality of test indicator storage circuits, at least one of said storage circuits being coupled to said check circuit and others of said test indicator circuits being coupled to said logic means and predetermined ones of said recovery error indicator circuits for receiving signals indicative of testing each of said bytes assembled in said last register; and,
- said microprogrammed processing apparatus further including:
  - a sixth register operatively coupled to said decoder means, to said control store and to said test indicator circuits for storing signals indicative of the states of said test indicator circuits; and,
  - memory means operatively coupled to said control store, to said decoder means and to said logic means, said memory means being conditioned by said decoder means to receive a predicted result pattern of digital signals from said control store indicative of the predicated states of said test indicator storage circuits;

said decoder means being conditioned by sequences of microinstructions of said data routine and analysis routine to generate control signals for conditioning said sixth register to store indications of said test indicator circuits during the testing of each byte and said decoder means being conditioned by microinstructions of said analysis routine at the end of transferring all of the bytes of said first block to generate signals for comparing the contents of said sixth register with said pattern from said memory means for verifying that said error recovery indicator circuits are operating properly during the assembling of each of said bytes of said first block.

16. The peripheral system of claim 14 wherein said analysis routine includes a recycle sequence of microinstructions, said decoder means being conditioned by branch test microinstructions in said analysis routine in the absence of a comparison between predicted and actual results of said recovery indicator circuits to generate signals for conditioning said branch control means to cause said control store to branch to said recycle sequence of microinstructions for repeating execution of said data routine to cause the generation of bytes of digital data signals containing error patterns identical to said bytes of the preceding generated block.

17. The peripheral system of claim 16 wherein said analysis routine further includes a return type microinstruction following said branch test microinstructions, said return microinstruction conditioning said decoder means in the absence of any branch produced by said branch test microinstructions indicative that all of the bytes of said block had been assembled correctly by said data recovery means to condition said branch control means to cause said control store to branch to repeat said data routine for generation of bytes of digital signals of a next block, said digital data signals being coded to contain error patterns of digital data signals different from those of said preceding block enabling testing of other channels of said data recovery means.

18. The peripheral system of claim 17 wherein said recovery routine includes a master sequence of microinstructions for specifying different indexes for enabling the transfer of digital signals from said device at different specified rates, said decoder means being conditioned successively by different ones of said microinstructions in said master sequence to generate signals for loading said counter with a different index to enable repeating the transfer of said digital signals of said block at said different specified rates for determining that said data recovery means is operating reliably at all of the corresponding device rates established by different device operating speeds.

19. the peripheral system of claim 18 wherein said master sequence further includes a final sequence of microinstructions, said decoder means in the absence of any error conditions resulting from said basic logic test routines being conditioned by said final sequence of microinstructions to generate signals to condition said branch control means for causing said control store to branch to a routine to perpare for receiving commands from said data processing system.

20. A peripheral controller coupled to a data processing system and to a plurality of magnetic tape devices operative to read and record frames of digital signals arranged in blocks on a multichannel magnetic medium, each block having a predetermined format, said controller including an addressable control store for storing microprograms used to perform said read and write operations, decoder circuits coupled to said control store for generating control signals in response to decoding microinstructions of said microprograms, a processing unit for performing arithmetic and logic operations upon a pair of operands, a data recovery unit and for assembling into bytes, digital signals transferred by said selected device at a specified rate for transfer to said date processing system, said recovery unit having an input coupled to receive digital signals from a selected device and an output coupled to said processing unit and including a plurality of recovery error indicator storage circuits operative to store signals indicative of error conditions occurring during the assembling of said digital signals received from said device, said controller further including self-testing apparatus comprising:

selector circuit means having an output and at least first and second inputs, said output being coupled to said input of said data recovery unit, said first inputs being coupled to said input of said selected device and said second input being coupled to said processing unit;

a first storage means operatively coupled to said data recovery error indicator storage circuits for storing signals indicative of error conditions detected by said recovery unit;

said control store including input means for receiving an input reset control signal from said data processing system and further including a plurality of basic test routines, one of said routines for verifying that said data recovery unit is operating properly, said one of said routines including a limited number of microinstructions containing constants corresponding to initial patterns and expected results patterns, said control store being responsive to said reset signal to branch to said basic test routines, said decoder circuits being conditioned by a first microinstruction sequence of said one routine to generate signals for conditioning said selector circuit means to connect said recovery unit to receive signals only from said second output and said decoder circuit being conditioned by repeated execution of other microinstructions of said one routine to generate signals for conditioning said processing means to generate digital signals of a first block from said initial patterns arranged in said predetermined format and said decoder means being conditioned by a sequence of test microinstructions upon completion of assembling into bytes said digital signals of said first block to generate signals to compare the states of said first storage means with one of said patterns of expected results for testing whether said recovery unit is operating reliably.

21. The controller according to claim 20 wherein each of said blocks includes preamble and postamble sets of digital synchronization signals bracketing each group of digital data signals, said processing unit being conditioned by said signals to generate a number of preamble synchronization signals selected to have a predetermined relationship to the number of preamble synchronization signals bracketing each block recorded on said medium.

22. The controller according to claim 21 wherein said predetermined relationship is to have the number of said digital synchronization signals of each preamble less than the number of preamble synchronization signals included in each block of data signals recorded on said medium and corresponding to a minimum number of signals required to synchronize the operation of said data recovery unit to the transfer rate of said digital signals received from said device.

23. The controller according to claim 21 wherein said controller further includes:
- a counter coupled to said control store, said decoder circuits and to said processing unit, said counter being conditioned by said decoder circuits to receive initially an index count read out from said control store;
- clocking circuits for applying clock pulse signals to said counter for decrementing said counter to a predetermined count for generating timing strobe signals enabling the transfer of digital signals at said specified rate between said processing unit and said device;
- said data recovery means further including timing means coupled to said counter for generating signals for transferring said digital data signals through said data recovery unit at said specified rate;
- a first register coupled to said processing unit, said first register being operative to receive from said processing unit a preamble count read out from said control store indicative of a number of frames of preambel synchronization signals to be generated for each block of digital signals applied to said data recovery unit;
- a write buffer register coupled between said processing unit and said second unit; and
- said control store conditioning said decoder circuits after each occurrence of a strobe signal to generate control signals for applying a predetermined pattern of digital synchronization signals to said write buffer register for transfer and assembling by said data recovery unit and for decrementing by said count stored in said first register.

24. The controller according to claim 20 wherein said controller includes a plurality of transfer paths for interconnecting said control store and first storage means, said processing unit and said recovery unit for transferring digital signals between said data processing system and a selected device and
wherein said basic test routines further include a plurality of initial test routines, said controller being conditioned by microinstructions read out from said control store during the execution of said initial test routines to establish independently that said control store, said means, each of said units and each of said transfer paths are operating properly prior to execution of said one routine.

25. The controller according to claim 23 wherein said data recovery unit further comprises:
- a plurality of series coupled buffer registers, a first one of said buffer registers being coupled to said control transfer means and a last of said buffer registers for storing said assembled byte, each of said registers including a pair of bistable storage devices, each pair of a first one of the registers being individually associated with one of the plurality of channels; and
- means for applying sets of clocking signal to each pair of said storage devices of said first register for storing pulses representative of said digital signals for subsequent transfer through said buffer registers; and wherein said one routine includes a data routine having a branch test microinstruction which when executed tests the count stored in said first register, said control store including branch control means operative in response to signals indicating that said count has been decremented to zero to cause said store to branch other microinstructions in said data routine, a first microinstruction for conditioning said decoder circuits to generate a signal indicating that said minimum number of preamble frames have been processed, another one of said microinstructions conditioning said decoder circuits to generate control signals for loading a predetermined bit pattern into said write buffer register for signaling the end of generating said preamble signals of the block and said branch control means being responsive to timing signals from said data recovery means to condition said decoder circuits to generate signals to set a predetermined one of said plurality of indicator storage circuits for signaling synchronization of each of said clocking means to said digital synchronization signals within said minimum number of frames corresponding to said preamble count indicative that all of said clocking means are operating without any degradation in performance.

26. The controller according to claim 25 wherein said controller further includes:
- second and third registers coupled to said processing unit, said second and third registers respectively being conditioned by signals generated by said decoder means to store an initial data pattern and a predicated results pattern read out from said control store, and wherein
- said one routine further includes additional sequences of microinstructions which comprise said data routine and a sequence of microinstructions which comprise an analysis routine, said decoder means being conditioned by one of additional sequences of microinstructions of said data routine read out from said control store to generate a first set of control signals for applying repetitively signals representative of said data pattern to said write buffer register for generating patterns of said digital data signals of said first block and said decoder means being conditioned by microinstructions in said sequence of said analysis routine to generate a second set of control signals for comparing said states of said first storage means and the contents of said third register and generating a signal verifying that said data recovery means is operating properly.

27. The controller of claim 26 wherein said controller further includes a fourth register coupled to said processing unit for storing an error pattern, said error pattern and said initial data pattern each is in a binary code having a number of bits corresponding to the number of channels, said binary code of said error pattern containing a predetermined number of binary ONES used for generating error patterns of digital data signals designating a predetermined number of channels which are expected to signal failure and wherein
said data recovery means further includes correction circuits coupled to said last buffer register and a preceding buffer register, said correction circuits being operative in response to error signals to correct the byte assembled in said last buffer register; said decoder circuits in response to microinstructions generating signals for shifting by one said binary code of said error pattern to generate digital data signals containing error patterns for indicating failures in different channels and wherein said contents of said third register are coded to indicate the predicted error conditions resulting from the assembling of said digital data signals into bytes and indicate when said assembled bytes contain correctable and uncorrectable errors, said signal indicating that said data recovery means is operating properly by signaling said errors as being uncorrectable when said error patterns contain a predetermined number of binary ONES causing a corresponding number of said channels to signal failure.

28. The controller of claim 27 wherein said data recovery unit further includes a plurality of channel failure storage circuits having inputs coupled to a first predetermined one of said buffer registers and operative to signal conditions indicative of a failure in different ones of said channels and the outputs of said channel failure storage circuits being coupled to a second predetermined one of said buffer registers for transferring signals to said register indicative of said channel failures, said last one of said registers being coupled to said logic means, and wherein said analysis routine includes a test sequence of microinstructions, said decoder circuit being responsive to said test sequence for generating signals for storing indications of said channel failure signals in said last register and comparing said error pattern contents of said fourth register with the contents of said last register for verifying that only the channels predicted to have failures signaled failure indicative of no interference between channels.

29. The controller of claim 27 wherein said data recovery unit further includes a check circuit coupled to a last one of said buffer registers, said check circuit operative to perform a check upon an assembled byte in said last one of said registers and signal the occurrence of an uncorrectable error within said byte;

said check indicator storage circuits including a plurality of test indicator storage circuits, at least one of said storage circuits being coupled to said check circuit and others of said test indicator circuits being coupled to said processing unit and predetermined ones of said recovery error indicator circuits for receiving signals indicative of testing each of said bytes assembled in said last register; and, said controller further including:

a fifth register operatively coupled to said control store and to said test indicator circuits for storing signals indicative of the states of said test indicator circuits; and, memory means operatively coupled to said control store and to said logic means, said memory means being conditioned to receive a predicted result pattern of digital signals from said control store indicative of the predicted states of said test indicator storage circuits;

said decoder circuits being conditioned by sequences of microinstructions of said data routine and analysis routine to generate control signals for conditioning said fifth register to store indications of said test indicator circuits during the testing of each byte and said decoder circuits being conditioned by microinstructions of said anaylsis routine at the end of transferring all of the bytes of said first block to generate signals for comparing the contents of said fifth register with said pattern from said memory means for verifying that said error recovery indicator circuits are operating properly during the assembling of each of said bytes of said first block.

30. An improved method of initializing a magnetic tape peripheral subsystem in response to a control signal from a data processing system coupled to said peripheral system, said peripheral system including a microprogrammed input/output magnetic tape controller coupled to a plurality of magnetic tape devices for reading and recording on a multichannel medium successive bytes of digital signals in blocks, each block having a predetermined format, said controller including a control store for storing microprograms used for reading and recording said bytes and a data recovery unit coupled to receive signals from a selected one of said devices and assemble said signals into bytes for transfer to said data processing system, said recovery unit including a plurality of error indicator storage circuits for signaling the occurrence of error conditions during the assembling of said bytes, said improved method including the steps of:

storing in said control store a plurality of basic test routines, one of said test routines involving microinstructions containing constants representative of initial patterns used to generate groups of digital signal patterns which constitute blocks arranged in said predetermined format and patterns representative of expected results for verifying that said controller can recover reliably said signals from said medium;

generating signals by said controller in response to said control signal which conditions said control store to branch to said one of said test routines;

generating signals in response to microinstructions of said one of said test routines for connecting said data recovery unit to receive said generated groups of digital signals and inhibiting transfer of digital signals from a selected one of said plurality of magnetic tape devices;

generating said groups of digital signals from microinstructions containing constants representative of said initial patterns and applying them to said recovery unit;

monitoring the states of said error indicator storage circuits in said controller during the application of said groups of digital signals;

comparing a predetermined one of said patterns obtained from one of said microinstructions read from said control store indicating said expected results with the states of said error indicator storage circuits; and signaling that said recovery unit is operating reliably in recovering said groups of digital signals when the states of certain ones of said indicator storage circuits indicate that said blocks applied to said recovery unit contain patterns of digital data signals representative of uncorrectable error conditions as defined by said predetermined one of said patterns.

* * * * *